US012560054B2

(12) United States Patent
Okuno et al.

(10) Patent No.: US 12,560,054 B2
(45) Date of Patent: Feb. 24, 2026

(54) USE OF CARBOXYLATES FOR CARBON SEQUESTRATION, IMPROVED OIL RECOVERY, AND HYDROGEN STORAGE AND REPRODUCTION

(71) Applicant: Board of Regents, The University of Texas System, Austin, TX (US)

(72) Inventors: Ryosuke Okuno, Austin, TX (US); Gayan Aruna Abeykoon, Beaverton, OR (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 18/557,356

(22) PCT Filed: Apr. 29, 2022

(86) PCT No.: PCT/US2022/027116
§ 371 (c)(1),
(2) Date: Oct. 26, 2023

(87) PCT Pub. No.: WO2022/232630
PCT Pub. Date: Nov. 3, 2022

(65) Prior Publication Data

US 2024/0240539 A1 Jul. 18, 2024

Related U.S. Application Data

(60) Provisional application No. 63/182,299, filed on Apr. 30, 2021.

(51) Int. Cl.
*E21B 41/00* (2006.01)
*C09K 8/594* (2006.01)

(52) U.S. Cl.
CPC .......... *E21B 41/0064* (2013.01); *C09K 8/594* (2013.01)

(58) Field of Classification Search
CPC .............................. E21B 41/006; C09K 8/594
See application file for complete search history.

(56) References Cited

U.S. PATENT DOCUMENTS 3,796,266 A 3/1974 Carlin et al.
4,500,434 A 2/1985 Jost et al.
(Continued)

OTHER PUBLICATIONS

International Application No. PCT/US2022/027116, International Preliminary Report on Patentability mailed on Nov. 9, 2023, 18 pages.

(Continued)

*Primary Examiner* — Silvana C Runyan
(74) *Attorney, Agent, or Firm* — Kilpatrick Townsend & Stockton LLP

(57) ABSTRACT

Described herein are compositions, techniques, methods, and systems for sequestering carbon, for producing oil, for improved oil recovery, and for storing hydrogen by way of injecting aqueous mixtures into subterranean reservoirs. The aqueous mixtures include one or more carboxylates, which can represent a form of carbon dioxide and/or a form of hydrogen. The aqueous mixtures including carboxylates may also or alternatively be useful for increasing a viscosity of a fluid within the reservoir or modifying the wettability of rock within the reservoir to improve the availability and production of hydrocarbons contained within pores of the rock.

26 Claims, 44 Drawing Sheets

(56) References Cited

U.S. PATENT DOCUMENTS

| | | | | |
|---|---|---|---|---|
| 4,737,296 | A | 4/1988 | Watkins | |
| 5,105,887 | A * | 4/1992 | Hewgill | C09K 8/592 507/936 |
| 8,812,271 | B1 * | 8/2014 | Brady | C09K 8/58 703/1 |
| 2007/0254969 | A1 * | 11/2007 | Olah | C07C 29/136 518/726 |
| 2008/0292560 | A1 | 11/2008 | Tamarkin et al. | |
| 2010/0006283 | A1 * | 1/2010 | Collins | C09K 8/58 166/261 |
| 2010/0034733 | A1 * | 2/2010 | Fukuzumi | B01J 31/1815 422/600 |
| 2010/0304418 | A1 | 12/2010 | Moussavi et al. | |
| 2011/0220351 | A1 | 9/2011 | Surguchev et al. | |
| 2011/0319302 | A1 * | 12/2011 | Li | C09K 8/70 507/217 |
| 2012/0090833 | A1 | 4/2012 | Ligthelm et al. | |
| 2014/0014375 | A1 | 1/2014 | Boerrigter et al. | |
| 2014/0251822 | A1 * | 9/2014 | Bhavaraju | C25B 9/19 204/251 |
| 2014/0299817 | A1 | 10/2014 | Hull et al. | |
| 2014/0335275 | A1 | 11/2014 | Ryabova | |
| 2016/0145486 | A1 | 5/2016 | Weaver et al. | |
| 2016/0194766 | A1 | 7/2016 | Eastman et al. | |
| 2017/0292196 | A1 * | 10/2017 | Zhai | C25B 11/091 |
| 2018/0055359 | A1 | 3/2018 | Shamim et al. | |
| 2018/0261865 | A1 | 9/2018 | Jahnke | |
| 2019/0032479 | A1 * | 1/2019 | Li | G01N 33/2823 |
| 2019/0085361 | A1 | 3/2019 | Medoff et al. | |
| 2020/0338209 | A1 | 10/2020 | Benatuil et al. | |

OTHER PUBLICATIONS

International Application No. PCT/US2022/027116, International Search Report and the Written Opinion mailed on Sep. 14, 2022, 22 pages.

International Application No. PCT/US2022/027116, Invitation to Pay Additional Fees and, Where Applicable, Protest Fee mailed on Jul. 8, 2022, 2 pages.

Sun et al., Zeolite-Encaged Pd-Mn Nanocatalysts for CO2 Hydrogenation and Formic Acid Dehydrogenation, Angewandte Chemie International Edition, vol. 59, No. 45, Nov. 2, 2020, pp. 20183-20191.

* cited by examiner

200

205

Place one or more wells in a subterranean reservoir

210

Prepare carboxylate from atmospheric or captured carbon dioxide, carbonate ions or bicarbonate ions

215

Prepare aqueous mixture of carboxylate and water with optional additives

220

Inject aqueous mixture into subterranean reservoir

400

```
┌─────────────────────────────────────┐
│  Place one or more wells in a        │   405
│  subterranean reservoir              │
└─────────────────────────────────────┘
                  │
                  ▼
┌─────────────────────────────────────┐
│  Prepare carboxylate as hydrogen     │   410
│  carrier and add to aqueous mixture  │
└─────────────────────────────────────┘
                  │
                  ▼
┌─────────────────────────────────────┐
│  Inject aqueous mixture into         │   415
│  subterranean reservoir              │
└─────────────────────────────────────┘
                  │
                  ▼
┌─────────────────────────────────────┐
│  Inject catalyst into subterranean   │   420
│  reservoir                           │
└─────────────────────────────────────┘
                  │
                  ▼
┌─────────────────────────────────────┐
│  Produce fluid from subterranean     │   425
│  reservoir                           │
└─────────────────────────────────────┘
                  │
                  ▼
┌─────────────────────────────────────┐
│  Generate hydrogen gas from          │   430
│  carboxylate in produced fluid       │
└─────────────────────────────────────┘
```

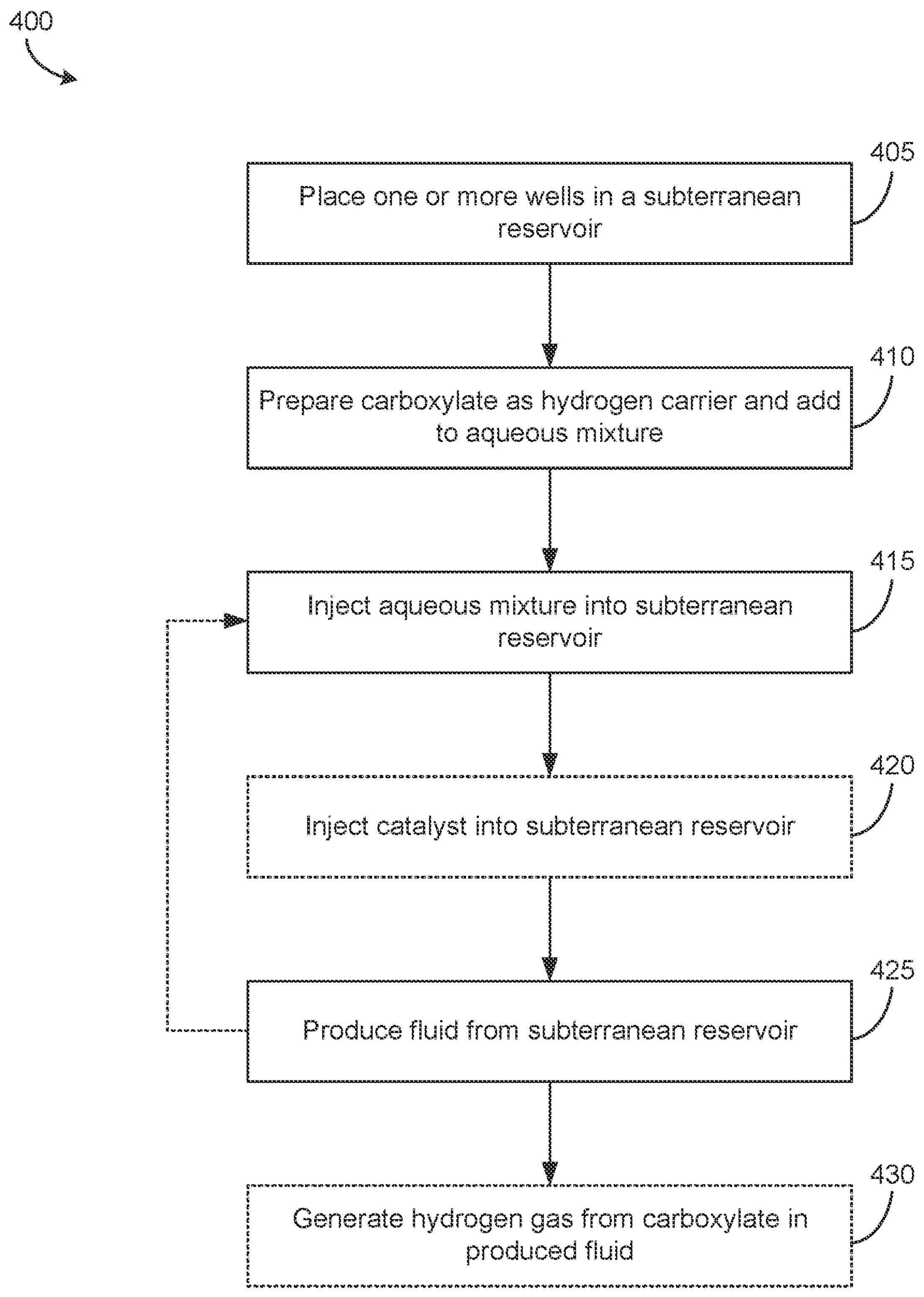

FIG. 4

Initial After 3 days

Initial After 3 days

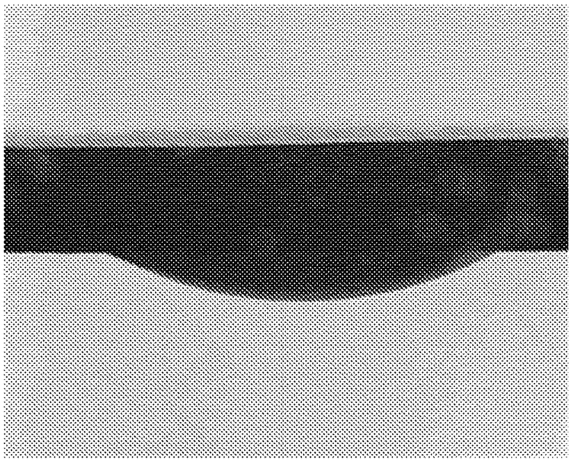
Initial
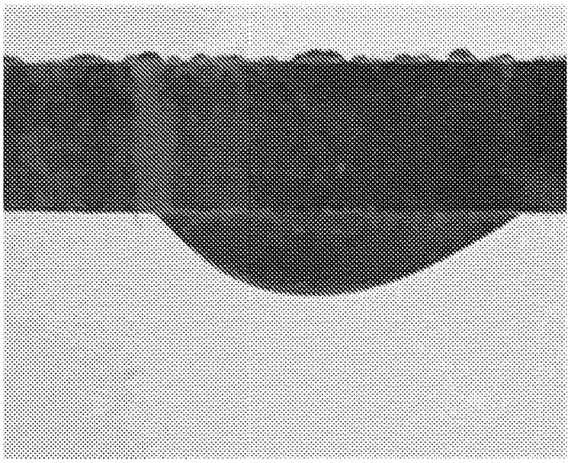
After 3 days
FIG. 7

Initial After 3 days

Initial After 3 days

Initial

After 3 days

Initial

After 3 days 2 years 5 years 15 years 35 years 5 years

Global CO₂
mole fraction

Formate mole fraction
in water 20 years

Global CO₂
mole fraction

Formate mole fraction
in water 27 years

Global CO₂
mole fraction

Formate mole fraction
in water glycinium cation
low pH glycine zwitterion
neutral glycinate anion
high pH Formate anion Acetate anion Glycine

USE OF CARBOXYLATES FOR CARBON SEQUESTRATION, IMPROVED OIL RECOVERY, AND HYDROGEN STORAGE AND REPRODUCTION

CROSS-REFERENCE TO RELATED APPLICATIONS

This application is a U.S. National Stage of PCT International Application No. PCT/US2022/027116 filed on Apr. 29, 2022, which claims the benefit of and priority to U.S. Provisional Application No. 63/182,299, filed on Apr. 30, 2021, which are herein incorporated by reference in their entireties.

FIELD

This invention is in the fields of carbon capture and sequestration, enhanced and improved oil recovery, and hydrogen storage. This invention relates generally to compositions, methods, techniques, and systems for sequestering carbon in subterranean reservoirs, for producing hydrocarbons and enhancing hydrocarbon production from subterranean reservoirs, and for storing and/or reproducing hydrogen using subterranean reservoirs.

BACKGROUND

Carbon capture and sequestration is becoming more important as the level of carbon dioxide ($CO_2$) in the atmosphere continues to rise. Sequestration of $CO_2$ in subterranean reservoirs as gaseous $CO_2$ or liquid $CO_2$ has been explored, but additional techniques for safely and effectively sequestering carbon are needed.

Waterflooding is useful for supporting the rate of oil production from a subterranean reservoir, and may be used to increase oil production rates and the oil recovery factor as reservoirs are depleted. The injected water may be produced water or brine previously produced from the reservoir or from another reservoir, and seawater, freshwater, or aquifer water may also or alternatively be used. The water may be injected at a distance away from a production well to provide a driving force for displacing oil in the reservoir toward the production well and may be useful for maintaining pressure within the reservoir as oil is produced. In some cases, some oil within a reservoir may not be easily available for extraction, such as if the oil is trapped within pores of the rock within the reservoir. Techniques for producing oil from porous rock exist, but they may be complex or require use of surfactants, solvents, or other costly additives that may not be environmentally friendly.

Hydrogen gas ($H_2$) is useful as a fuel for electricity generation using hydrogen fuel cells. However, when electricity is needed, the $H_2$ used for power generation must be available, so $H_2$ is typically stored in the form of a compressed gas or as a hydrogen carrier (e.g., ammonia or methylcylohexane), which can present challenges in storing sufficient amounts of $H_2$ to meet demand. In some cases, $H_2$ can be generated as needed on demand, but $H_2$ generation is often an energy intensive process and so on demand generation for meeting real-time needs can have significant energy requirements.

SUMMARY

Various techniques are described herein for sequestering carbon, for producing and enhancing production of oil, and for storing and/or reproducing hydrogen by way of injecting aqueous mixtures into subterranean reservoirs. The aqueous mixtures include one or more carboxylates, which may represent a form of carbon dioxide and/or a form of hydrogen. Optionally, aqueous mixtures including carboxylates may be useful for modifying the wettability of rock within the reservoir to improve the availability and production of hydrocarbons contained within pores of the rock. Carboxylates may also be used as viscosity modifiers (e.g., to increase viscosity of fluids within a reservoir). Further, since carboxylates tend to not be naturally occurring within subterranean reservoirs at high concentrations, they can also or alternatively be used as a tracer to track fluid movement within the reservoir and identify well connectivity. Advantageously, carboxylates can be easily characterized and quantified using spectroscopic techniques, such as nuclear magnetic resonance or liquid or gas chromatography-mass spectrometry. Moreover, carboxylates tend to be environmentally benign, easily produced, available at low cost, and useful for storage of both carbon and hydrogen and for reproduction of hydrogen. In some examples, hydrogen reproduction can occur in situ within a reservoir from injected carboxylates or at the surface from produced carboxylates.

The present techniques overcome challenges associated with sequestering gaseous carbon dioxide in a subterranean reservoir, such as having to compress the carbon dioxide to high pressures or since the carbon dioxide can leak from the reservoir and escape to the surface, because the carbon can be securely stored in the form of a carboxylate, such as formate, acetate, or propionate. Carbon dioxide or a related ion, such as carbonate ion or bicarbonate ion, can be converted to carboxylates via electrochemical reduction with water, for example. Carboxylates can be highly miscible with water or brine and so aqueous mixtures of carboxylates can be directly injected into subterranean reservoirs as a liquid without having to be highly pressurized like carbon dioxide gas, making current liquid injection systems practical for carbon sequestration using carboxylates.

The present techniques also overcome challenges in recovering oil or hydrocarbons from a subterranean reservoir because the presence of the carboxylates in the injected aqueous mixture may modify a wettability of rock surfaces within the reservoir to change the rock surfaces to a more water-wet condition (less oil-wetting condition), allowing for hydrocarbons contained within pores of the rock to be more easily released and produced. Carboxylates may also be used as a viscosifier, optionally alone or with one or more polymers (e.g., hydrolyzed or partially hydrolyzed polyacrylamide), increasing a viscosity of a fluid within a subterranean reservoir, improving the front stability of the fluid displacement within the reservoir. Advantageously, including carboxylates in the injected aqueous mixture may also serve to reduce a net carbon emission associated with production of hydrocarbons from the reservoir. In some examples, the net carbon emissions associated with production of hydrocarbons from the reservoir can be improved using carboxylate injection even in excess of that achieved by injecting $CO_2$.

The disclosed techniques may alter the rock wettability to favorably allow hydrocarbon release from the reservoir, and in many cases without using or in the absence of surfactants present in the aqueous mixture. In some cases, however, it may still be advantageous to include surfactants in the injected aqueous mixture. Eliminating or reducing the use of surfactants may have a further beneficial effect, as stabilizers normally used to maintain stability of surfactants also do not have to be used or used only to a lesser extent, reducing the complexity and cost of the aqueous mixture. Further, using surfactants as wettability modifiers may not be viable for certain reservoirs, such as those having high salinity or high temperature conditions. The aqueous mixture may also include other components, such as solvents, which can favorably interact with the hydrocarbons within the reservoir, such as to reduce the viscosity of the hydrocarbons and allow for easier and/or more efficient production. In some examples, carboxylates may be used together with oxygenated solvents, like ketones, for modifying rock wettability to allow favorable hydrocarbon release.

The present techniques also provide advantageous methods for storing hydrogen gas ($H_2$) by storing it not in gaseous form, but instead in the form of a carboxylate, making it suitable for storage in subterranean reservoirs. For example, formic acid can serve as a liquid organic hydrogen carrier, reversibly allowing $H_2$ generation/storage by catalytic (de) hydrogenation with carbon dioxide ($CO_2$). By having large amounts of carboxylates stored in a subterranean reservoir, these carboxylates can be produced and used for $H_2$ generation on demand or, alternatively, catalysts (e.g., nanocatalysts and/or pH modifiers) can be added to the subterranean reservoir to facilitate $H_2$ generation in situ so that $H_2$ can be directly produced from the subterranean reservoir. Advantageously, the carboxylate injected into the subterranean reservoir can be generated using renewable energy resources (e.g., solar, wind, etc.) that may often be intermittent or producing in excess during certain times of the day. The generated carboxylates or hydrogen generated therefrom can be later produced during periods of low renewable energy generation and used as an electricity generation source. In this way, carboxylates can be useful for grid load balancing purposes.

In a first aspect, methods are disclosed herein. In an example, a method of this aspect comprises obtaining an aqueous mixture comprising water and a carboxylate, such as an carboxylate that has a concentration of from 1 wt. % to 45 wt. %, and injecting the aqueous mixture into the subterranean reservoir. In some cases, the subterranean reservoir contains water or brine and the carboxylate can distribute into or throughout the water or brine in the subterranean reservoir. For example, the subterranean reservoir may be an oil or gas reservoir, a saline aquifer, a fresh water aquifer, a geothermal reservoir, or caverns (e.g., salt caverns). Optionally, a method of this aspect may further comprise determining a pH of the water or brine in the subterranean reservoir and modifying a pH of the aqueous mixture to be the same as or close to (e.g., within 1 pH unit) the pH of the water or brine in the subterranean reservoir. In examples, the pH of the aqueous mixture can be modified by adding acid (e.g., hydrochloric acid) or base (e.g., sodium hydroxide) to the mixture, depending on the source of the carboxylate (e.g., carboxylic acid or carboxylate salt).

For sequestering carbon, such as from carbon dioxide, using the disclosed methods, the carboxylate can be prepared from atmospheric $CO_2$ or $CO_2$ captured from an industrial process, such as directly captured $CO_2$ or $CO_2$ in other forms, such as carbonate ions or bicarbonate ions in aqueous media. For example, the carboxylate can be prepared from $CO_2$, carbonate ions, or bicarbonate ions using an electrochemical reduction process involving water. Advantageously, such an electrochemical reduction process can be powered using renewable energy (e.g., solar, wind, geothermal, etc.) so that the electrochemical reduction process is carbon neutral and so that the injection process serves as a net carbon negative process. Further, as mentioned above, such an electrochemical reduction process can be useful for load balancing purposes A variety of different carboxylates are useful with the systems, methods, and aqueous mixtures described herein. For example, the carboxylates may have a formula of

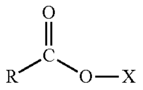
or
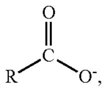
, where R is an alkyl group and X is H or a metal, such as an alkali metal. The carboxylates may be present in the aqueous mixture at any suitable concentration. Example concentrations of the carboxylates may be from about 1 wt. % to about 45 wt. %. For example, useful total concentrations of one or more carboxylates in the aqueous mixture may be from 1 wt. % to 2 wt. %, from 2 wt. % to 3 wt. %, from 3 wt. % to 4 wt. %, from 4 wt. % to 5 wt. %, from 5 wt. % to 6 wt. %, from 6 wt. % to 7 wt. %, from 7 wt. % to 8 wt. %, from 8 wt. % to 9 wt. %, from 9 wt. % to 10 wt. %, from 10 wt. % to 11 wt. %, from 11 wt. % to 12 wt. %, from 12 wt. % to 13 wt. %, from 13 wt. % to 14 wt. %, from 14 wt. % to 15 wt. %, from 15 wt. % to 16 wt. %, from 16 wt. % to 17 wt. %, from 17 wt. % to 18 wt. %, from 18 wt. % to 19 wt. %, from 19 wt. % to 20 wt. %, from 20 wt. % to 21 wt. %, from 21 wt. % to 22 wt. %, from 22 wt. % to 23 wt. %, from 23 wt. % to 24 wt. %, from 24 wt. % to 25 wt. %, from 25 wt. % to 26 wt. %, from 26 wt. % to 27 wt. %, from 27 wt. % to 28 wt. %, from 28 wt. % to 29 wt. %, from 29 wt. % to 30 wt. %, from 30 wt. % to 31 wt. %, from 31 wt. % to 32 wt. %, from 32 wt. % to 33 wt. %, from 33 wt. % to 34 wt. %, from 34 wt. % to 35 wt. %, from 35 wt. % to 36 wt. %, from 36 wt. % to 37 wt. %, from 37 wt. % to 38 wt. %, from 38 wt. % to 39 wt. %, from 39 wt. % to 40 wt. %, from 40 wt. % to 41 wt. %, from 41 wt. % to 42 wt. %, from 42 wt. % to 43 wt. %, from 43 wt. % to 44 wt. %, or from 44 wt. % to 45 wt. %. In embodiments, a concentration of the carboxylate is within (i.e., less than or about) a solubility limit of the carboxylate in the aqueous mixture at a temperature and a pressure of the subterranean reservoir. Optionally, the amount of carboxylate in the aqueous mixture is above or at a solubility limit, such as in the form of a saturated or supersaturated aqueous mixture of the carboxylate. In some embodiments, multiple carboxylates are used in the aqueous mixture.

The aqueous mixture may optionally comprise a number of different components beyond water and the carboxylate. For example, the aqueous mixture may optionally comprise fresh water, seawater, reservoir connate water, produced water, river water, pond water, or brine. In some methods, obtaining the aqueous mixture comprises obtaining an aqueous solution and augmenting the aqueous solution with one or more additives including the carboxylate. Optionally, the aqueous mixture comprises one or more of a surfactant, a solvent, an acid, a base, a salt, a chelating agent, an inorganic compound, a polymer, a nanomaterial, a hydrocarbon, an amino acid, a biocide, nitrogen, or carbon dioxide. Example surfactants may include an anionic surfactant, a cationic surfactant, a nonionic surfactant, an amphoteric or zwitterionic surfactant, or any combination of these. Example solvents may include a hydrocarbon, a hydrocarbon solvent, an amine, an ether, an alcohol, a ketone, an ester, or any combination of these. Example acids may include hydrochloric acid or acetic acid. Example bases may include sodium hydroxide, potassium hydroxide, lithium hydroxide, ammonium hydroxide (ammonia solution/aqueous ammonia), and/or amines. Example salts may include those comprising sodium ions, potassium ions, magnesium ions, calcium ions, strontium ions, chloride ions, bromide ions, iodide ions, sulfate ions, bicarbonate ions, carbonate ions, or any combination of these.

The aqueous mixture may have any suitable salinity. Optionally, a salinity of the aqueous mixture is greater than or about equal to a salinity of brine or water in the subterranean reservoir. Optionally, a salinity of the aqueous mixture is less than or about equal to a salinity of brine or water in the subterranean reservoir. Specific salinities of the aqueous mixture may be from about 0 ppm to about 250000 ppm. For example, a salinity of the aqueous mixture may be from 0 ppm to 500 ppm, from 500 ppm to 1000 ppm, from 1000 ppm to 5000 ppm, from 5000 ppm to 10000 ppm, from 10000 ppm to 50000 ppm, from 10000 ppm to 15000 ppm, from 15000 ppm to 20000 ppm, from 20000 ppm to 50000 ppm, from 50000 ppm to 100000 ppm, from 100000 ppm to 150000 ppm, from 150000 ppm to 200000 ppm, or from 200000 ppm to 250000 ppm. Optionally, a salinity of the aqueous mixture is less than or about 100% of a salinity of the brine or water in the subterranean reservoir. In some cases, the salinity of the aqueous mixture may impact the solubility of the carboxylate in the aqueous mixture.

It may be desirable in some cases for a pH of the aqueous mixture to be about equal to that of brine or water in the subterranean reservoir, such as within about 1 pH unit. Optionally, a pH of the aqueous mixture is less than or about equal to the pH of the brine or water in the subterranean reservoir. Optionally, the pH of the aqueous mixture may be from 0.1 pH unit to 5.0 pH units less than the pH of the brine or water in the subterranean reservoir, from 0.1 pH unit to 0.5 pH units less than the pH of the brine or water in the subterranean reservoir, from 0.5 pH unit to 1.0 pH units less than the pH of the brine or water in the subterranean reservoir, from 1.0 pH unit to 1.5 pH units less than the pH of the brine or water in the subterranean reservoir, from 1.5 pH units to 2.0 pH units less than the pH of the brine or water in the subterranean reservoir, from 2.0 pH units to 2.5 pH units less than the pH of the brine or water in the subterranean reservoir, from 2.5 pH units to 3.0 pH units less than the pH of the brine or water in the subterranean reservoir, from 3.0 pH units to 3.5 pH units less than the pH of the brine or water in the subterranean reservoir, from 3.5 pH units to 4.0 pH units less than the pH of the brine or water in the subterranean reservoir, from 4.0 pH units to 4.5 pH units less than the pH of the brine or water in the subterranean reservoir, or from 4.5 pH units to 5.0 pH units less than the pH of the brine or water in the subterranean reservoir. Optionally, a pH of the aqueous mixture is more than or about equal to the pH of the brine or water in the subterranean reservoir. Optionally, the pH of the aqueous mixture may be from 0.1 pH unit to 5.0 pH units more than the pH of the brine or water in the subterranean reservoir, from 0.1 pH unit to 0.5 pH units more than the pH of the brine or water in the subterranean reservoir, from 0.5 pH unit to 1.0 pH units more than the pH of the brine or water in the subterranean reservoir, from 1.0 pH unit to 1.5 pH units more than the pH of the brine or water in the subterranean reservoir, from 1.5 pH units to 2.0 pH units more than the pH of the brine or water in the subterranean reservoir, from 2.0 pH units to 2.5 pH units more than the pH of the brine or water in the subterranean reservoir, from 2.5 pH units to 3.0 pH units more than the pH of the brine or water in the subterranean reservoir, from 3.0 pH units to 3.5 pH units more than the pH of the brine or water in the subterranean reservoir, from 3.5 pH units to 4.0 pH units more than the pH of the brine or water in the subterranean reservoir, from 4.0 pH units to 4.5 pH units more than the pH of the brine or water in the subterranean reservoir, or from 4.5 pH units to 5.0 pH units more than the pH of the brine or water in the subterranean reservoir. In some examples, the pH of the aqueous mixture does not substantially modify the overall pH of the brine or water in the subterranean reservoir. However, the pH of the aqueous mixture may be used to modify the pH of the brine or water in the subterranean reservoir in a locality surrounding the injection well, at least temporarily. Optionally, the pH of the aqueous mixture is adjusted prior to injection. In some examples, the pH of the aqueous mixture may be from about 5 to about 9, such as from 5 to 6, from 6 to 7, from 7 to 8, or from 8 to 9.

The methods and systems described herein may be useful with a variety of different subterranean reservoirs. For example, the subterranean reservoir may be an oil or gas reservoir, a saline aquifer, a fresh water aquifer, or a geothermal reservoir. Optionally, the subterranean reservoir comprises one or more rock types including, but not limited to, sandstone, carbonate, or volcanic rock. Optionally, the subterranean reservoir comprises one or more minerals including, but not limited to, quartz, calcite, dolomite, anhydrite, gypsum, feldspar, siderite, zeolites, kaolinite, illite, chlorite, or smectite. Optionally, the subterranean reservoir comprises organic matters, such as kerogen or bitumen. The rock in the subterranean reservoir may have a porosity of less than 10% (e.g., tight and shale formations) or may have a larger porosity (e.g., up to 20% or 30%). The rock in the subterranean reservoir may have a permeability of less than 5 nD or 10 nD or may have a larger permeability, such as up to 5 D or 10 D.

In cases for enhanced oil recovery and/or hydrocarbon production, for example, the aqueous mixture or a component thereof can contact rock surfaces in the subterranean reservoir and optionally increase a water wettability character of the rock surfaces. The use of carboxylates in aqueous mixtures used for producing hydrocarbons may provide a number of distinct advantages. For example, carboxylates may be used as tracers to allow identification of fluid connectivity between wells in the reservoir, particularly since carboxylates are not naturally occurring within subterranean oil or gas reservoirs and are easily identifiable and quantifiable using spectroscopic techniques.

The hydrocarbons within the subterranean reservoir that may be produced according to methods described herein may include, but are not limited to, crude oil, tarmat, bitumen, heavy oil, tight oil, shale oil, gas condensate, or any combination of these. In some examples, the recovery factor of the hydrocarbons from the subterranean reservoir can be greater by injecting the aqueous mixture (containing one or more carboxylates) as compared to the recovery factor of the hydrocarbons from the subterranean reservoir without injecting the aqueous mixture. For example, by modifying a wettability condition of rock surfaces within the reservoir, the reservoir may be more prone to release the hydrocarbons.

Optionally, a method of this aspect further comprises placing one or more wells in the subterranean reservoir. In embodiments, injecting the aqueous mixture into the subterranean reservoir includes injecting the aqueous mixture into one or more of the wells. Optionally, a method of this aspect may further comprise producing a fluid from the subterranean reservoir, such as from one or more of the wells. Optionally, the fluid comprises hydrocarbons, such as in the case of enhanced oil recovery, for example. In some embodiments, producing the hydrocarbons from the subterranean reservoir includes recovering at least a portion of the aqueous mixture injected into the subterranean reservoir. Optionally, brine may be produced from the subterranean reservoir, such as during production of the hydrocarbons from the subterranean reservoir or separate from producing the hydrocarbons from the subterranean reservoir. Optionally, an carboxylate is present as, identified as, or observed as a tracer in the brine produced from the subterranean reservoir. In the case of hydrogen storage, for example, the fluid optionally comprises the carboxylate or the fluid optionally comprises hydrogen, Systems are also provided herein, such as systems for sequestering carbon in a subterranean reservoir, systems for producing hydrocarbons from a subterranean reservoir, or systems for storing hydrogen in a subterranean reservoir. An example system comprises a source of an aqueous mixture, such as a aqueous mixture that comprises water and a carboxylate, such as a carboxylate having a concentration of from 1 wt. % to 45 wt. % in the aqueous mixture; and an injection system in fluid communication with the source and the subterranean reservoir for injecting the aqueous mixture into the subterranean reservoir. Further example details are described below.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

FIG. 4 provides an overview of an example hydrogen storage method.

FIG. 7 provides photographs showing contact angle change over time for an Eagle Ford shale submersed in reservoir brine.

DETAILED DESCRIPTION

Figure 1:
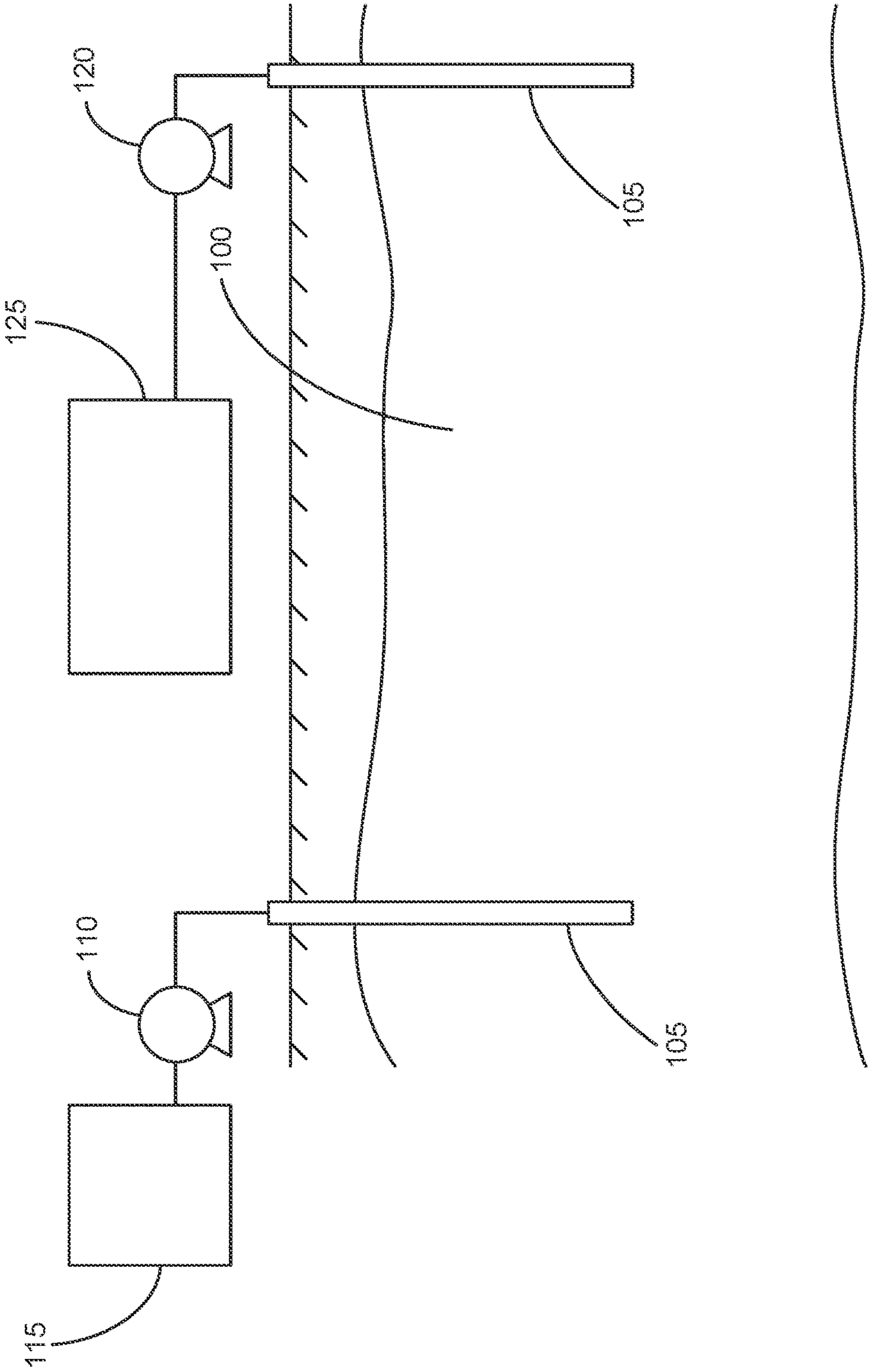
FIG. 1 provides a schematic illustration of a subterranean reservoir and a system for injecting an aqueous mixture into the subterranean reservoir.

Described herein are methods, systems, and techniques relating to injection of aqueous mixtures comprising one or more carboxylates into subterranean reservoirs, such as for carbon sequestration, enhanced oil recovery, or hydrogen storage. For sequestering carbon, the carboxylates can be present in the aqueous mixture at any suitable concentration, such as from 1 wt. % to 45 wt. %, or more. In this way, large amounts of carbon can be injected into the subterranean reservoir, where it can remain sequestered. In some cases, the carboxylate can be generated by capturing carbon dioxide from the atmosphere or at the point of generation and converting the carbon dioxide to a carboxylate by way of a chemical reaction, such as a hydrogenation reaction or electrochemical reduction of $CO_2$ in other forms (e.g., carbonate ions or bicarbonate ions) in aqueous media, optionally using renewable energy (e.g., solar, wind, geothermal) as a power source to provide a carbon negative process. For enhanced oil recovery, aqueous mixtures including carboxylates may be useful for modifying the wettability of rock within the reservoir to improve the availability and production of hydrocarbons contained within pores of the rock. Carboxylates may also be used as a viscosifier, optionally alone or with one or more polymers, and serve to increase a viscosity of a fluid within a subterranean reservoir, which can then be a more effective fluid displacement component within the reservoir, and serve to drive fluid across portions of the reservoir more efficiently. For storing hydrogen, the carboxylates can be present in the aqueous mixture at any suitable concentration, such as from 1 wt. % to 45 wt. %, and can be injected into the subterranean reservoir for later retrieval for hydrogen generation. For example, the carboxylate can be produced from the reservoir and used in a chemical reaction where hydrogen gas is evolved, such as at a dehydrogenation reactor. In some cases, a catalyst, pH modifier, and/or a nano-catalyst can be injected into the subterranean reservoir to catalyze hydrogen evolution from the oxidation of the carboxylate in situ, so that the hydrogen can then be produced directly from the subterranean reservoir.

As used herein, a "carboxylate" refers to a molecule containing a carboxyl functional group, which may be in anionic form (—$COO^-$), in protonated form as a carboxylic acid (—COOH), or in the form of a carboxylate salt (—COOM), such as an alkali metal carboxylate salt (e.g., sodium carboxylate). It will be appreciated that, in aqueous mixtures, the carboxylate may be in solvated form, and a pH of the mixture, a salinity of the mixture, and/or a concentration of the carboxylate may impact the extent to which the carboxylate is in the form of a carboxylic acid, a carboxylate ion, or a carboxylate salt. In general, the carboxylates useful with the techniques described herein are alkyl carboxylates, such as represented by a formula

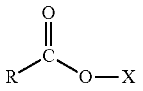 or 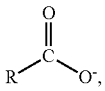, where X is H or an alkali metal and R is H or an alkyl group, such as a C1-C3 alkyl group, which may be substituted or unsubstituted. It will be appreciated that the carboxylates useful with the techniques described herein can be different from amino acids, which may correspond to carboxylates of the above formula where R includes an amine functionality. For example, stated in other ways, the carboxylate is not an amino acid or R does not contain an amine.

Use of carboxylates may be beneficial for a number of reasons. First, many carboxylates are naturally occurring and environmentally benign. For example acetic, acid, formic acid, and propionic acid have been approved as food additives by the U.S. Food and Drug Administration. Although carboxylates may be naturally occurring, they are typically absent or present at low concentration in aqueous fluids within subterranean reservoirs, so if added by injection according to the methods described herein they may be used as tracers to track fluid movement within the subterranean reservoir, such as to identify which wells within the reservoir fluidly communicate with one another or to track flow of aqueous fluids within the subterranean reservoir. The carboxylates may also advantageously modify conditions within a subterranean reservoir to allow for increased or easier production of hydrocarbons from the reservoir, such as by modifying wettability of the rock surfaces within the reservoir.

The carboxylates may advantageously be used in combination with other additives to the aqueous mixture injected into a subterranean reservoir, such as surfactants, acids, bases, polymers, chelating agents, nanomaterials, amino acids, biocides, solvents, hydrocarbons, or dissolved gases. For production of hydrocarbons, the use of carboxylates may allow for lower amounts of other components to be used to the same effect, such as lower amounts of surfactants, as the carboxylates may provide a similar effect as the surfactant—namely allowing easier release of the hydrocarbons from pores within the rock in the subterranean reservoir.

In particular, the wettability character of the rock surface in the reservoir can change from a more oil-wetting character (less water-wetting) to a more water-wetting character (less oil-wetting) in the presence of the carboxylate. Such an effect can be quantified as a change in contact angle between the rock surface and the aqueous and oleic phases. In embodiments, the rock can have a more oil-wetting character (oil contact angle less than 90°, water contact angle more than) 90°) before contact with the carboxylate containing aqueous mixture and change to a more water-wetting character (water contact angle less than 90°, oil contact angle more than 90°) after contact with the carboxylate containing mixture.

FIG. 1 provides a schematic overview of an example subterranean reservoir 100 in which a number of wells 105 have been placed. Subterranean reservoir 100 may be an oil or gas reservoir or may be an aquifer, for example. In some cases, the wells 105 may be vertical wells. In some cases, the wells 105 may be horizontal wells. Combinations of vertical and horizontal wells are also contemplated herein. Wells 105 may be used for injecting and storing an aqueous mixture comprising carboxylates in subterranean reservoir 100, as described above, such as for purposes of carbon sequestration or hydrogen storage.

In some cases, wells 105 may be used for a cyclic injection process (e.g., huff and puff or huff-n-puff processes), where a fluid, such as the aqueous mixtures described herein containing carboxylates, is injected and, after an optional soak period, a production process takes place. In some cases, wells 105 may be used for flooding processes (e.g., waterflooding processes), in which a fluid, such as the aqueous mixtures described herein containing carboxylates, is injected into a first well and a second well is used to produce a fluid, such as a fluid comprising hydrocarbons or an aqueous fluid or a gaseous fluid. Depending on the specific configuration, the same or different wells 105 may be used for both the injection and the production.

Wells 105 may optionally be used for injecting a slug of an aqueous mixture described herein comprising carboxylates in a brine or water followed by injecting a chase fluid. The chase fluid may comprise a brine or water and other components, such as chelating agents, amines, or inorganic bases. In some cases, the chase fluid may comprise the same brine or water that is the base of the aqueous mixture comprising carboxylates or it may be a different brine or water (e.g., including different ions and or concentrations of ions). Other example components for the chase fluid include one or more of a surfactant, a solvent, an acid, a base, a salt, an inorganic compound, a polymer, a chelating agent, a nanomaterial, an amino acid, a biocide, a hydrocarbon, nitrogen, or carbon dioxide. Chase fluid may be useful for and may include one or more components for reducing retention of the carboxylates and/or for desorbing at least some of the carboxylates from the aqueous mixture that has absorbed to the rock surfaces in the subterranean reservoir. Example chase fluids may include water or brine and one or more of a chelating agent, an amine, or an inorganic base.

An injection system may be in fluid communication with the wells 105. As illustrated in FIG. 1, the injection system may include conduits and pumping equipment 110, for example. A fluid source 115 may be in fluid communication with the injection system or the injection system may include the fluid source 115. Fluid source 115 may comprise or include to a storage tank, mixing tank, fluid conduits, or the like, for example, and may be used to provide an aqueous mixture for injection into reservoir 100 via wells 105.

A production system may be in fluid communication with the wells 105. As illustrated in FIG. 1, the production system may include conduits and pumping equipment 120, for example. A tank 125 may be in fluid communication with and/or a component of the production system. Tank 125 may comprise a storage tank or may be a reaction vessel, for example. In cases of hydrogen storage, a fluid produced using pumping equipment 120 may comprise a carboxylate, which is provided to tank 125 which can serve as a reaction vessel for a dehydrogenation reaction where hydrogen gas is generated from the produced carboxylate.

Figure 2:
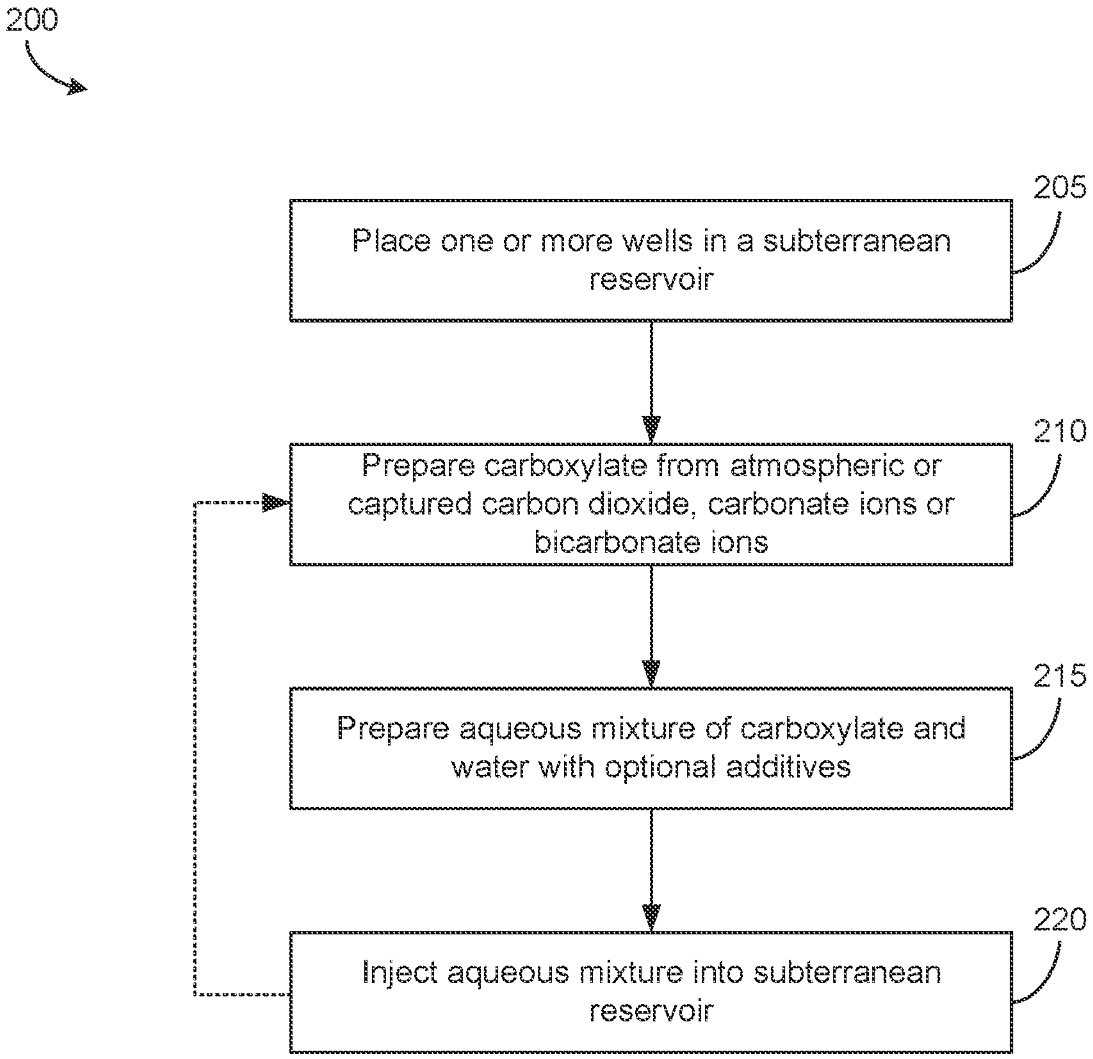
FIG. 2 provides an overview of an example carbon sequestration method.

FIG. 2 provides an overview of an example method 200 for producing sequestering carbon by injecting carboxylates into a subterranean reservoir. At block 205, one or more wells are placed in the subterranean reservoir. The wells may have any suitable dimensions, orientations, directions, etc. The one or more wells may comprise vertical wells, horizontal wells, or combinations thereof, for example. The subterranean reservoir may be an aquifer, such as a freshwater aquifer or a saline aquifer, or an oil or gas reservoir, which may optionally correspond to a depleted oil or gas reservoir.

At block 210, the carboxylate is prepared. In some examples, formate may be prepared by an electrochemical reduction reaction with $CO_2$, carbonate ions, or bicarbonate ions. In some cases, the carboxylate may be commercially available or produced using other methods. In some examples, acetate or acetic acid may be prepared by bacterial fermentation, methanol carbonylation, acetaldehyde oxidation, or ethylene oxidation. For purposes of carbon sequestration, it may be desirable for the preparation of the carboxylate at block 210 to be performed using only carbon neutral power, such as solar, wind, geothermal, or nuclear power. In some cases, preparation of the carboxylate at block 210 is an optional process and may be substituted with a process of obtaining the carboxylate.

With the carboxylate available, the aqueous mixture may be prepared, at block 215, by mixing the carboxylate with water or another aqueous solution (e.g., brine). Without limitation, the water or aqueous solution can be from any suitable source, such as brine or water previously produced from the subterranean reservoir or from another reservoir, or seawater, freshwater, river water, pond water, aquifer water, etc. Additives may optionally be included in the mixture, such as a surfactant, a solvent, an acid, a base, a salt, an inorganic compound, a polymer, a chelating agent, an amino acid, a biocide, a nanomaterial, a hydrocarbon, nitrogen, or carbon dioxide. In some examples, the additives may be used to increase a solubility of the carboxylate or provide suspension of solid particles comprising the carboxylate in the solution so as to allow the concentration of the carboxylate to be above the natural solubility limit of the carboxylate in water.

At block 220, the aqueous mixture comprising one or more carboxylates is injected into the subterranean reservoir, such as via the one or more wells. The aqueous mixture may be continuously injected or may be injected semi-continuously or in one or more discrete injection processes. The injection of the aqueous mixture may optionally be proceeded or followed by injection of other fluids, which may or may not include the carboxylates. Any of blocks 210, 215, or 220 may optionally be repeated one or more times.

In some examples, a sample of fluid from the subterranean reservoir may optionally be produced, such as using the injection well or another well. The sampled fluid may be tested to identify a concentration of the carboxylate in the subterranean reservoir, such as to identify or estimate an amount of sequestered carbon in the subterranean reservoir. In some cases, the concentration of the carboxylate in the injected aqueous mixture can be modified based on the identified or estimated amount of the sequestered carbon in the subterranean reservoir or the concentration of the carboxylate in the produced fluid.

Figure 3:
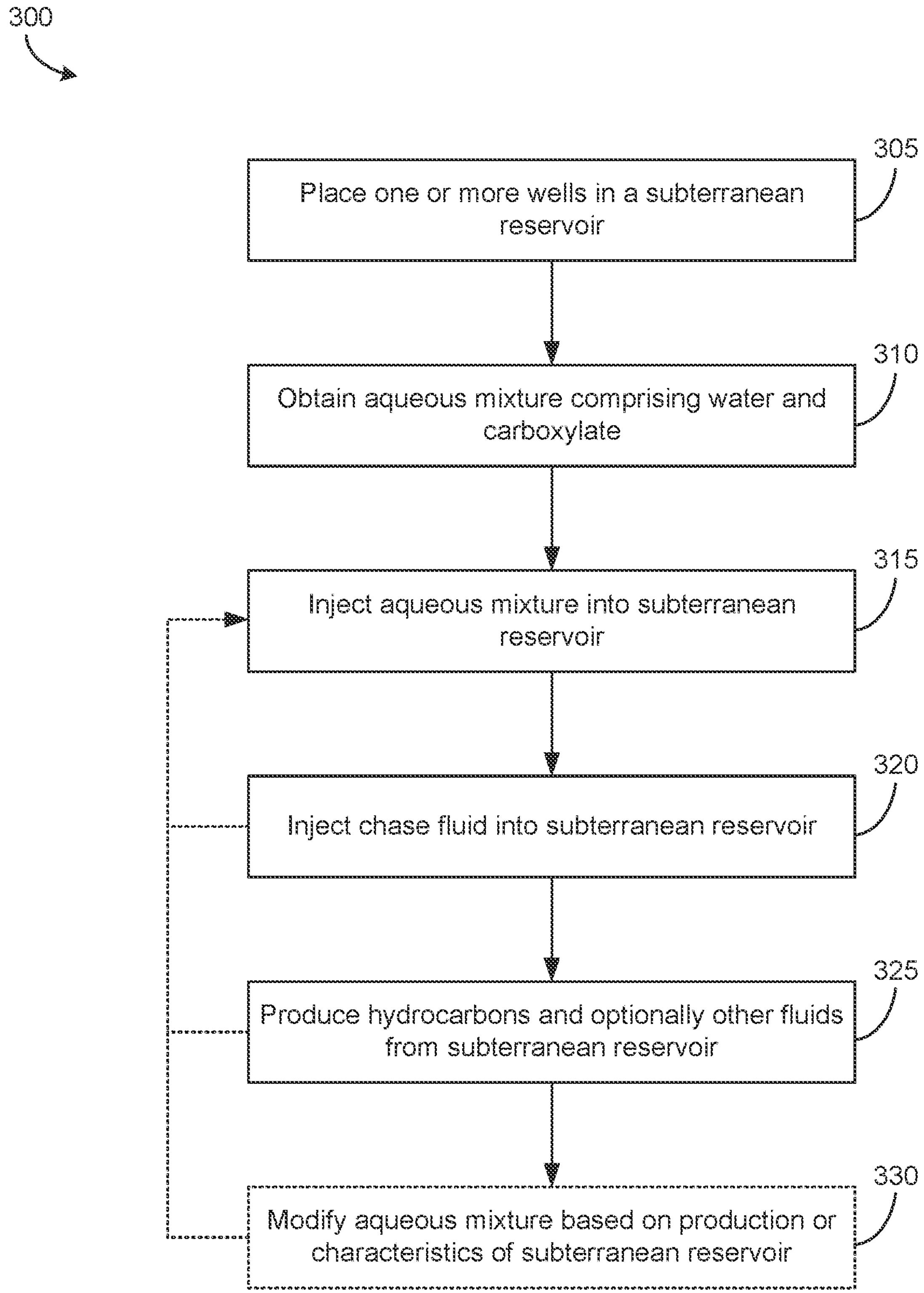
FIG. 3 provides an overview of an example hydrocarbon production method.

FIG. 3 provides an overview of an example method 300 for producing hydrocarbons from a subterranean reservoir. At block 305, one or more wells are placed in the subterranean reservoir. As noted above, the one or more wells may be independently used for injection of fluid into the subterranean reservoir and/or production of fluid from the subterranean reservoir. The wells may have any suitable dimensions, orientations, directions, etc. The one or more wells may comprise vertical wells, horizontal wells, or combinations thereof, for example. The wells may optionally be used to produce fluids, such as gases or liquids, directly from the subterranean reservoir, such as hydrocarbons, aqueous fluids optionally comprising the carboxylates, etc.

At block 310, the aqueous mixture including the carboxylate is obtained, such as by augmenting an aqueous fluid (e.g., brine previously produced from the reservoir or from another reservoir, or seawater, freshwater, aquifer water, etc.) with a carboxylate and any other additives to include (solvents, surfactants, etc.). Without limitation, the aqueous mixture may comprise fresh water, seawater, reservoir connate water, produced water, river water, pond water, or brine in addition to the carboxylates. The aqueous mixture may comprise a surfactant, a solvent, an acid, a base, a salt, an inorganic compound, a polymer, a chelating agent, an amino acid, a biocide, a nanomaterial, a hydrocarbon, nitrogen, or carbon dioxide in addition to the carboxylates.

At block 315, the aqueous mixture comprising one or more carboxylates is injected into the subterranean reservoir, such as via the one or more wells. The aqueous mixture may be continuously injected or may be injected semi-continuously or in one or more discrete injection processes. The injection of the aqueous mixture may optionally be proceeded or followed by injection of other fluids, which may or may not include the carboxylates, such as a chase fluid, as indicated at block 320. Injection of the aqueous mixture and a chase fluid may optionally be repeated one or more times.

At block 325, hydrocarbons are produced from the subterranean reservoir. Depending on the subterranean reservoir and/or configuration, the pressure within the subterranean reservoir may be sufficient to directly produce the hydrocarbons from the subterranean reservoir without requiring an artificial lift to draw the hydrocarbons up to the surface, but in some cases an artificial lifting system may be used. Depending on the production process employed, the injection of the aqueous mixture and production of hydrocarbon steps at blocks 315 and 325 may be repeated one or more times, such as in a cyclic injection process, with chase fluid injection process at block 320 optionally repeated.

At block 325, a non-hydrocarbon fluid may optionally be recovered from the subterranean reservoir. In some cases, it may be desirable to recover at least a portion of the injected aqueous mixture in order to recover some of the carboxylates or other additives in the aqueous mixture injected into the subterranean reservoir. Depending on the formation, however, recovery of these components may be feasible or infeasible. It will be appreciated that fluid production may occur during, after, or instead of production of hydrocarbons, for example.

At block 330, the aqueous mixture may optionally be modified so that a different aqueous mixture can be injected in a repeated injection step corresponding to block 315. For example, the production of hydrocarbons and/or fluids from the subterranean reservoir may provide information that is used to change the aqueous mixture, such as to use different carboxylates, change the carboxylate concentration, provide other or more or less additives (e.g., surfactants, acids, bases, etc.) in the aqueous mixture. In this way, the injection and production can be tailored based on real time feedback obtained during the production process.

FIG. 4 provides an overview of an example method 400 for storing hydrogen in a subterranean reservoir. At block 405, one or more wells are placed in the subterranean reservoir. As noted above, the one or more wells may be independently used for injection of fluid into the subterranean reservoir and/or production of fluid from the subterranean reservoir. The wells may have any suitable dimensions, orientations, directions, etc. The one or more wells may comprise vertical wells, horizontal wells, or combinations thereof, for example. The wells may optionally be used to produce fluids, such as gases or liquids, directly from the subterranean reservoir, such as hydrocarbons, aqueous fluids optionally comprising the carboxylates, etc.

At block 410, a carboxylate is prepared as a carrier for hydrogen and then mixed with an aqueous fluid to prepare the aqueous mixture. As noted above, the carboxylate can be prepared using any desirable technique. In some cases, a hydrogenation reaction of $CO_2$ may be used to prepare formic acid, and the formic acid can be mixed with water or brine, for example. Optionally, other additives may be included in the aqueous mixture, such as components serving to increase a solubility of the carboxylate in the mixture. Without limitation, the aqueous mixture may comprise fresh water, seawater, reservoir connate water, produced water, river water, pond water, or brine in addition to the carboxylates. The aqueous mixture may comprise a surfactant, a solvent, an acid, a base, a salt, an inorganic compound, a polymer, a chelating agent, an amino acid, a biocide, a nanomaterial, a hydrocarbon, nitrogen, or carbon dioxide in addition to the carboxylates, for example.

At block 415, the aqueous mixture comprising one or more carboxylates is injected into the subterranean reservoir, such as via the one or more wells. The aqueous mixture may be continuously injected or may be injected semi-continuously or in one or more discrete injection processes.

At block 420, a catalyst can optionally be injected into the subterranean reservoir, such as via the one or more wells. The catalyst can be or comprise a metal catalyst useful for aiding in dehydrogenation of the carboxylate to generate hydrogen gas in situ in the subterranean reservoir, for example. Optionally, the catalyst can comprise nano-catalysts. In some examples, the catalyst can be a pH modifier, which can aid in driving a reaction for evolution hydrogen.

At block 425, a fluid is produced from the subterranean reservoir. In the case of in situ hydrogen gas generation, the fluid may comprise hydrogen gas. Additionally or alternatively, the produced fluid may comprise the carboxylate. In some cases, it may be desirable to recover at least a portion of the injected aqueous mixture in order to recover some of the catalyst injected into the subterranean reservoir, though this aspect is optional. Depending on the formation, however, recovery of these components may be feasible or infeasible. Depending on the process employed, the injection of the aqueous mixture and production of fluid at blocks 415 and 425, and optionally the catalyst injection step at block 420, may be repeated one or more times.

At block 430, hydrogen gas can be optionally generated from the carboxylate in the fluid produced from the subterranean reservoir. As described above, the carboxylate can be subjected to a dehydrogenation reaction to produce hydrogen gas, such as in a reactor that is on site at the surface above the subterranean formation or at another location where the produced fluid is transported to.

At various points in the process, the aqueous mixture may optionally be modified so that a different aqueous mixture can be injected in a step corresponding to block 415. For example, the production of fluids from the subterranean reservoir may provide information that is used to change the aqueous mixture, such as to use different carboxylates, change the carboxylate concentration, provide other or more or less additives (e.g., surfactants, acids, bases, catalysts etc.). In this way, the hydrogen storage process can be tailored based on real time feedback obtained during the process.

The invention may be further understood by the following non-limiting examples.

Example 1: Effect of Formate Anion ($HCOO^-$) on the Contact Angle Change on Oil-Wet Shale Surfaces Experiments were performed to evaluate the ability of a solution containing formate anions to modify the wettability character of shale formations. In these experiments, samples of shale discs from Wolfcamp and Eagle Ford outcrops were used.

The discs of Wolfcamp and Eagle Ford shale outcrops were oil-aged to render the surfaces strongly oil-wet. The oil used for aging the shale surfaces was a crude oil (molecular weight 210 g/mol, saturates 71.6 wt. %, aromatics 24.8 wt. %, resins 3.4 wt. %, and asphaltene (n-pentane insoluble) 0.1 wt. %).

The oil-aged discs were submerged in a reservoir brine (RB) or 1 wt. % sodium formate in the reservoir brine at 74° C. The reservoir brine had a salinity of 68,722 ppm. Oil droplets were placed on the shale surfaces in reservoir brine (RB) or 1 wt. % sodium formate in the reservoir brine and the contact angles of the oil droplets were measured at day 0 (initial) and at day 3 (final). The oil used for the droplets was a crude oil (molecular weight 186 g/mol, density 822.5 $kg/m^3$ at 288.71 K, saturates 76.7 wt. %, aromatics 20.1 wt. %, resins 3.2 wt. %, and asphaltene (n-pentane insoluble) less than 0.1 wt. %).

Figure 5:
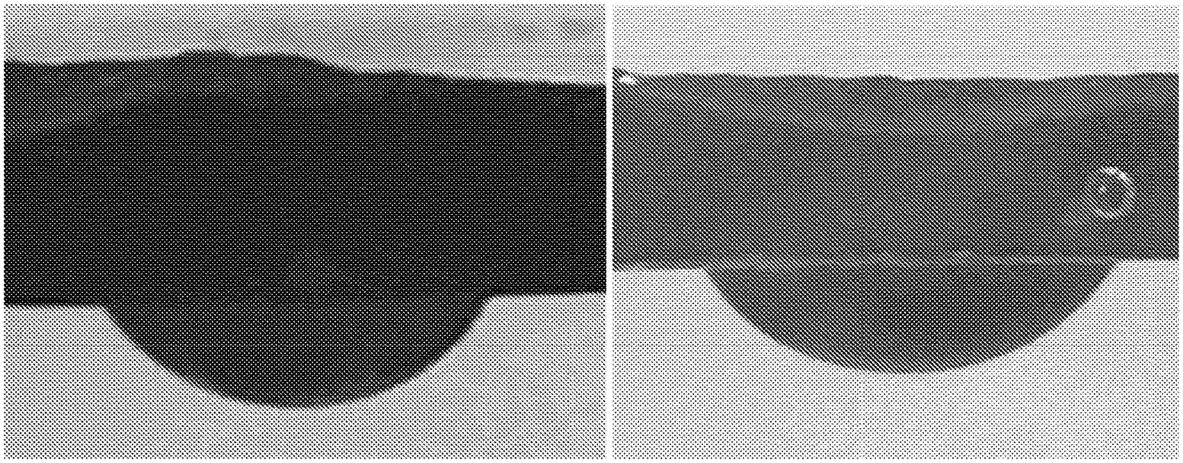
FIG. 5 provides photographs showing contact angle change over time for a Wolfcamp shale submersed in reservoir brine.
Figure 6:
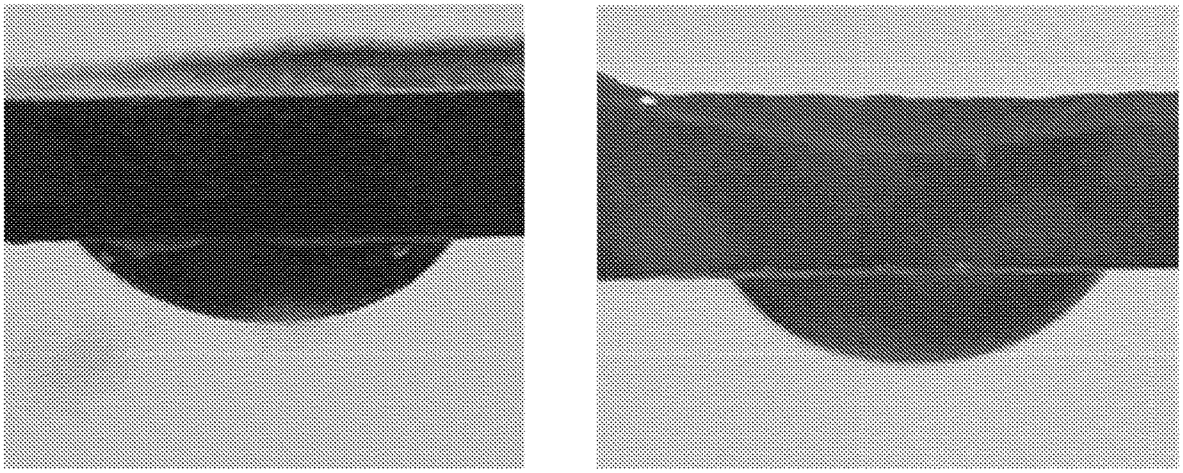
FIG. 6 provides photographs showing contact angle change over time for a Wolfcamp shale submersed in 1 wt. % sodium formate in reservoir brine.

Table 1 shows that 1 wt. % formate in formation brine is effective in only slightly reducing the contact angle of the Wolfcamp shale. The reservoir brine by itself did not significantly change the contact angle of the oil droplets on Wolfcamp shale (FIG. 5). However, the formate solution changed the contact angle from 134.27° to 121.15° within 3 days (FIG. 6).

TABLE 1

Summary of contact angle measurements on Wolfcamp shale surfaces in reservoir brine (68,722 ppm) and in 1 wt. % sodium formate in reservoir brine at 74° C.

| | Contact Angle/Degrees - Wolfcamp Shale | |
|---|---|---|
| Time/Day | Reservoir Brine | 1 wt. % Formate in Reservoir Brine |
| 0 | 126.83 | 134.27 |
| 3 | 126.64 | 121.15 |

Figure 8:
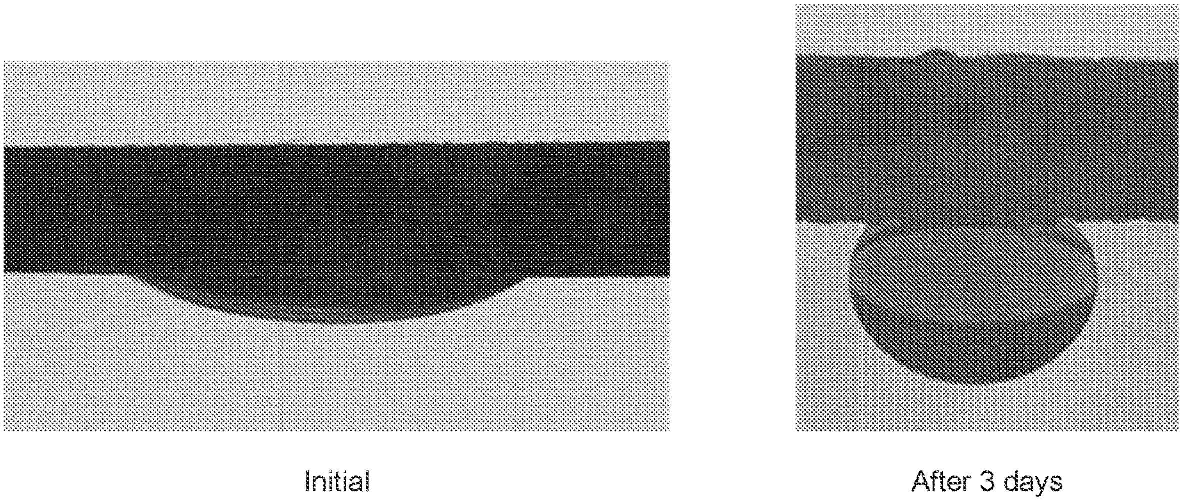
FIG. 8 provides photographs showing contact angle change over time for an Eagle Ford shale submersed in 1 wt. % sodium formate in reservoir brine.

Formate exhibited superior wettability alteration on Eagle Ford shale surfaces as compared to Wolfcamp surfaces, rendering the surface strongly water-wet within 3 days. See Table 2. The formation brine also reduced the contact angle of the oil droplets on Eagle Ford shale surfaces, but did not significantly modify the wettability character (FIG. 7). However, the formate solution made the Eagle Ford shale surfaces strongly water-wet; the contact angle changed from 148.02° to 45.57° within 3 days (FIG. 8).

TABLE 2

Summary of contact angle measurements on Eagle Ford shale surfaces in reservoir brine (68,722 ppm) and in 1 wt. % sodium formate in reservoir brine at 74° C.

| | Contact Angle/Degrees - Eagle Ford shale | |
|---|---|---|
| Time/Day | Reservoir Brine | 1 wt. % Formate in Reservoir Brine |
| 0 | 155.43 | 148.02 |
| 3 | 140.51 | 45.57 |

From the data above, it is clear that 1 wt. % sodium formate in reservoir brine at 74° C. is clearly capable of changing the Eagle Ford rock surfaces to water-wet in 3 days. However, 1 wt. % sodium formate in reservoir brine did not change the contact angle in Wolf Camp rock surfaces under the same conditions. This may be due to the differences mineralogy of the two reservoir rocks (Table 3).

TABLE 3

Mineral compositions of Wolf Camp and Eagle Ford Rocks.

| Mineral Composition (wt. %) | Wolfcamp | Eagle Ford |
|---|---|---|
| Quartz | 40 | 17 |
| Clays | 40 | 35 |
| Calcite | 4 | 40 |
| Dolomite | 2 | 1 |
| Feldspar | 7 | 3 |
| Pyrite | 7 | 4 |
| TOC | 5-6 | 6-6.5 |

Eagle Ford rocks having mostly calcite shows a rapid contact angle change to formate solution; whereas Wolf Camp rocks mostly quartz (silicates) are inert. Therefore, the favorable electrostatic interaction between formate anion and positively charged Eagle Ford rock surfaces may play a significant role in wettability change.

Example 2: Effect of Acetate Anion ($CH3COO^-$) on the Contact Angle Change on Oil-Wet Shale Surfaces Experiments were performed to evaluate the ability of a solution containing acetate anions to modify the wettability character of shale formations. In these experiments, samples of shale discs from Wolfcamp and Eagle Ford outcrops were used.

The discs of Wolfcamp and Eagle Ford shale outcrops were oil-aged to render the surfaces strongly oil-wet. The oil used for aging the shale surfaces was a crude oil (molecular weight 210 g/mol, saturates 71.6 wt. %, aromatics 24.8 wt. %, resins 3.4 wt. %, and asphaltene (n-pentane insoluble) 0.1 wt. %).

The oil-aged discs were submerged in a reservoir brine (RB) or 1 wt. % sodium acetate in the reservoir brine at 74° C. The reservoir brine had a salinity of 68, 722 ppm. Oil droplets were placed on the shale surfaces in reservoir brine (RB) or 1 wt. % sodium acetate in the reservoir brine and the contact angles of the oil droplets were measured at day 0 (initial) and at day 3 (final). The oil used for the droplets was a crude oil (molecular weight 186 g/mol, density 822.5 $kg/m^3$ at 288.71 K, saturates 76.7 wt. %, aromatics 20.1 wt. %, resins 3.2 wt. %, and asphaltene (n-pentane insoluble) less than 0.1 wt. %).

Figure 9:
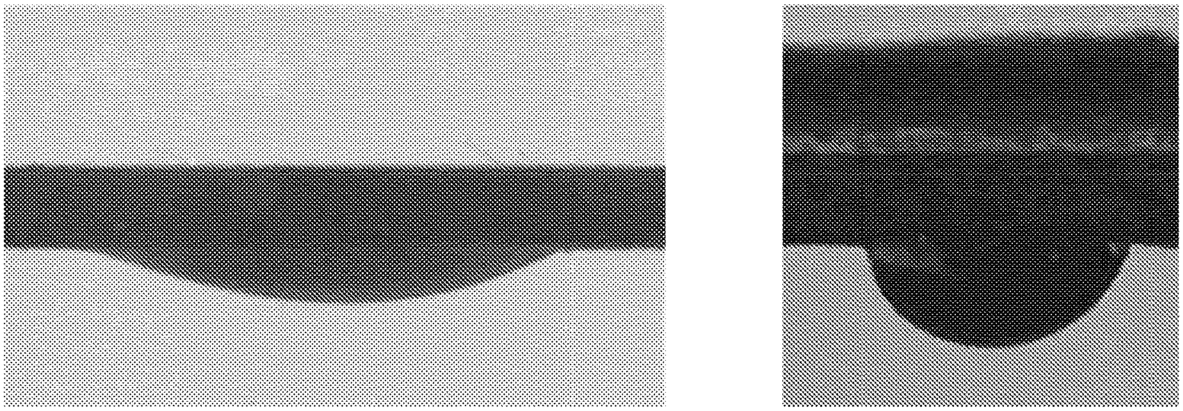
FIG. 9 provides photographs showing contact angle change over time for a Wolfcamp shale submersed in reservoir brine.
Figure 10:
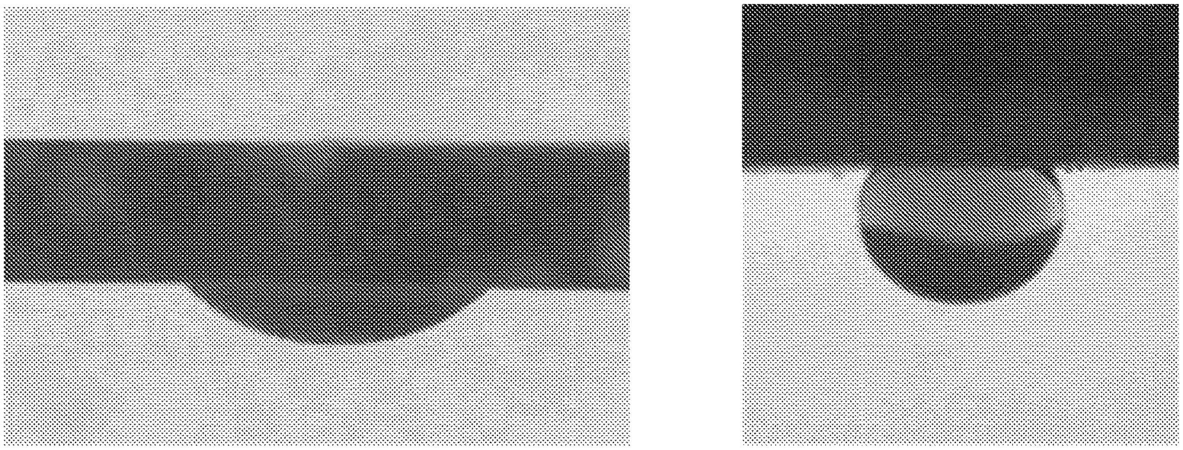
FIG. 10 provides photographs showing contact angle change over time for a Wolfcamp shale submersed in 1 wt. % sodium acetate in reservoir brine.

Table 4 shows that 1 wt. % acetate in formation brine is effective in significantly reducing the contact angle of the Wolfcamp shale and change the surface to strongly water-wet. The reservoir brine by itself reduced the contact angle of the oil droplets on Wolfcamp shale, but did not change a wettability character of the surface (FIG. 9). However, the acetate solution changed the contact angle significantly, from 134.08° to 45.06° within 3 days (FIG. 10).

TABLE 4

Summary of contact angle measurements on Wolfcamp shale surfaces in reservoir brine (68,722 ppm) and in 1 wt. % sodium acetate in reservoir brine at 74° C.

| | Contact Angle/Degrees - Wolfcamp Shale | |
|---|---|---|
| Time/Day | Reservoir Brine | 1 wt. % Acetate in Reservoir Brine |
| 0 | 154.44 | 134.08 |
| 3 | 110.75 | 45.06 |

Figure 11:
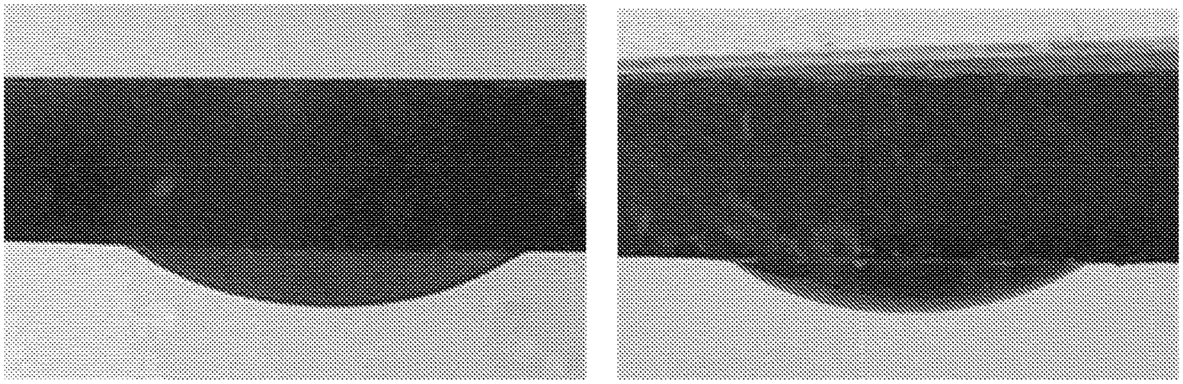
FIG. 11 provides photographs showing contact angle change over time for an Eagle Ford shale submersed in reservoir brine.
Figure 12:
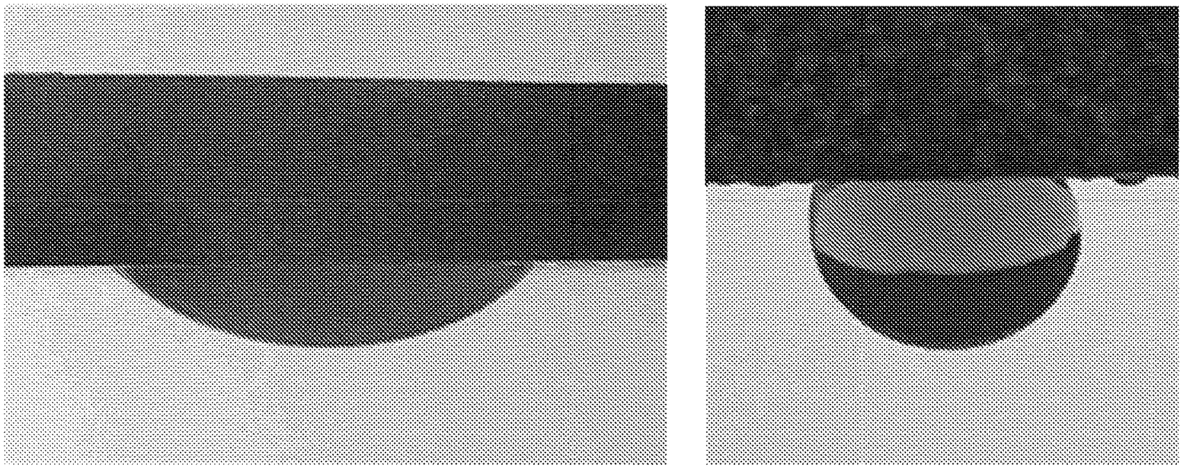
FIG. 12 provides photographs showing contact angle change over time for an Eagle Ford shale submersed in 1 wt. % sodium acetate in reservoir brine.

Acetate also exhibited superior wettability alteration on Eagle Ford shale surfaces, rendering the surface strongly water-wet within 3 days. See Table 5. The formation brine only minorly altered the contact angle of the oil droplets on Eagle Ford shale surfaces (FIG. 11). However, the acetate solution made the Eagle Ford shale surfaces strongly water-wet; the contact angle changed from 148.02° to 45.57° within 3 days (FIG. 12).

TABLE 5

Summary of contact angle measurements on Eagle Ford shale surfaces in reservoir brine (68,722 ppm) and in 1 wt. % sodium acetate in reservoir brine at 74° C.

| | Contact Angle/Degrees - Eagle Ford shale | |
|---|---|---|
| Time/Day | Reservoir Brine | 1 wt. % Acetate in Reservoir Brine |
| 0 | 148.91 | 139.96 |
| 3 | 146.26 | 43.83 |

From the data above, it is clear that 1 wt. % sodium acetate in reservoir brine at 74° C. is capable of changing the Wolf Camp and Eagle Ford rock surfaces to water-wet in 3 days. Unlike, for the experiments with formate, the wettability changing characteristics of acetate was found to be independent of the mineral composition of the shale rock sample.

Example 3: Simulation Case Studies of Aqueous Formate Solution for Geological Carbon Storage Carbon storage in geologic formations has been considered an important technology that reduces the carbon intensity of industrial processes based on fossil fuels. Carbon capture and storage (CCS) conventionally uses high-pressure carbon dioxide ($CO_2$) as a carbon carrier. However, various shortcomings of the conventional CCS are related to the physical properties of $CO_2$, such as low carbon density at low to moderate pressure, low mass density, low viscosity, immiscibility with water, and corrosivity. In particular, $CO_2$ injection often results in inefficient use of pore space in the formation under geophysical heterogeneities.

This Example presents case studies of using aqueous formate solution as carbon-bearing water for geological carbon storage. Properties of formate solutions in brine were measured, such as solubilities, densities, and viscosities. Experimental results showed that the formate solubility in 102,600-ppm $NaCl+CaCl_2$) brine ranged from 30 wt % to 35 wt % between 25 and 75° C. Viscosities of 30 wt % formate solutions in the brine were approximately 12 cp at 25° C., 5 cp at 50° C., and 3 cp at 75° C. with Newtonian behavior.

Numerical reservoir simulations were performed for two cases: case study 1 for an aquifer and case study 2 for an oil reservoir. Simulation results consistently showed that the formate injection case resulted in more stable fronts of oil and water displacement. The more stable fronts yielded the oil recovery and carbon storage that were insensitive to the injectant breakthrough. This is a substantial advantage of using formate as a carbon carrier for controlling the risk of CCS associated with the permeability heterogeneities and their impact on the subsurface flow regime.

Introduction. The Intergovernmental Panel on Climate Change in their sixth assessment report stated that the global warming threshold of 2° C. would be exceeded before the end of the 21 st century without large-scale reductions in carbon dioxide ($CO_2$) emissions (IPCC, 2021). Carbon storage in geologic formations has been identified as an important technology to keep the sustainable growth of countries. Oil reservoirs and deep saline aquifers are the most attractive formations because the large storage capacities are estimated for these formations based on the available data from previous injection projects.

Current carbon storage processes involve the compression of captured $CO_2$ into supercritical $CO_2$, which has a liquid-like density, but a gas-like viscosity. The challenges involved with carbon storage include the following: a) the substantial cost associated with the anthropogenic-$CO_2$ capture, compression, transport, and recycling after $CO_2$ breakthrough at production wells; b) subsurface fluid flow problems leading to inefficient use of pore space (volumetric sweep and local displacement efficiency) owing to the low mass density and viscosity in the multiphase displacements of oil and water by $CO_2$ in heterogeneous media; c) the corrosivity of $CO_2$; d) possible leakage of $CO_2$ through unexpected hydraulic paths to the surface. These problems are closely related to the physical properties of $CO_2$.

This Example is concerned with the novel idea of using a formate solution as an aqueous carbon carrier for geological carbon storage. Formate (HCOO—) is the simplest member of the carboxylate group and the conjugate base for formic acid. Formate can be formed from the electrochemical reduction (ECR) of $CO_2$. The electrochemical conversion of $CO_2$ into other useful products has been gaining traction because of the need to reduce carbon emissions. Formate/formic acid is a high-value product from $CO_2$ ECR. Upscaling of the formate production process has been limited by the mass transport of $CO_2$ in aqueous electrolytes at ambient pressure and temperature. However, studies on the $CO_2$ ECR into formate showed that using gas diffusion electrodes greatly improve the mass transfer process and presented a possibility of industrial scaling of the $CO_2$ ECR into formate.

Studies show that a formate solution can improve oil recovery by altering the wettability of a carbonate rock from oil-wet to water-wet with a slight pH adjustment. Studies on formate brine as base fluids for drilling mud show that formate salts have favorable health, safety, and environmental (HSE) profiles and have good compatibility with oilfield equipment. This Example presents the use of an aqueous formate solution as a carbon carrier through two case studies: one for carbon storage in an aquifer and the other for enhanced oil recovery (EOR) and carbon storage in an oil reservoir. This Example also reports new experimental data on solubility, density, and viscosity of sodium formate solutions in brines, which set the basis for the numerical flow simulations in this research.

Measurement of Formate Solution Properties. Since the properties of formation solutions are relatively scarce in the literature, this Example measured new data on solubilities of formate species in brines, and viscosities and densities of formate solutions as part of this research. The results were used to set up numerical flow simulations for the case studies to be presented below.

Materials and Methods. Sodium formate, sodium chloride, and calcium chloride dihydrate salts (all in a purity greater than 99%) were used in the preparation of brines and formate solutions used in this research. The weighing balance used for mass measurements had an accuracy of ±0.0001 g. All the experiments were done under atmospheric pressure.

Figure 13:
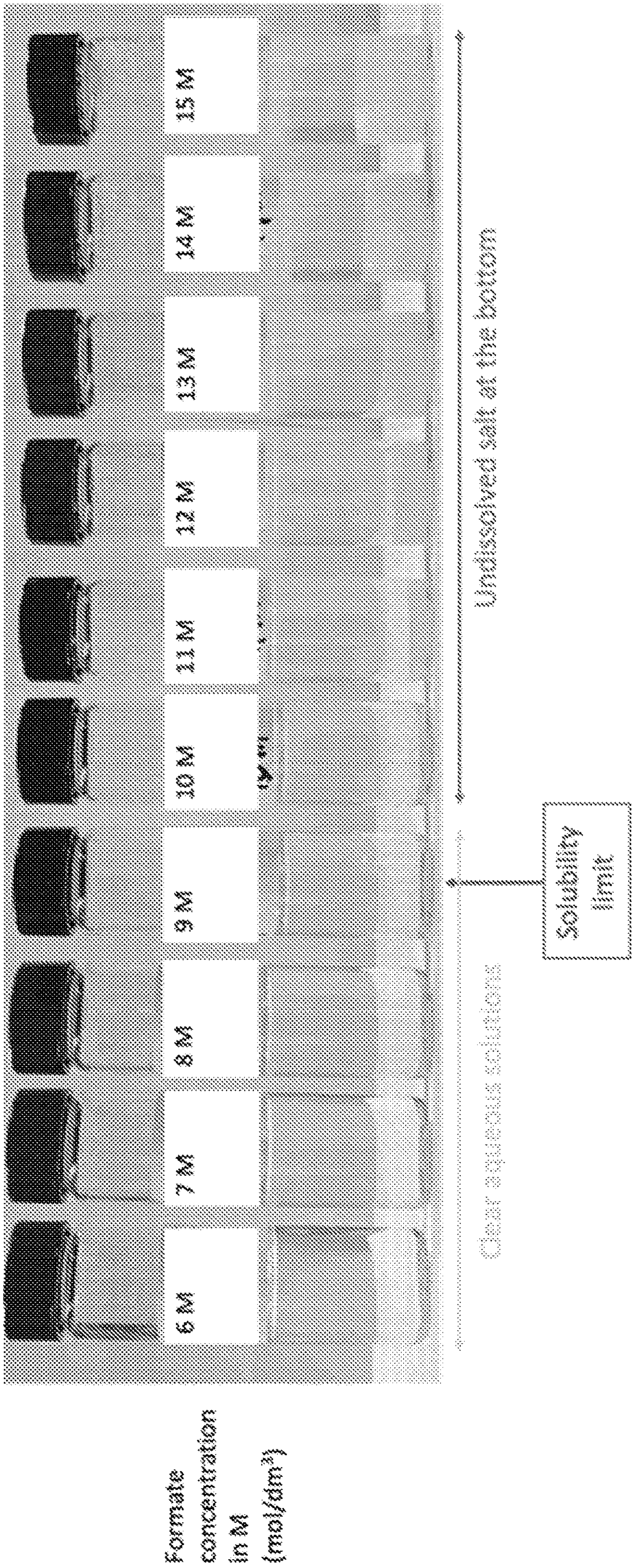
FIG. 13 provides photographs of sodium formate solutions in deionized water.

Solubility of sodium formate in deionized water (DIW). The solubility of sodium formate in DIW was determined by preparing aqueous formate solutions of different molarities, allowing them to equilibrate, and observing the maximum molarity at which there were no undissolved salts. FIG. 13 shows prepared sodium formate solutions with different molarities at 25° C. Formic acid was added to the solutions to adjust the pH to 7. The solubility experiments were done at 25, 50, and 75° C.

The concentrations of formic acid added to the solutions were calculated using the Henderson-Hasselbalch equation, $$\mathrm{pH} = pKa + \log_{10}\frac{[A^-]}{[HA]},$$

where Kα is the acid dissociation constant, pKα is the negative logarithm of Kα (pKα=−log 10Kα), [HA] is the molar concentration of acid, and [A] is the molar concentration of the conjugate base. The acid dissociation constants at 50 and 75° C. were calculated based on a reported model.

Solubility of Sodium Formate in NaCl+$CaCl_2$ brine. To determine the solubility of sodium formate in brine, sodium formate was dissolved in NaCl+$CaCl_2$) brine (97,897 ppm NaCl and 4,749 ppm $CaCl_2$)). Several solutions of sodium formate in the brine were made, each with different weight fractions of sodium formate. The solutions were allowed to equilibrate and the solution with the highest weight fraction of sodium formate added without undissolved salt was recorded, after the initial and fine screening. This experiment was done at 25, 50, and 75° C. The pH values of the solutions were adjusted by adding formic acid as described previously.

This particular brine containing NaCl and $CaCl_2$) was used since it is common to have divalent cations in formation brine. The addition of $CaCl_2$) was to include the effect of divalent cations without exploring a large number of possible brine compositions for formation brine. A separate research project is necessary to develop a database of formate solution properties in brines.

Viscosity Measurements. The viscosities of solutions of different concentrations of sodium formate in the brine (97,897 ppm NaCl and 4,749 ppm $CaCl_2$)) were measured using a TA Ares LS-1 rheometer coupled with a circulating bath for temperature control. A double wall couette geometry was used for the measurement. The viscosity measurements were taken at 25, 50, and 75° C. The sodium formate solutions were prepared and allowed to equilibrate in an oven set at the target temperature.

For viscosity measurements at 50 and 75° C., the temperature of the holding cup was raised to the target temperature using the circulating bath before putting the solution into the rheometer's sample holding cup. This was done to avoid precipitation of dissolved salts in samples with a high concentration of formate (e.g., >30 wt %), which might happen because of a reduced solubility of sodium formate at lower temperature.

Experimental Results. This section reports the formate ion (HCOO—) concentrations in the solutions measured in this Example. Note that the formate weight fraction/percentage is different from sodium formate (HCOONa) weight fraction in solution. Also, note that each mole of $HCOO^-$ contains one mole of carbon, and the molar mass of $HCOO^-$ is similar to that of $CO_2$ (45.018 and 44.01 g/mol respectively); therefore, the solubility values of formate are close to the mass fractions of $CO_2$ held in aqueous form.

Table 6 shows the solubility values of sodium formate in DIW; the solubility of formate in DIW increased with increasing temperature, from 31.5 wt % at 25° C. to 36.77 wt % at 75° ° C. The formate solubility measured at 25° C. was close to the report results of 32.2 wt %.

Brines found in geologic formations are often highly saline. Sodium formate was dissolved in brine (salt composition: 97,897 ppm NaCl and 4,749 ppm $CaCl_2$)) at 25, 50, and 75° ° C. to determine the solubility at these temperatures and to see if the solution remains single-phase without any precipitation. Table 7 shows the solubility of sodium formate in the brine at 25, 50, and 75° C. The solubility of formate in the brine ranged from 29.6 wt % at 25° C. to 34.8 wt % at 75° C.

Figure 14:
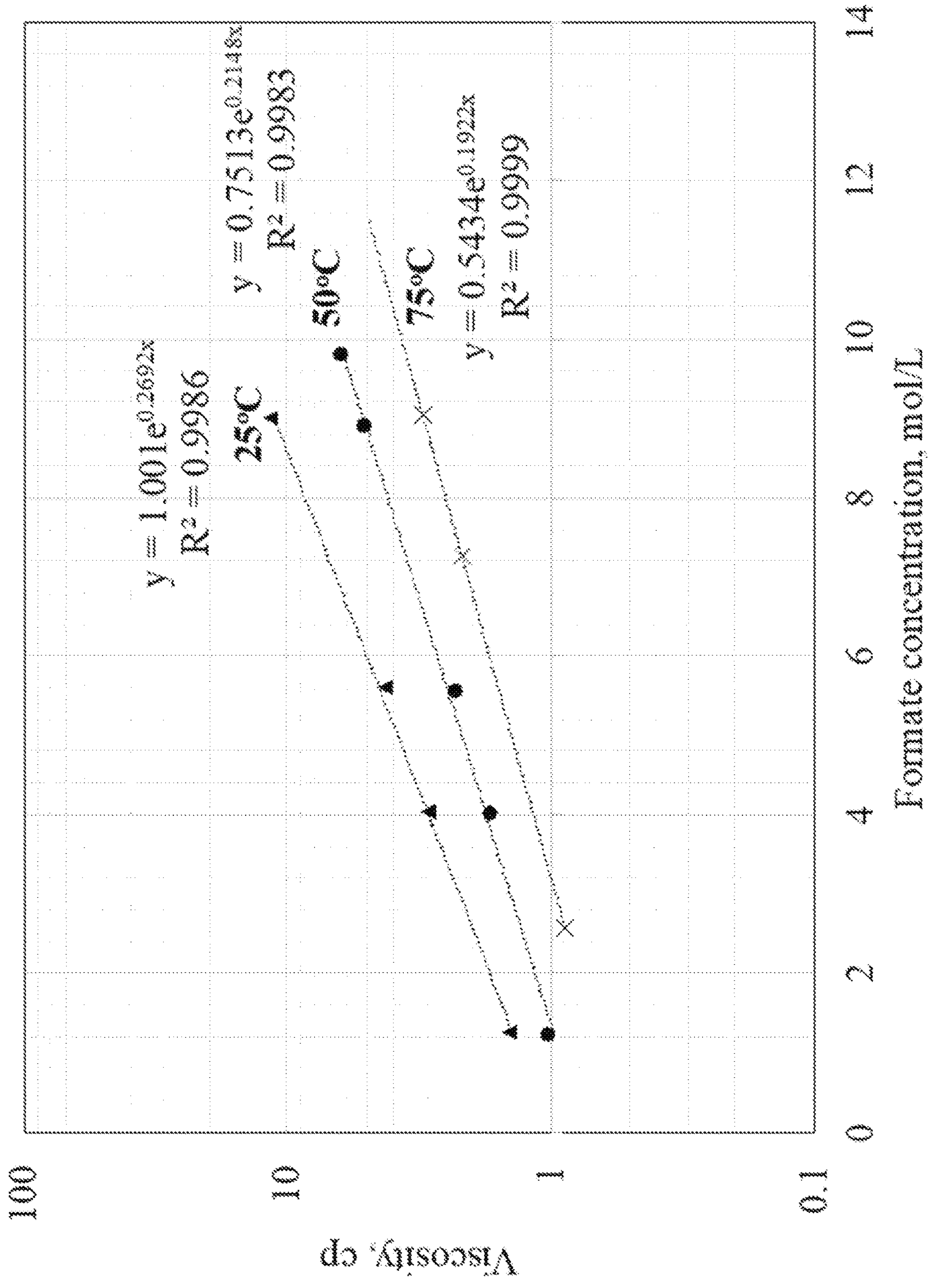
FIG. 14 provides a plot showing viscosities of formate solutions in brine at 25, 50 and 75° C.

Newtonian behavior was consistently observed through the viscosity measurements of different solutions of sodium formate in the brine at 25, 50, and 75° C. over a wide range of shear rates. The viscosity of the formate solutions increased with increasing formate concentration, and a linear trend was observed when viscosity was plotted against the molar concentration of formate on a semi-log scale as shown in FIG. 14 at 25, 50, and 75° C. The densities and viscosities of sodium formate in the NaCl+$CaCl_2$) brine at 25, 50, and 75° C. are provided in Tables 8, 9, and 10. As a reference, a reported viscosity of near-saturated 45% (% w/w) sodium formate in water is 9.5 cp at 20° C., showing that adding formate to water increased the solution viscosity.

Numerical Simulation Case Studies. Injection of high-pressure $CO_2$ into hydrocarbon reservoirs and saline aquifers has been studied and implemented commercially for reducing the carbon intensity of industrial processes based on fossil fuels. The central question in this research is whether aqueous formate injection can be a viable option for geological carbon storage that improves the various issues associated with $CO_2$ injection.

The cost of capturing and storing $CO_2$ is one of the barriers to the global deployment of large-scale carbon capture and storage operations. For the formate injection scenario, the cost of $CO_2$ ECR into formate may be important. Therefore, an objective of simulation case studies is to calculate the cost for the ECR process, but this is not considered in this Example The case studies are based on numerical flow simulations of $CO_2$ injection and 30 wt % formate solution injection for two scenarios of geological carbon storage in a saline aquifer and an oil reservoir. The simulations are performed by using a multiphase compositional flow simulator, CMG GEM (Computer Modelling Group 2018). Experimental data presented above were used as part of the simulation input.

Case Study 1: Saline Aquifer. Numerical Flow Simulation.

Figure 15:
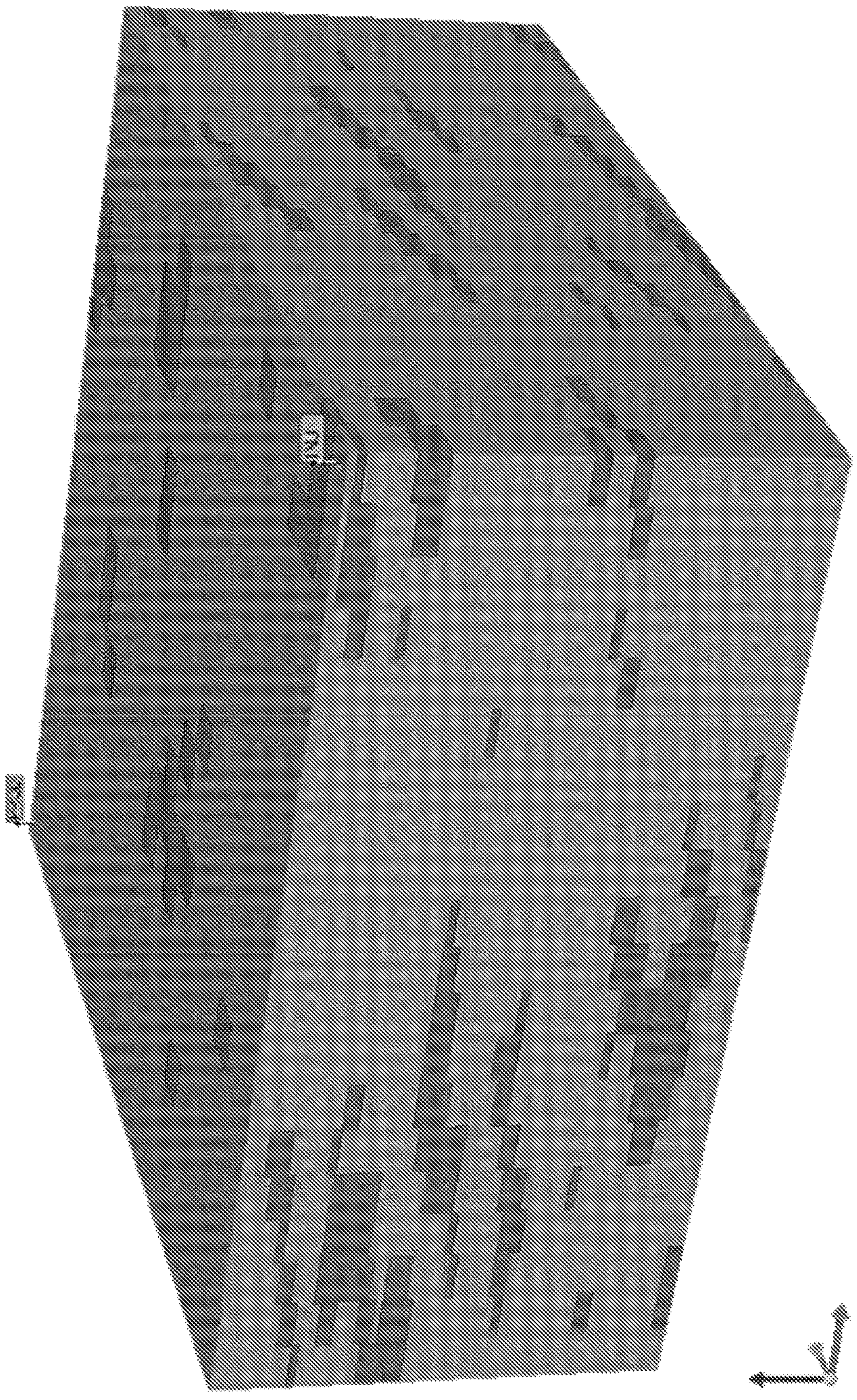
FIG. 15 provides an illustration of a 3D aquifer model with two facies, sand facies and shale facies.

The simulation of carbon storage in an aquifer was based on a 3-D heterogeneous reservoir model. The model used was one of the stochastic realizations using sequential indicator simulation to represent two lithofacies (85 volume % clean sand and 15 volume % shale barriers) with each facies being homogenous and isotropic. The model has dimensions of 183×183×27 $m^3$ (600×600× 90 $ft^3$) with a uniform gridblock size of 9×9×0.5 $m^3$ (30× 30×1.5 $ft^3$) giving a total of 24,000 gridblocks. FIG. 15 shows the facies distribution of the 3-D aquifer model.

Figure 16A:
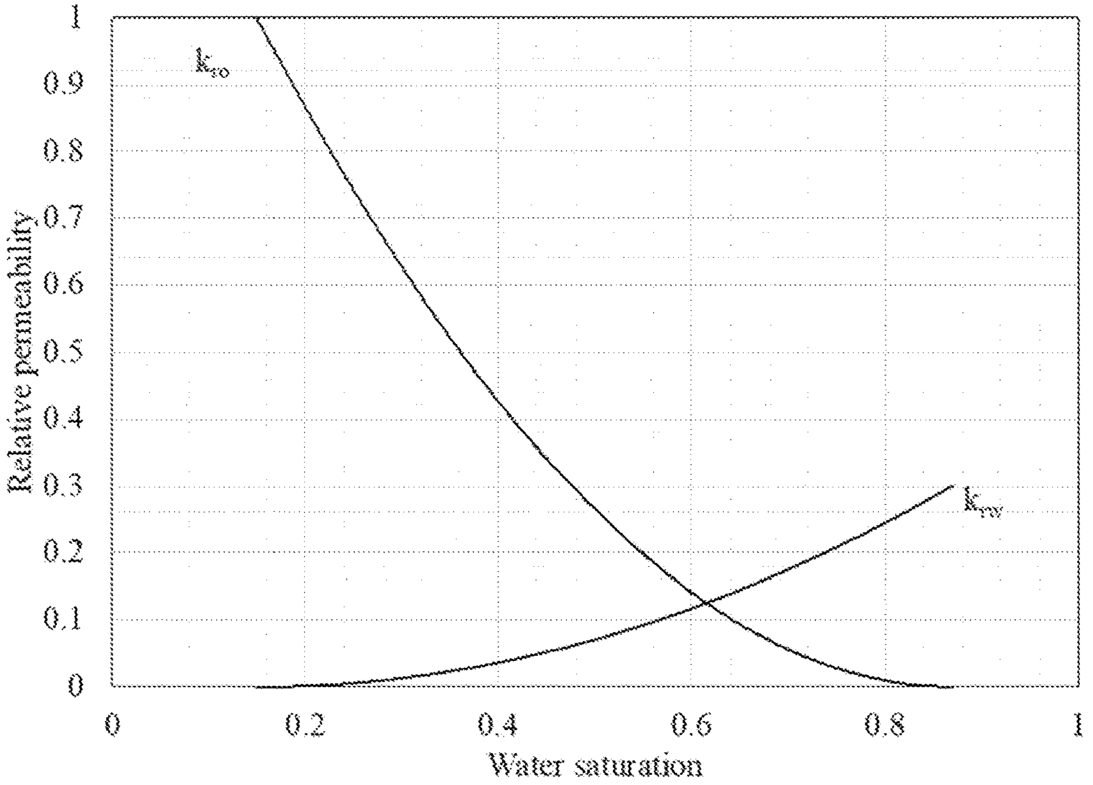
FIG. 16A provides a plot showing water-oil relative permeability curves.

Table 11 gives the aquifer model properties. Both cases ($CO_2$ and aqueous formate solution) assumed a constant rate of carbon injection of 114 kmol of carbon (equivalent to 5 tonnes of $CO_2$) per day. The reservoir pressure was controlled using a producer well, set to a pressure of 8963 kPa (1300 psia). FIG. 16A shows the relative permeability curves (only the one for water and gas was used in the simulations in this section).

The main difference between the $CO_2$ and formate cases lies in flow regime. In the $CO_2$ case, the injected $CO_2$ displaced the formation brine under the two-phase flow of gas and water with unstable displacement fronts and strong buoyant forces.

The stability of displacement fronts is typically evaluated by the endpoint mobility ratio ($M^0$) defined as $$M^0 = (k_{rj}^0/\mu_j)/(k_{ri}^0/\mu_i)$$

where $k_{ri}^0$ and $k_{rj}^0$ are the endpoint relative permeabilities of the displaced and displacing fluids, respectively. $\mu_i$ and $\mu_j$ are the viscosities of the displaced and displacing fluids, respectively. $M^0$ greater than unity is considered unfavorable in that such displacement fronts tend to be unstable. $M^0$ for the $CO_2$ case is calculated to be 6.4, in which i is the water phase and j is the gas phase. Since the formation brine and the formate solution are miscible, $M^0$ for the formate case reduces to the viscosity ratio, $\mu_i/\mu_j$, where $\mu_i$ and $\mu_j$ are the viscosities of the formation brine and the injected formate solution, respectively. That is, the viscosity ratio for the formate case is 0.13.

The gravity forces in the displacement can be measured by the density number ($N_d$) defined as $$N_d = (\rho_j - \rho_i)/\rho_i$$

where $\rho_i$ and $\rho_j$ are the mass densities of the displaced and displacing fluids, respectively. A negative value of $N_d$ correlates with gravity override. $N_d$ is −0.6 for the $CO_2$ injection case and 0.4 for the formate injection case. The density at the initial reservoir conditions is 0.4 g/$cm^3$ for $CO_2$, 1.0 g/$cm^3$ for formation water, and 1.4 g/$cm^3$ for the 30 wt % formate solution.

The numerical simulation was performed for a simulated period of 34 years for the $CO_2$ and formate injection cases. FIG. 17A, FIG. 17B, FIG. 17C, and FIG. 17D show the profiles of gas saturation for the $CO_2$ case and the profiles of formate mole fraction in the aqueous phase for the formate case. The $CO_2$ case resulted in the gravity-dominant flow regime, in which the injected $CO_2$ accumulated from the top of the formation and displaced formation water with the immiscible gaseous $CO_2$ phase in the gravity-stable direction. The gravity-dominant flow regime was so strong that the displacement of water by $CO_2$, although immiscible, was not affected by the geological heterogeneity in the reservoir model used. The accumulation of $CO_2$ near the top of the formation indicates the potential leakage of gaseous $CO_2$ through hydraulic paths along any faults and wells to the surface.

The formate concentration profiles in FIGS. 17A-17D indicate the effects of the positive $N_d$ and the geological heterogeneity on the flow regime. However, the miscible displacement with a favorable viscosity ratio made the displacement fronts stable in the formate injection case.

Figure 18:
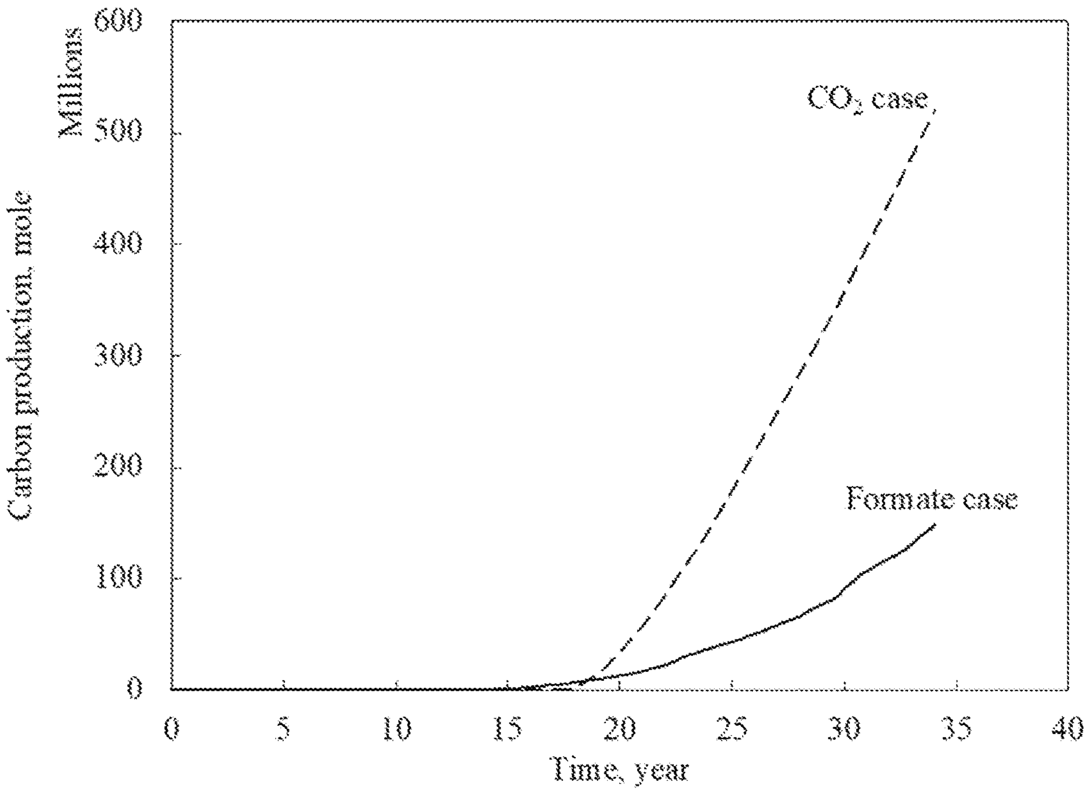
FIG. 18 provides a plot showing cumulative $CO_2$ and formate production from an aquifer.
Figure 19:
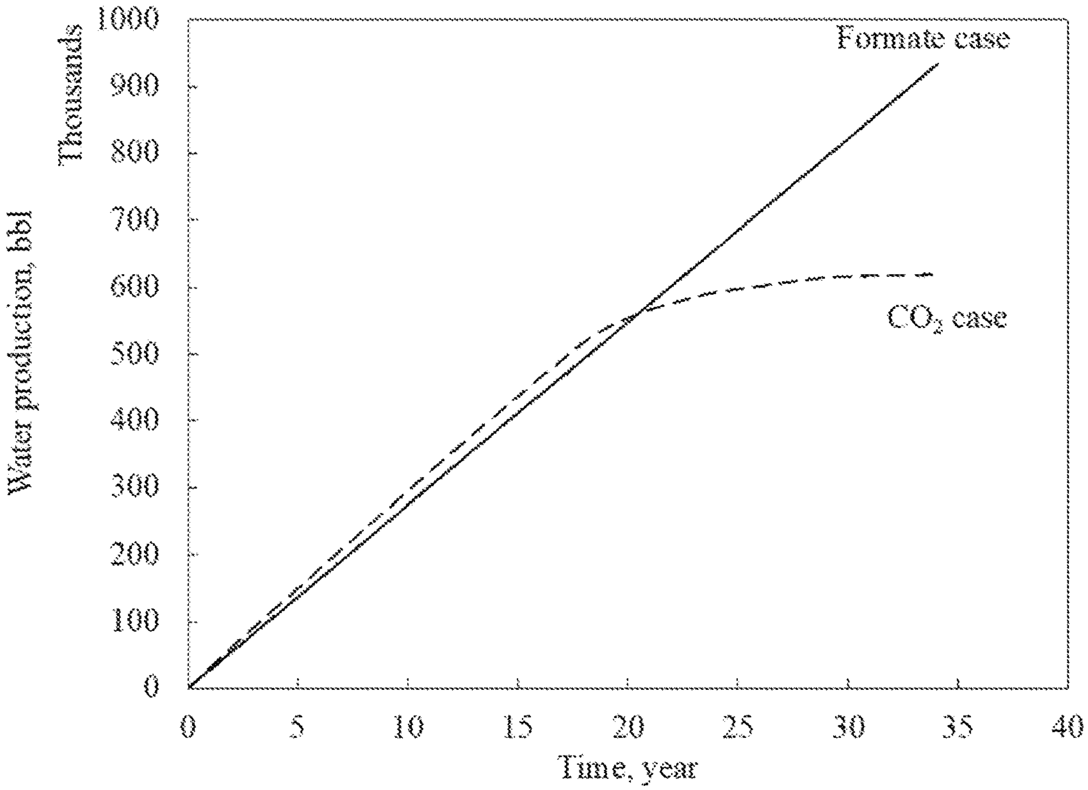
FIG. 19 provides a plot showing cumulative water production from an aquifer.
Figure 20:
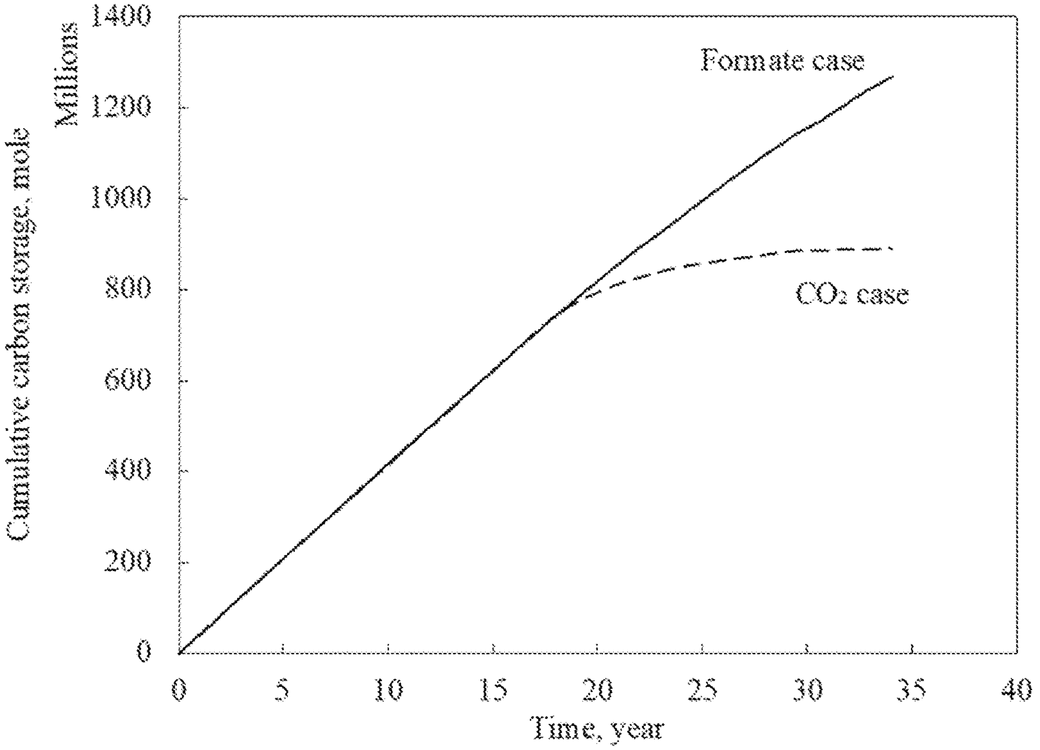
FIG. 20 provides a plot showing cumulative moles of injectant stored in an aquiver.

FIG. 18, FIG. 19, and FIG. 20 respectively show the injectant ($CO_2$ or formate) production, cumulative water production, and cumulative carbon storage from the simulation. Each of $CO_2$ and formate contains one mole of carbon; hence, they are comparable on a carbon-mole basis. The $CO_2$ injection case exhibited the $CO_2$ breakthrough at 18 years (FIG. 18). FIGS. 19 and 20 show that the water production and carbon storage leveled off upon the $CO_2$ breakthrough, resulting in a rapid reduction in the carbon-storage efficiency.

The favorable viscosity ratio in the miscible displacement in the formate injection case resulted in the water production (FIG. 19) that was not affected by the formate breakthrough at the producer. The carbon storage continued after the breakthrough in the formate case (FIG. 20). After 34 years of injection, the formate case resulted in 42% greater carbon stored (in moles) than the $CO_2$ case. The main difference between the two cases came from the carbon storage efficiency after the injectant's breakthrough.

This simulation case did not include the solubility of $CO_2$ in formation water and the subsequent geochemical reactions and diffusion of carbon species in the aqueous phase. These factors can affect carbon storage on a longer time scale. Also, optimization of carbon storage for this case is possible with the elevations for the perforation zones of the injector and the producer. However, a useful point to be made in this case study was the continued carbon storage even after the breakthrough in the formate injection case. The insensitivity of carbon storage to the breakthrough is expected to make the design of the geological carbon storage more robust under various uncertainties of geological formations.

Case Study 2: Oil Reservoir (FOR and Carbon Storage).

The IEA reported that the injection of $CO_2$ for enhanced oil recovery ($CO_2$ EOR) is the second-largest use of $CO_2$. This subsection compares the $CO_2$ injection and formate injection cases in an oil reservoir.

Numerical Flow Simulation.

Figure 21:
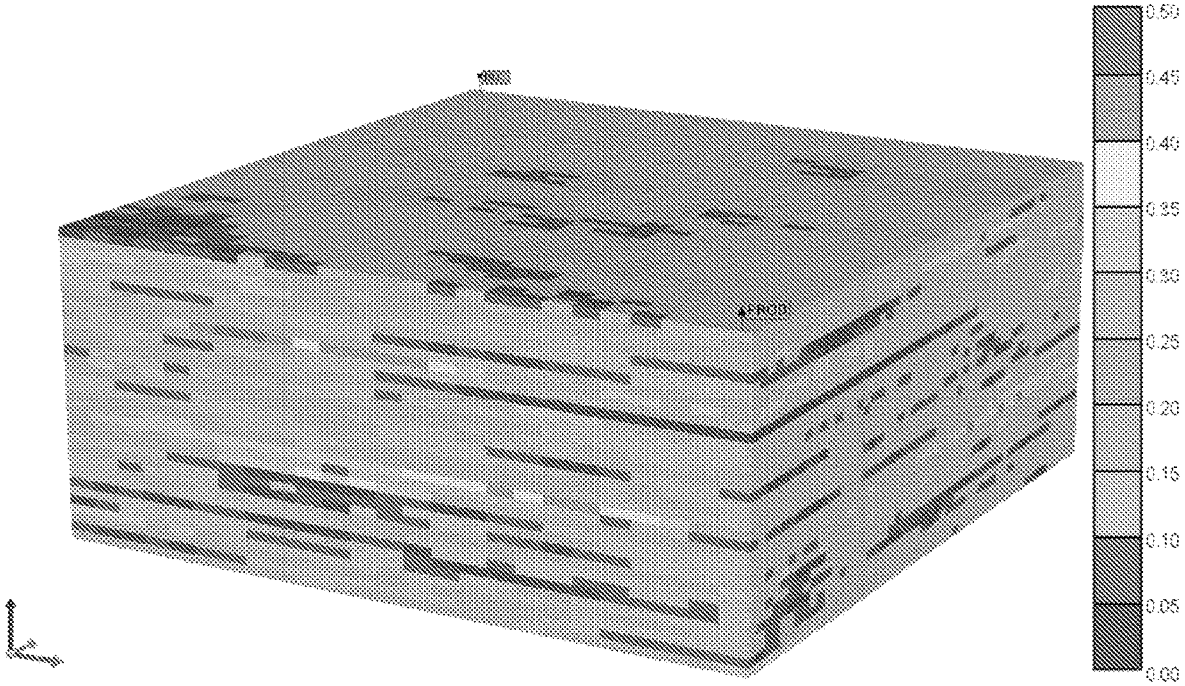
FIG. 21 provides an illustration of a 3D view of a reservoir's porosity distribution.
Figure 22A:
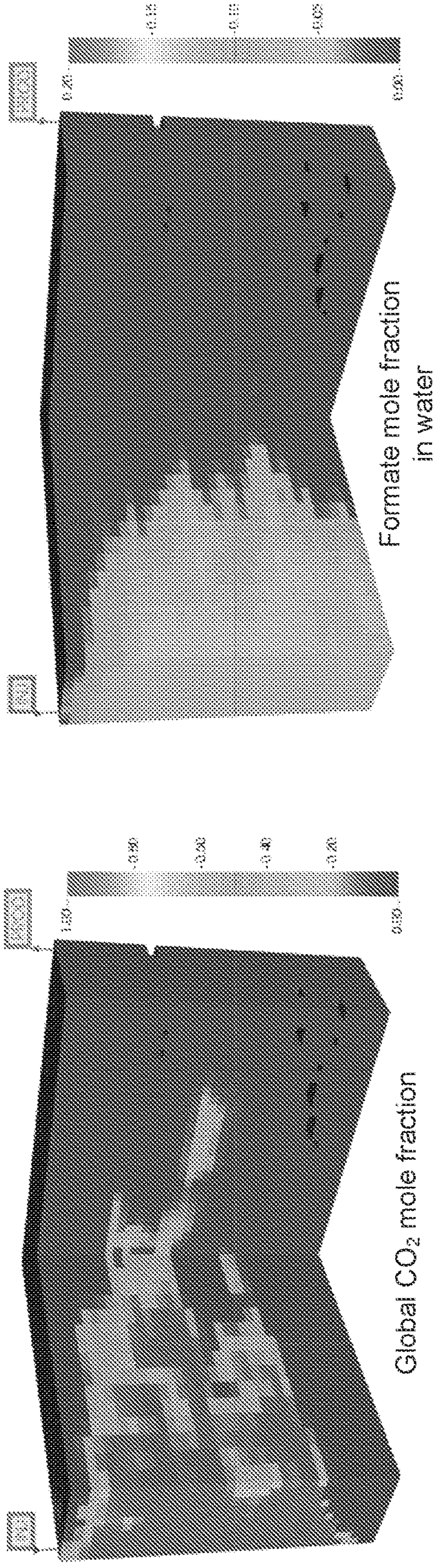
FIG. 22A, FIG. 22B, FIG. 22C, and FIG. 22 provide profiles of $CO_2$ and formate at different times.
Figure 22B:
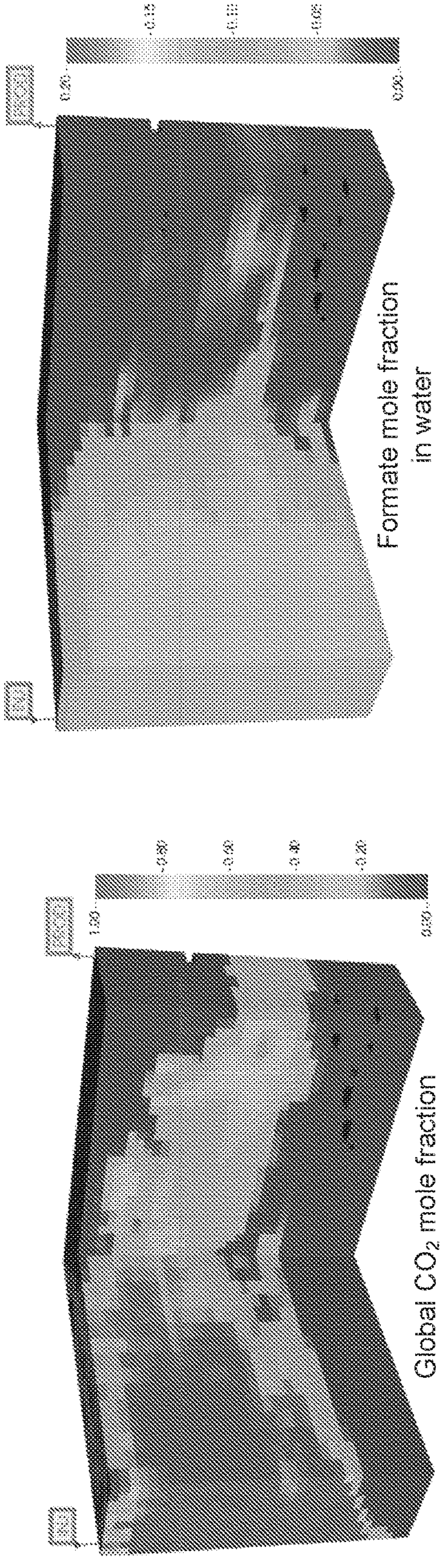
Figure 22C:
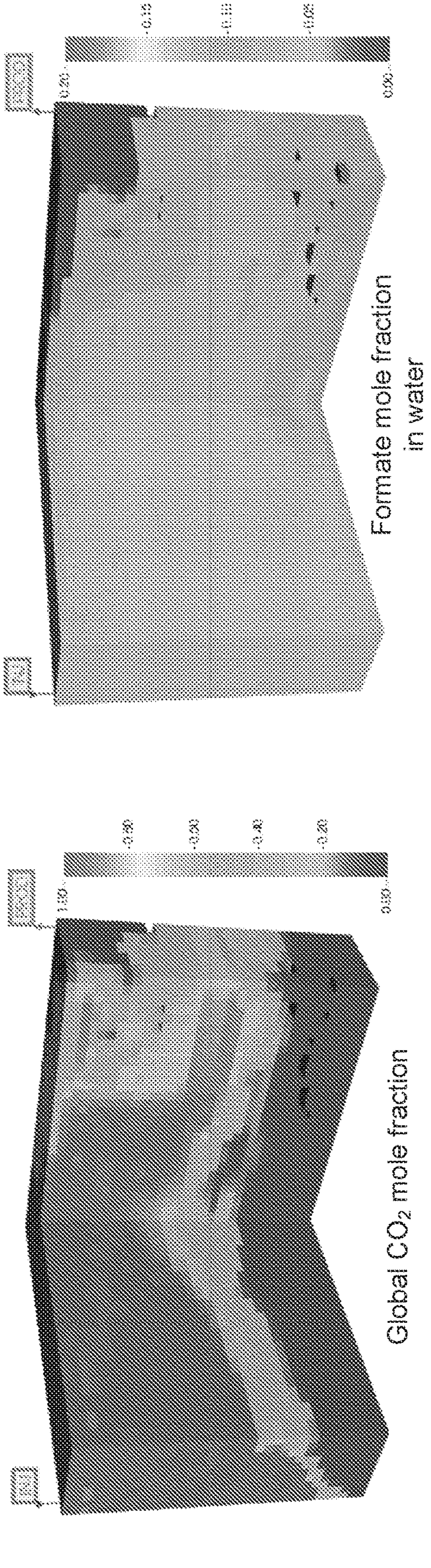
Figure 22D:
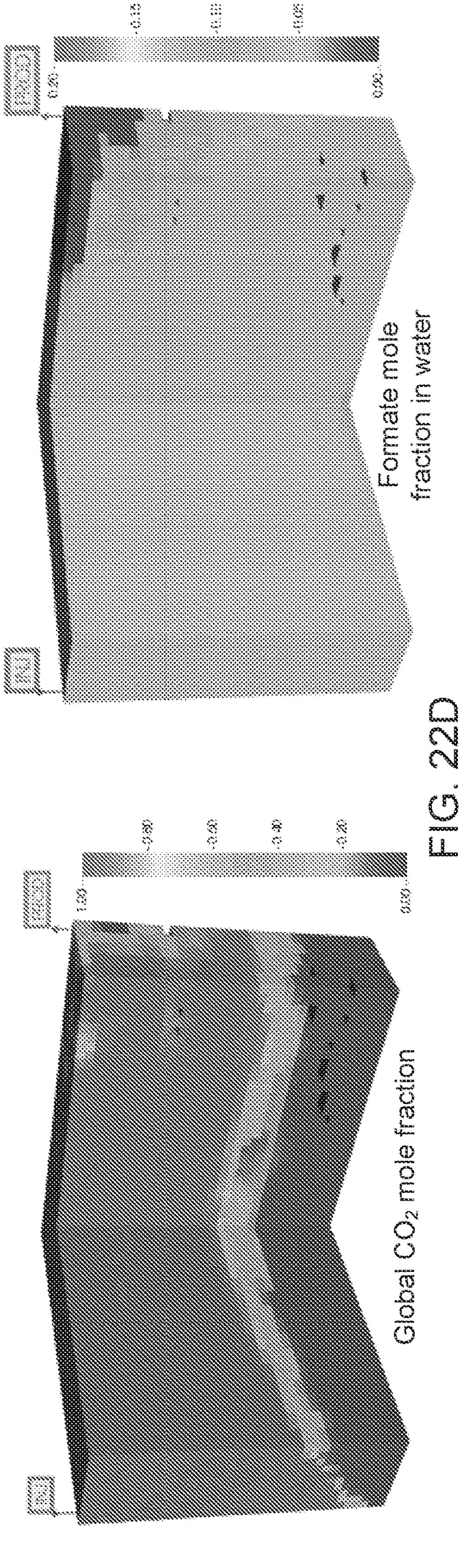

The reservoir model was based on a heterogeneous sandstone reservoir model from the tenth SPE comparative solution project. The original model had dimensions 366× 671×52 $m^3$ (1200×2200×170 $ft^3$) and a uniform gridblock size of 6×3×0.6 $m^3$ (20× 10×2 $ft^3$) resulting in 1.122× 106 gridblocks. The current study used a 122×122×21 $m^3$ (400× 400×70 $ft^3$) section from the Tarbert formation, which is a shallow marine sandstone with fine to medium-sized grains sandstones and some thin layers of siltstones and shales. The simulation used a quarter of a five-spot pattern (an injection pattern in which four injection wells are located at the corners of a square and the production well sits in the center). The uniform gridblock size dimensions of 6×3×0.6 $m^3$ (20× 10×2 $ft^3$) resulted in 20× 40× 35 (28,000) gridblocks. FIG. 21 shows a 3-D view of the reservoir porosity distribution.

Table 12 gives the properties of the selected reservoir section. A model was originally generated for use in the PUNQ (Production Forecasting with Uncertainty Quantification) project, an investigation into history matching and uncertainty quantification. The original PUNQ model used a uniform value of the ratio of vertical permeability to horizontal permeability (kv/kh) across the whole model as in the simulation in this section; however, kv/kh was set to 0.3 in the fracture and 0.0001 for the matrix in the tenth SPE comparative solution project, as will be used as a sensitivity test. Table 13 shows the oil composition and fluid properties used for this simulation case.

Figure 16B:
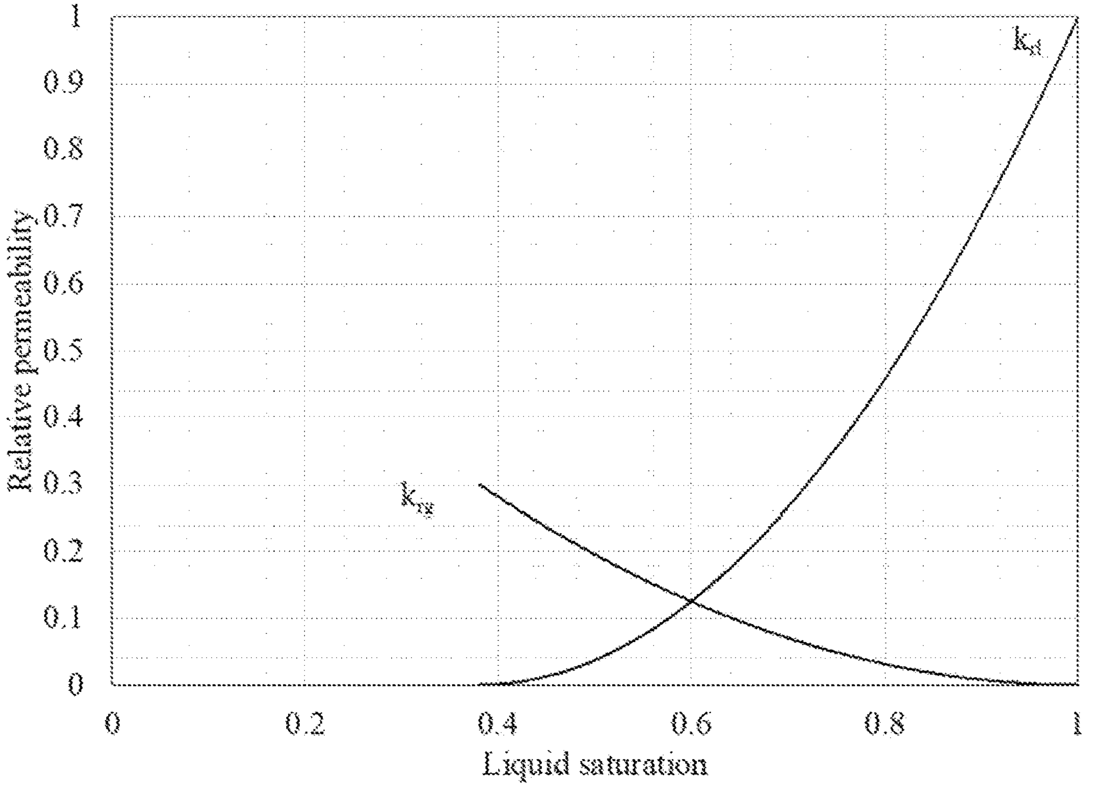
FIG. 16B provides a plot showing liquid-gas relative permeability curves.
Figure 17A:
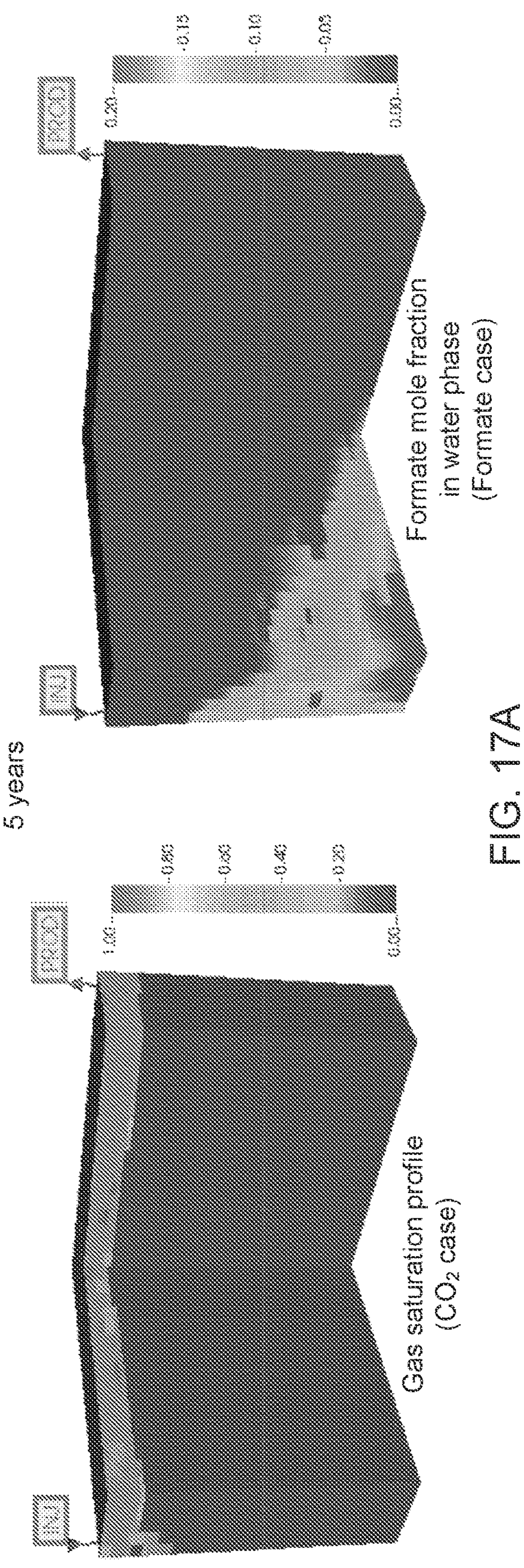
FIG. 17A, FIG. 17B, FIG. 17C, and FIG. 17D provide profiles showing $CO_2$ and formate distributions in aquifer over a simulation period.
Figure 17B:
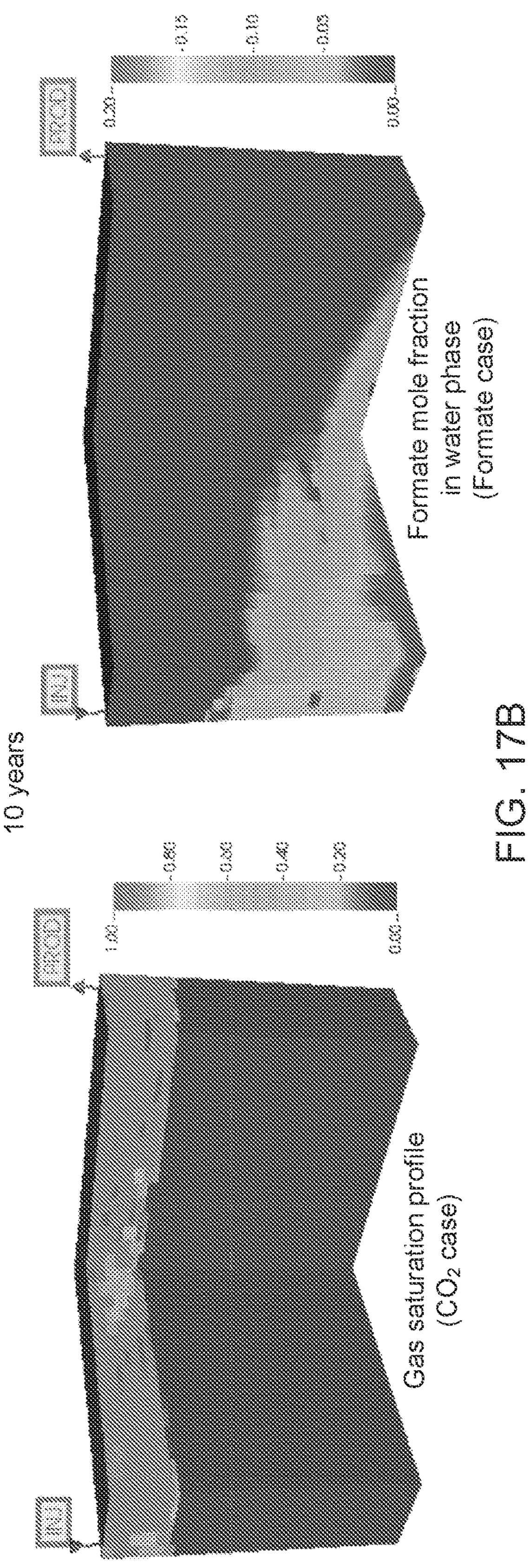
Figure 17C:
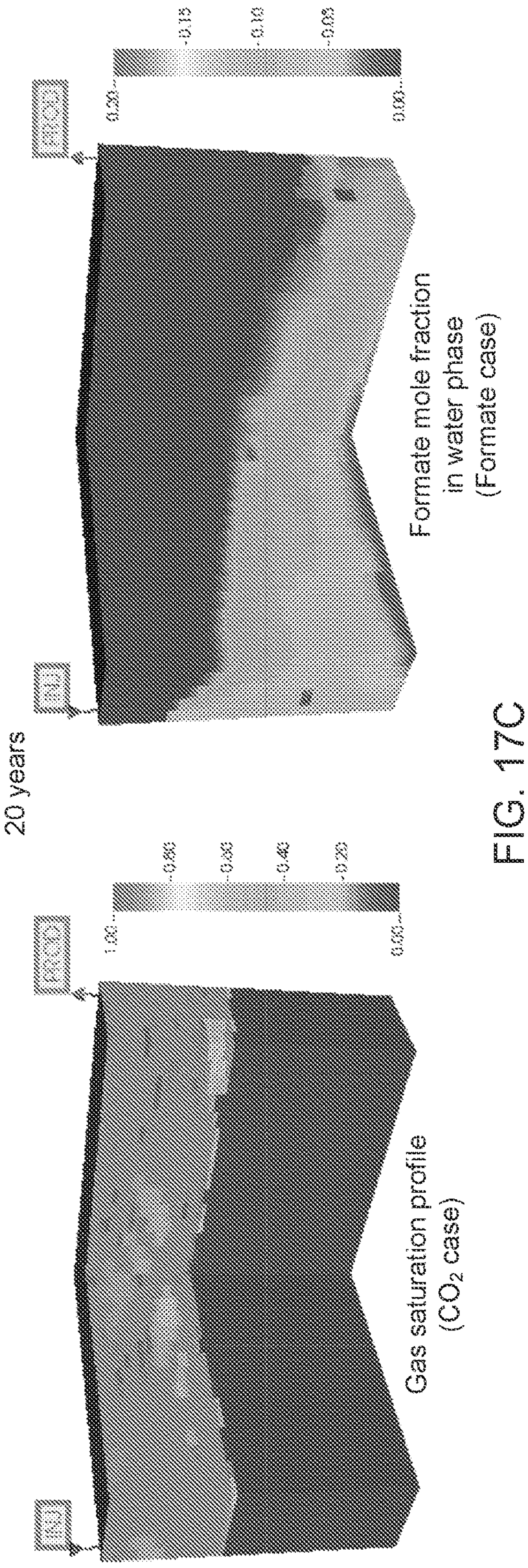
Figure 17D:
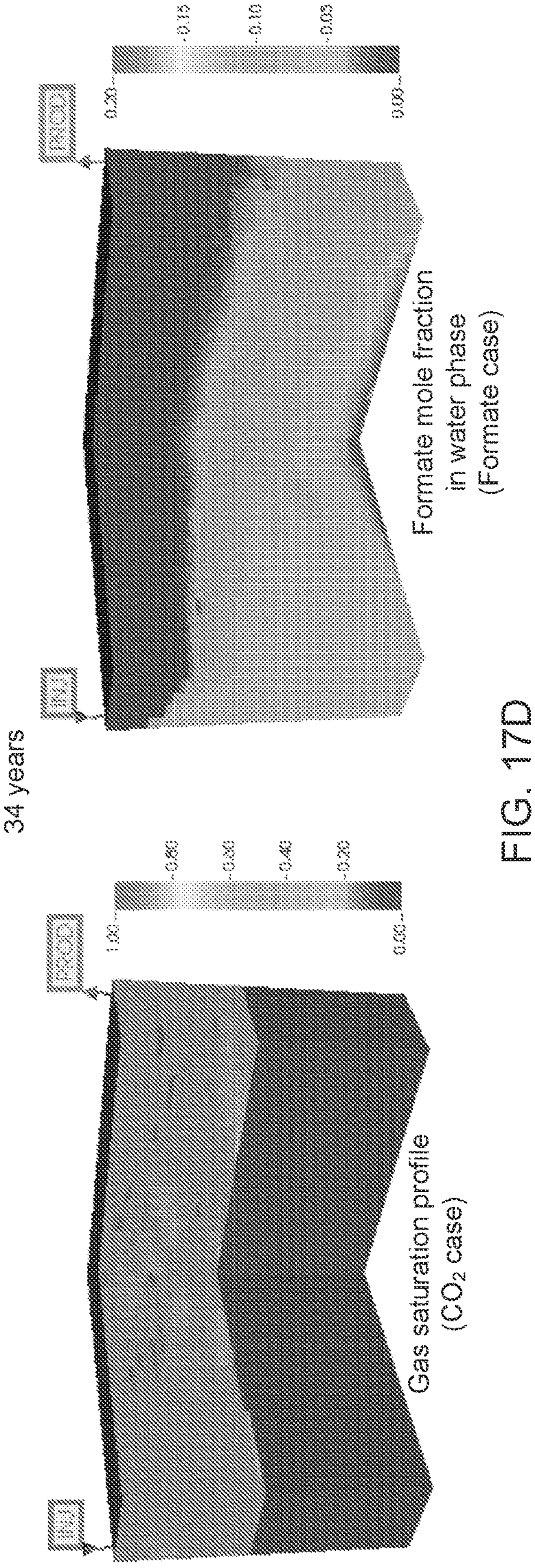

For both cases ($CO_2$ and aqueous formate solution), oil production was initiated by five years of waterflooding at 11,376 kPa (1,650 psia). After that, both injections were set at a constant rate of 114 kmol of carbon per day (equivalent to 5 tonnes of $CO_2$ per day). The production pressure was kept at 10,342 kPa (1,500 psia). The phase behavior was modeled by the Peng-Robinson equation of state. The thermodynamic minimum miscibility pressure for $CO_2$ with the oil (oil composition given in Table 2) was calculated to be 10,053 kPa (1,458 psia) at the reservoir temperature, 41° C. (106° F.), using the equation-of-state model. FIG. 16B shows the 2-phase relative permeability curves used in the simulation. The 3-phase relative permeability was generated using Stone's model II. The simulations for the two cases were performed for a simulated period of 40 years, including the initial water flooding for five years.

Unlike in case study 1, the injection into an oil reservoir involves the multiphase displacements of oil and formation water by the injection fluid. An important difference between the $CO_2$ and formate injection cases came from the flow regime affected strongly by the stability of the displacement processes and buoyant forces; however, these two factors appeared differently from the previous case study because of the strong tendency of channeling flow through fracture networks.

$M^0$ for the injectant and oil was calculated to be 13 for the $CO_2$ case, and 0.16 for the formate case. $M_0$ for the injectant and formation water was calculated to be 3.1 for the $CO_2$ case. The displacement of formation water by formate solution was a miscible process with a favorable viscosity ratio, 0.13.

Figure 23:
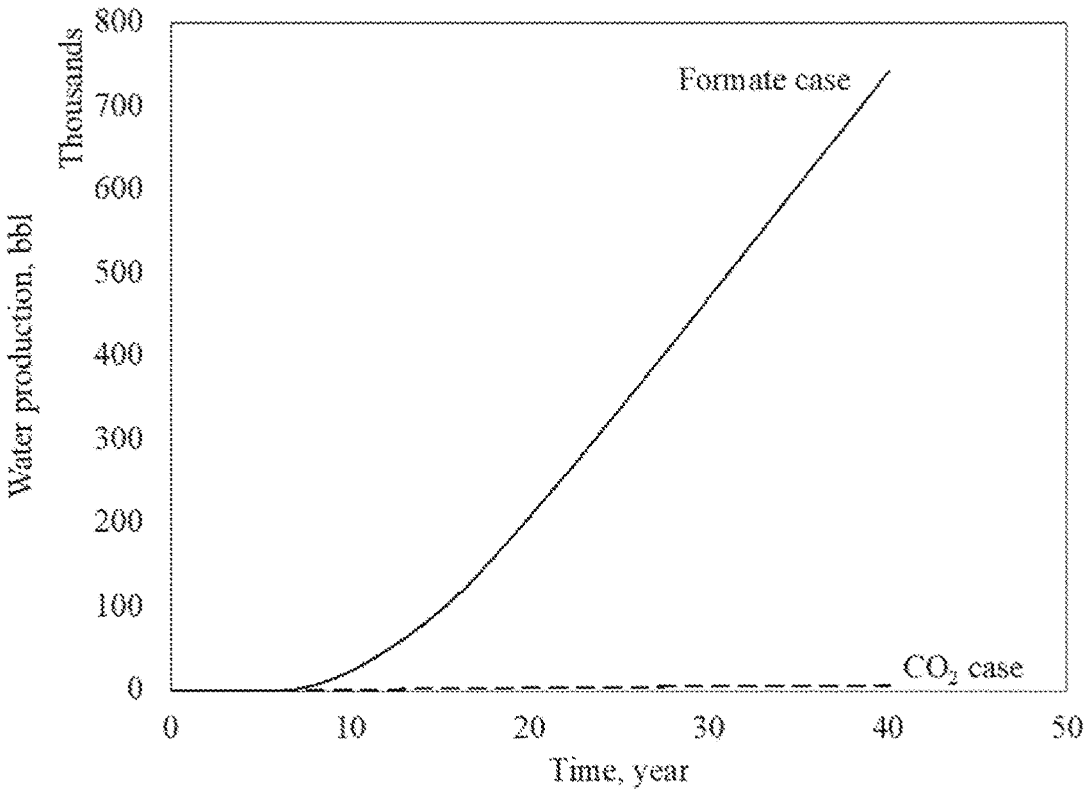
FIG. 23 provides a plot showing cumulative water production.
Figure 24:
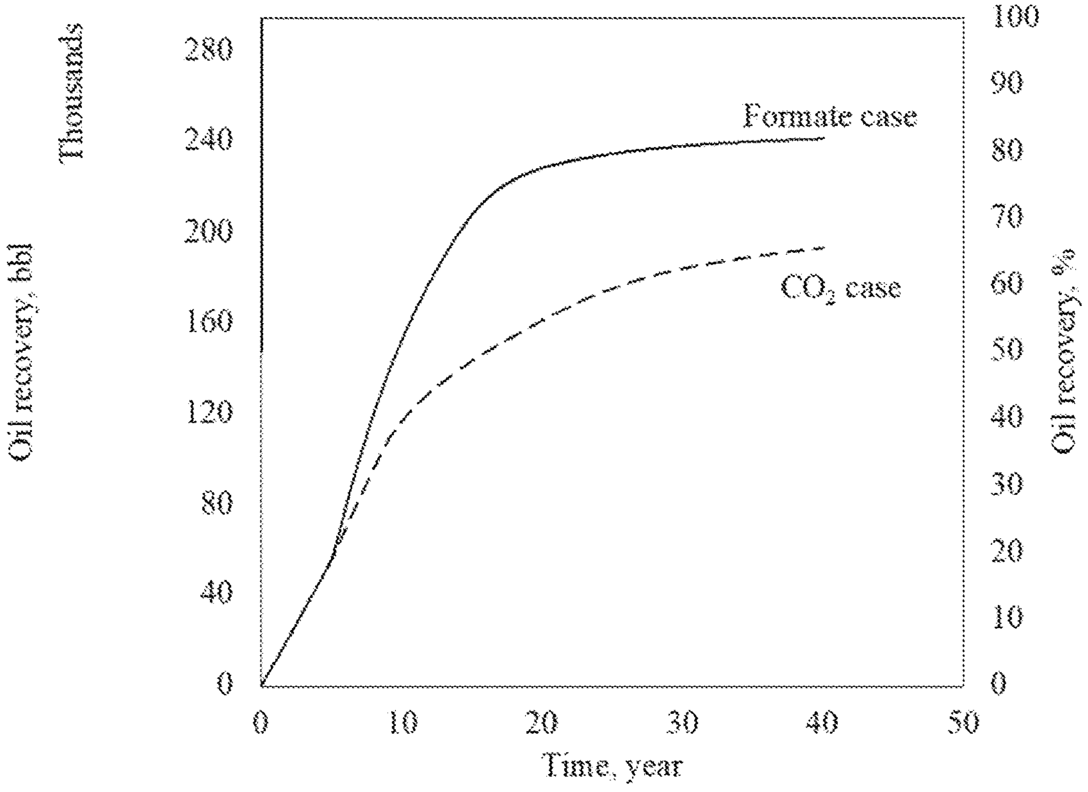
FIG. 24 provides a plot showing oil recovery from $CO_2$ and formate solution injection.
Figure 25:
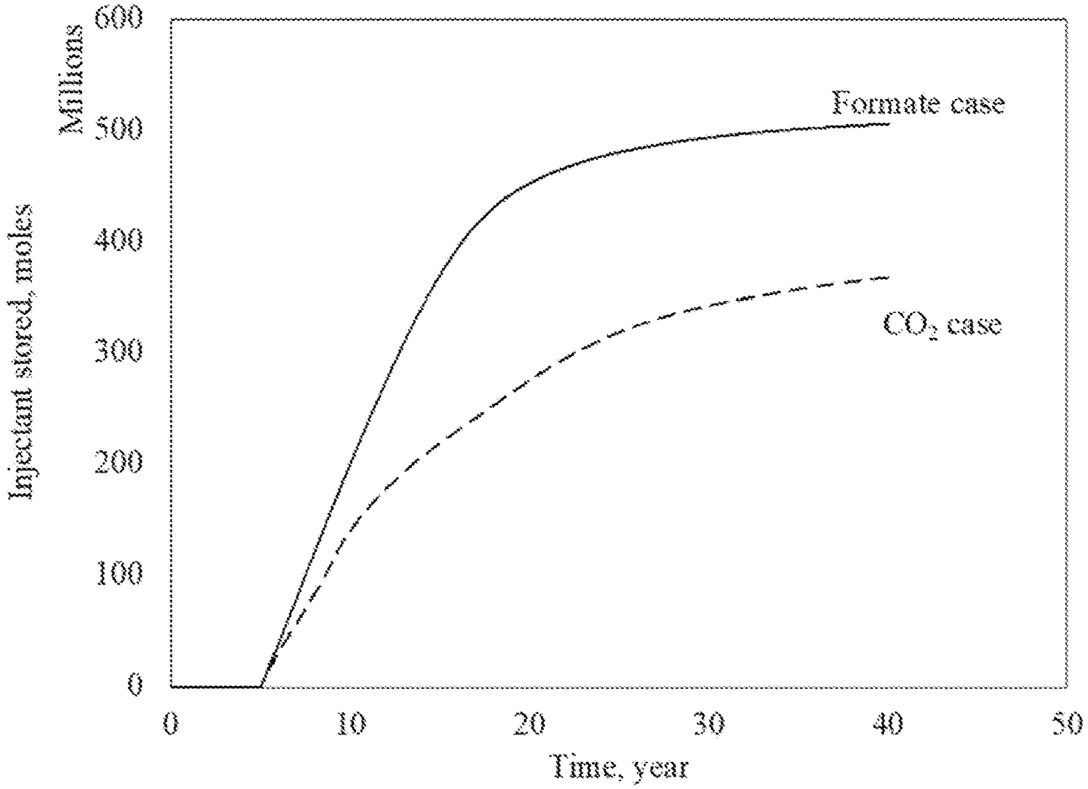
FIG. 25 provides a plot showing histories of moles of an injectant stored in a reservoir.

FIG. 22A, FIG. 22B, FIG. 22C, and FIG. 22D presents the profiles of the overall $CO_2$ mole fraction for the $CO_2$ injection case and the formate mole fraction in the aqueous phase for the formation injection case at different times. FIG. 23, FIG. 24, and FIG. 25 show the water production, oil production, and injectant storage results from the simulations. The $CO_2$ case showed a gravity override and the injected $CO_2$ preferentially displaced oil more than formation water because of the $M^0$ values presented above. The formate injection case showed a stable propagation of displacement fronts with no gravity-driven flow and efficient displacement of water and oil phases even after the breakthrough. The formate injection resulted in 15% greater oil recovery and 37% greater carbon stored than the $CO_2$ injection case.

Figure 26:
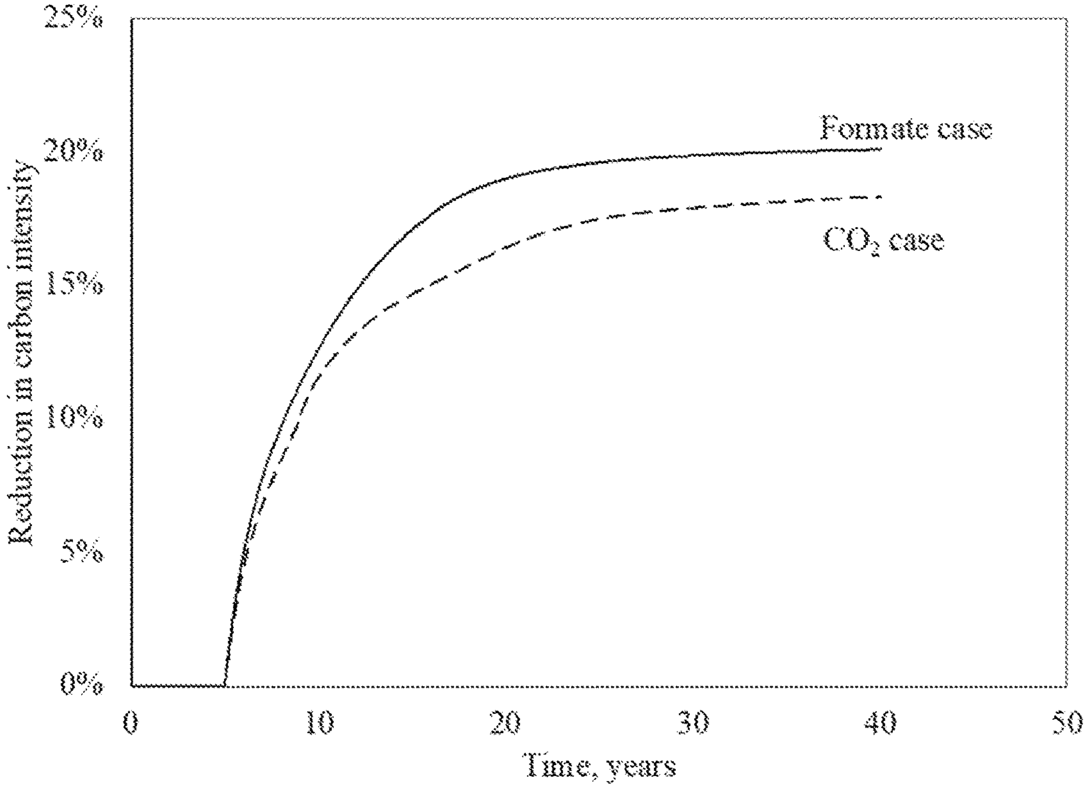
FIG. 26 provides a plot showing reduction in carbon intensity using format versus $CO_2$.

With the increased oil recovery, there might be concerns about formate giving off more carbon emissions. The mole numbers of produced hydrocarbon components in the oil were calculated, the number of carbon molecules produced were summed up, and these were compared to the number of carbon molecules stored, to see how much reduction in carbon intensity was achieved by each injectant. In 15 years of injecting $CO_2$/formate, the formate case resulted in a 20% reduction in carbon intensity while the $CO_2$ case resulted in a 16% carbon intensity reduction as shown in FIG. 26. That is, the larger injectant storage makes up for the higher oil recovery gotten from the formate case. The results suggest that the carbon storage in an oil reservoir requires a deliberate design for not only the efficient displacement of oil, but also the efficient displacement of water (water from water flooding and connate water).

Sensitivity Analysis on kv kh. The kv/kh value for the matrix was adjusted from 0.3 to 0.0001 while keeping the kv/kh value of 0.3 for the fracture volumes. As described previously, this corresponds to the setting in the tenth SPE comparative solution project. The effects of the change in kv/kh on flow patterns, carbon storage, and oil recovery for the $CO_2$ and formate injection cases were examined.

Figure 27A:
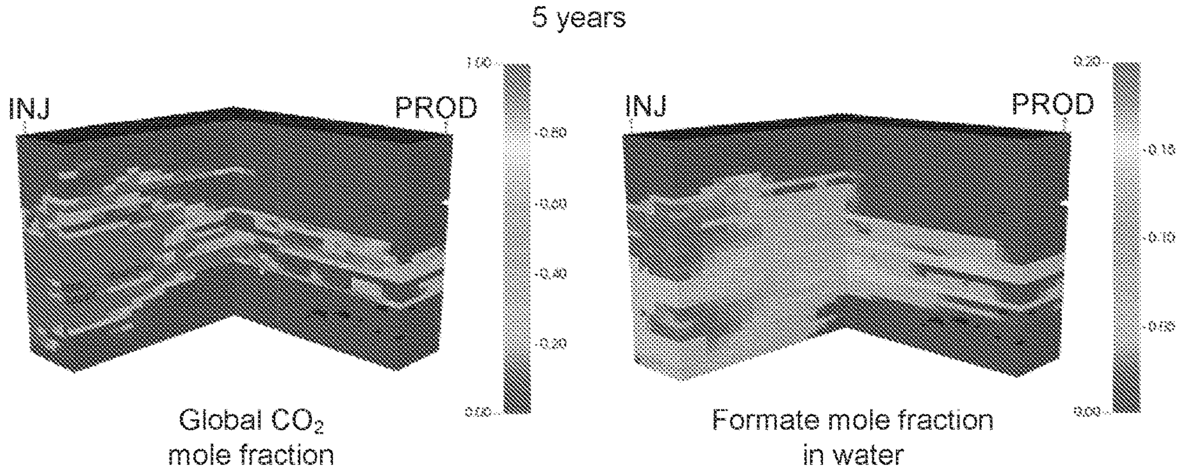
FIG. 27A, FIG. 27B, and FIG. 27C provide profiles of $CO_2$ and formate in an oil reservoir using an adjusted kv/kh value.
Figure 27B:
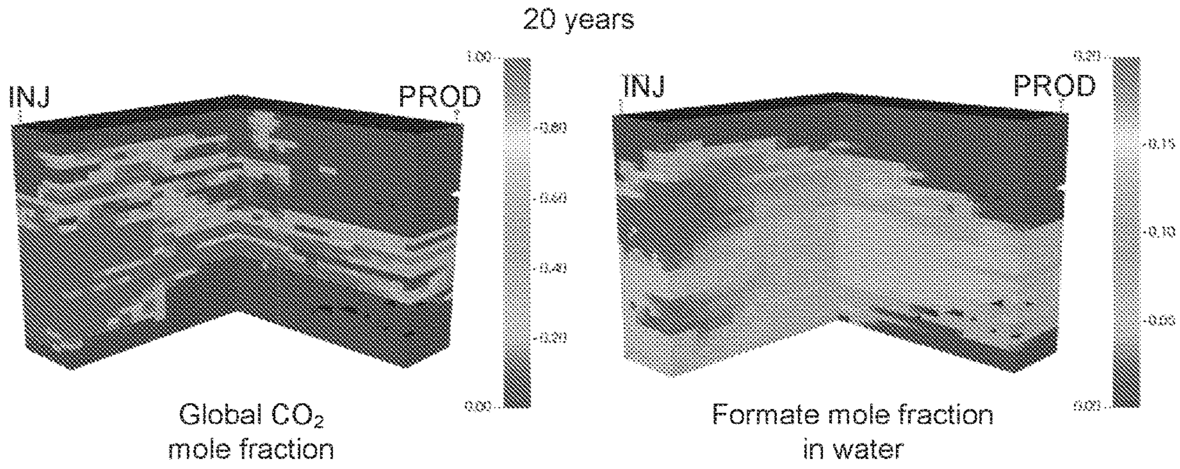
Figure 27C:
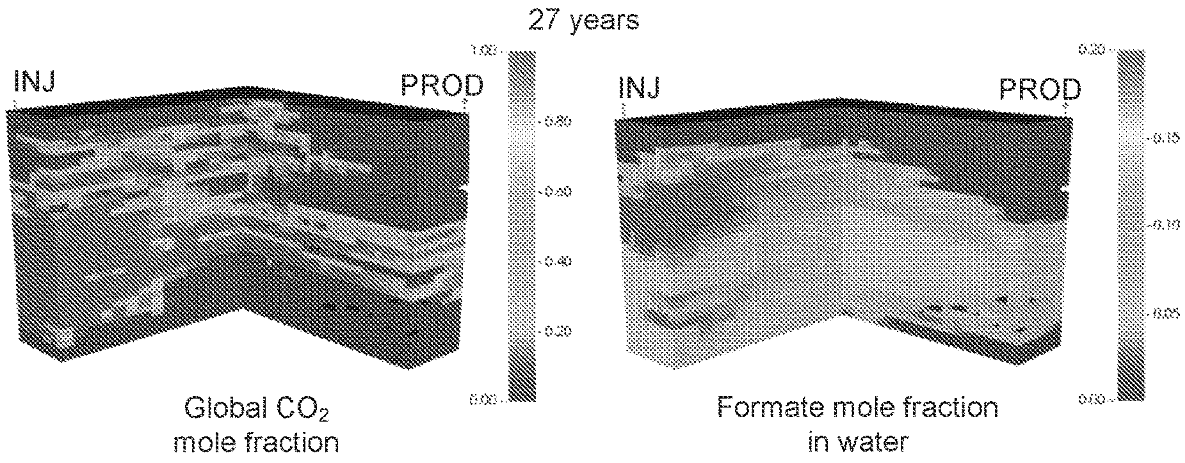
Figure 28:
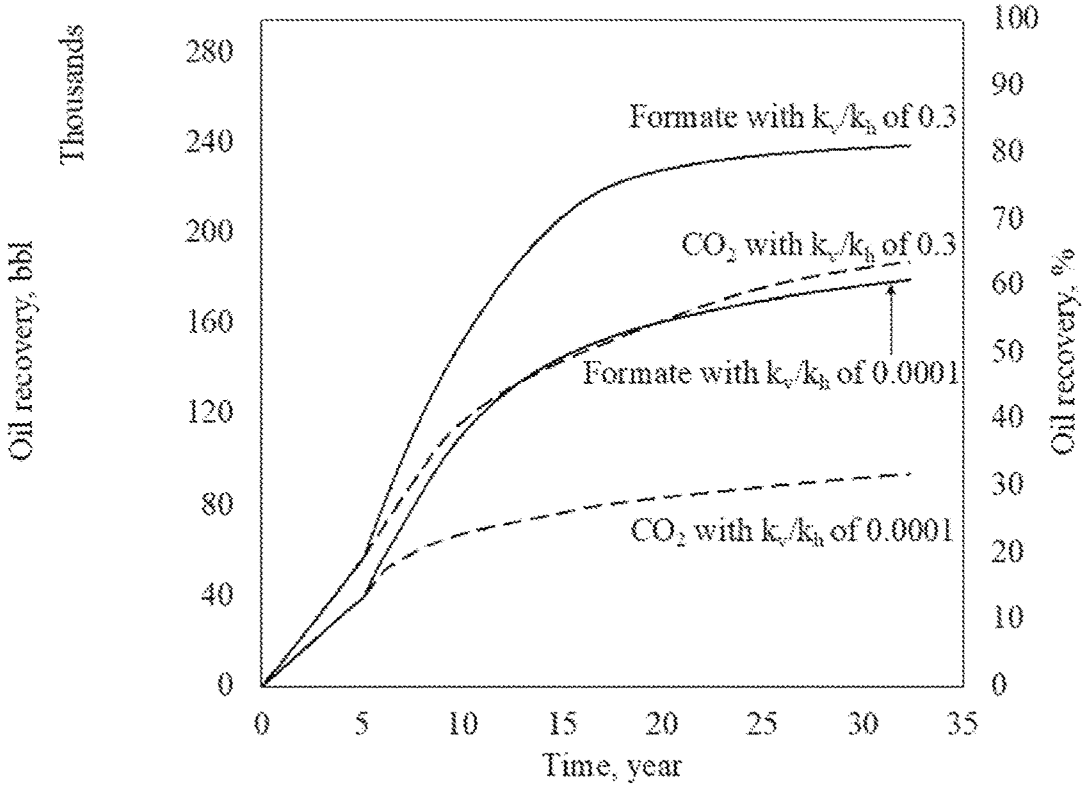
FIG. 28 provides a plot showing oil production results for $CO_2$ and formate injection.
Figure 29:
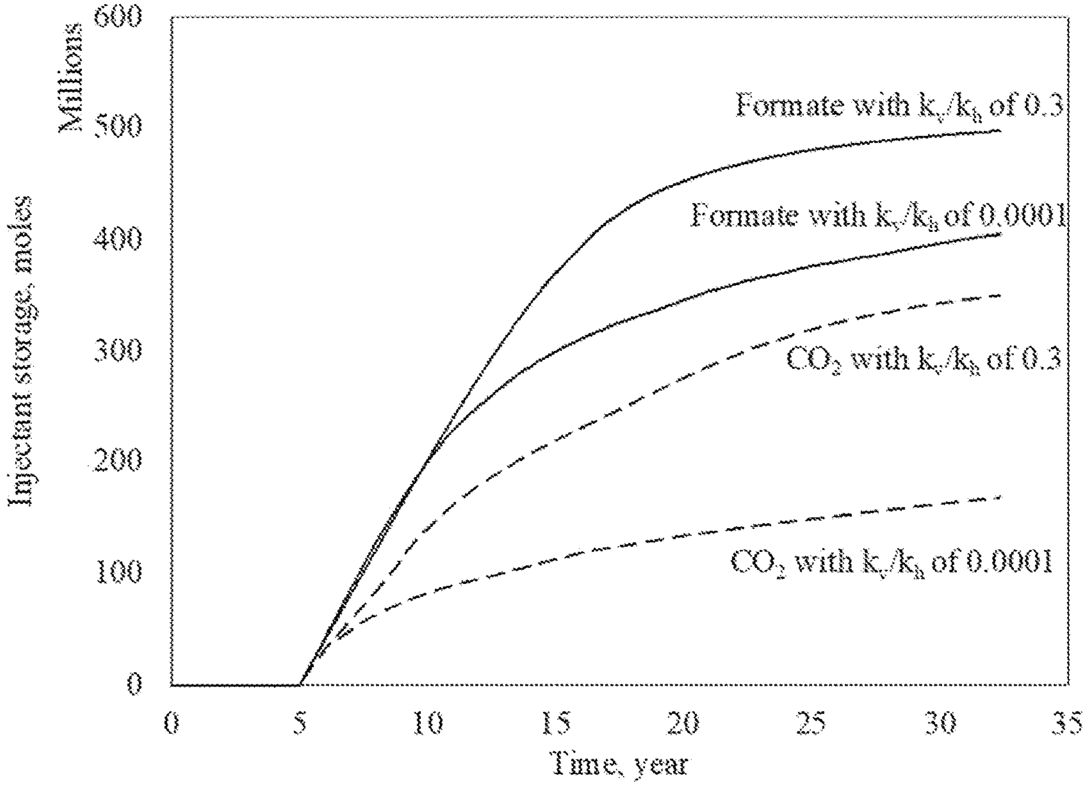
FIG. 29 provides a plot showing injectant storage for $CO_2$ and formate injection in a reservoir.

The change in kv/kh had an effect on the observed injectant distribution profile, as shown in FIG. 27A, FIG. 27B, and FIG. 27C. The reduction in kv/kh resulted in the increased level of channeling flow, and therefore, suppression of the gravity-driven flux as can be seen especially in the $CO_2$ case. FIG. 28 and FIG. 29 show the oil production and carbon storage for both reservoir settings (kv/kh=0.3 and 0.0001). There was a reduction in oil and carbon storage with the significantly reduced kv/kh for both cases; however, the $CO_2$ case was much more affected by this adjustment. The oil recovery was reduced by 50% and carbon storage by 52% in the $CO_2$ injection case while the oil recovery was reduced by 25% and carbon storage was reduced by 19% in the formate injection case.

This sensitivity analysis indicates an advantage of using formate as a carbon carrier for controlling the risk of CCS associated with the permeability heterogeneities and their impact on subsurface flow regime. Previous studies on using formate brine as the base fluid in drilling muds showed that aqueous formate solutions were compatible with polymers and retained the stability at temperatures as high as 150° C.; hence, it is practically possible to control the in-situ flow regime for formate (the carbon carrier) by adjusting the density and viscosity of the formate solution injected.

Conclusions. This Example presented case studies of aqueous formate solution as a carbon carrier for geological carbon storage in comparison to $CO_2$ as the conventional carbon carrier. New experimental data were reported for properties of formate solutions in brines and used to set up numerical flow simulation for the case studies. Some conclusions are as follows:

Experimental data showed that formate is stable in NaCl+ $CaCl_2$) brine (102,600 ppm), with the formate solubility ranging from 30 wt % to 35 wt % at temperatures between 25 and 75° C.

Newtonian behavior was consistently observed for the formate solutions in the brine at different formate concentrations and temperatures. The measured viscosities were well correlated as a logarithmic function of the molar concentration of formate. Viscosities of 30 wt % formate solutions in the 102,600-ppm brine were approximately 12 cp at 25° C., 5 cp at 50° C., and 3 cp at 75° C.

Two simulation case studies of carbon storage were performed; case study 1 for an aquifer and 2 for an oil reservoir. For each case study, $CO_2$ and formate injection were compared in terms of flow regime and displacement of reservoir fluids (formation water in case study 1 and formation water and oil in case study 2). Although the flow regimes depended on reservoir properties, the formate injection case showed much more stable fronts of oil and water displacement. The more stable fronts yielded the oil recovery and the carbon storage that were insensitive to the injectant breakthrough. In all studied scenarios, the formate solution injection case resulted in approximately 40% larger carbon (in moles) storage in comparison to the $CO_2$ injection case.

TABLE 6

Solubilities of sodium formate in DIW.

| Temperature (° C.) | Aqueous formate solution concentration (M) | Formate concentration (% w/w) | Sodium formate concentration (% w/w) | Density (g/cm$^3$) |
|---|---|---|---|---|
| 25.0 | 9 | 31.50 | 47.56 | 1.33 |
| 50.0 | 10 | 34.38 | 51.91 | 1.35 |
| 75.0 | 11 | 36.77 | 55.52 | 1.37 |

TABLE 7

Solubility of sodium formate in brine at 25, 50 and 75° C. The brine had a total salinity of 102,646 ppm (97,897 ppm NaCl and 4,749 ppm $CaCl_2$).

| Temperature (° C.) | Formate concentration (% w/w) | Sodium formate concentration (% w/w) | Density (g/cm$^3$) |
|---|---|---|---|
| 25.0 | 29.60 | 44.72 | 1.3675 |
| 50.0 | 32.00 | 48.34 | 1.3795 |
| 75.0 | 34.78 | 52.55 | 1.4388 |

TABLE 8

Densities and viscosities of formate solutions in brine at 25° C. The brine had a total salinity of 102,646 ppm (97,897 ppm NaCl and 4,749 ppm $CaCl_2$).

| Formate concentration (% w/w) | Molar concentration (mol/L) | Density @ 25° C. (g/cm$^3$) | Viscosity @ 25° C. (cp) |
|---|---|---|---|
| 5% formate solution | 1.26 | 1.1360 | 1.44 |
| 15% formate solution | 4.05 | 1.2140 | 2.97 |
| 20% formate solution | 5.61 | 1.2625 | 4.30 |
| 29.6% formate solution | 9.00 | 1.3675 | 11.61 |

TABLE 9

Densities and viscosities of formate solutions in brine at 50° C. The brine had a total salinity of 102,646 ppm (97,897 ppm NaCl and 4,749 ppm $CaCl_2$).

| Formate concentration (% w/w) | Molar concentration (mol/L) | Density @ 50° C. (g/cm3) | Viscosity @ 50° C. (cp) |
|---|---|---|---|
| 5% formate solution | 1.24 | 1.1120 | 1.03 |
| 15% formate solution | 4.02 | 1.2060 | 1.73 |
| 20% formate solution | 5.55 | 1.2495 | 2.32 |
| 29.6% formate solution | 8.89 | 1.3525 | 5.17 |
| 32% formate solution | 9.81 | 1.3795 | 6.34 |

TABLE 10

Densities and viscosities of formate solutions in brine at 75° C. The brine had a total salinity of 102,646 ppm (97,897 ppm NaCl and 4,749 ppm $CaCl_2$).

| Formate concentration (% w/w) | Molar concentration (mol/L) | Density @ 75° C. (g/cm3) | Viscosity @ 75° C. (cp) |
|---|---|---|---|
| 10% formate solution | 2.57 | 1.1590 | 0.89 |
| 25% formate solution | 7.25 | 1.3055 | 2.20 |
| 30% formate solution | 9.03 | 1.3548 | 3.07 |

TABLE 11

Properties used for the aquifer model in Case Study 1.

| | Values |
|---|---|
| Reservoir properties | |
| Top depth | 671 m (2200 ft) |
| Initial pressure | 8,963 kPa (1,300 psia) |
| Temperature | 41° C. (106° F.) |
| Initial water saturation | 100% |
| Porosity | Sand - 0.33, Shale - 0.01 |
| Permeability | Sand - 6500 mD, Shale - 1 mD |
| Fluid properties | |
| $CO_2$ density at initial aquifer temperature and pressure | 0.4 g/cm$^3$ (25.17 lb/ft$^3$) |
| $CO_2$ viscosity at initial aquifer temperature and pressure | 0.03 cp |
| Formate solution density | 1.4 g/cm$^3$ (87.4 lb/ft$^3$) |
| Formate solution viscosity | 5 cp |
| Aquifer water density | 1.0 g/cm$^3$ (62.1 lb/ft$^3$) |
| Aquifer water viscosity | 0.64 cp |

TABLE 12

Properties of the reservoir section used for Case Study 2.

| Reservoir properties | |
|---|---|
| Top depth | 671 m (2,200 ft) |
| Initial pressure | 10,342 kPa (1,500 psia) |
| Temperature | 41° C. (106° F.) |
| OOIP | 46,800 m$^3$ (294,365 bbl) |
| Initial oil saturation | 85% |
| Initial water saturation | 15% |
| Porosity | 0 to 0.50 |
| Horizontal permeability | 0 to 20 D |
| Vertical to horizontal permeability (kv/kh) ratio | 0.3 |
| Residual water saturation | 15% |

TABLE 13

Oil composition and fluid properties used for case study 2. "PC" stands for pseudocomponent, and four PCs represent the $C_{7+}$ fraction of the oil.

| | Mole percent | Molecular weight (g/mol) |
|---|---|---|
| Oil composition. | | |
| $N_2$ | 0.5% | |
| $CO_2$ | 0.4% | |
| $CH_4$ | 12.7% | |
| $C_2H_6$ | 6.7% | |
| $C_3H_8$ | 6.9% | |
| n-$C_4H_{10}$ | 6.2% | |

TABLE 13-continued

Oil composition and fluid properties used for case study 2. "PC" stands for pseudocomponent, and four PCs represent the $C_{7+}$ fraction of the oil.

| | Mole percent | Molecular weight (g/mol) |
|---|---|---|
| n-$C_5H_{12}$ | 5.2% | |
| n-$C_6H_{14}$ | 2.9% | |
| PC-1 | 24.2% | 136.83 |
| PC-2 | 15.9% | 207.56 |
| PC-3 | 11.4% | 291.23 |
| PC-4 | 7.1% | 467.50 |
| Oil properties | | |
| Viscosity | 2.61 cp | |
| Density | 0.806 g/cm$^3$ (44° API) | |
| Bubble point | 5,599 kPa (812 psia) | |
| Fluid properties | | |
| $CO_2$ density at initial reservoir conditions | 0.56 g/cm$^3$ (34.78 lb/ft$^3$) | |
| $CO_2$ viscosity at initial reservoir conditions | 0.062 cp | |
| Formate solution density | 1.4 g/cm$^3$ (87.4 lb/ft$^3$) | |
| Formate solution viscosity | 5 cp | |
| Aquifer water density | 1.0 g/cm$^3$ (62.1 lb/ft$^3$) | |
| Aquifer water viscosity | 0.64 cp | |

Figure captions for Example 3. FIG. 13. Sodium formate solutions in DIW at 25° C. The undissolved salts settled at the bottom. The solution with the highest molar concentration of sodium formate with undissolved salt was chosen as the solubility limit and the weight fraction of formate in the solution was recorded.

FIG. 14. Viscosities of formate solutions in brine at 25, 50 and 75° C. The data shows a clear correlation as a logarithmic function of formate molar concentration.

FIG. 15. 3D aquifer model with two facies. The sand facies are in red, and the shaly facies are in blue. The injector is at the bottom-right corner, and producer at the up-left corner.

FIG. 16A. Water-oil relative permeability curves used in the case studies. FIG. 16B. Liquid-gas relative permeability curves used in the case studies.

FIG. 17A, FIG. 17B, FIG. 17C, FIG. 17D. $CO_2$ and formate distributions in aquifer over simulation period. The $CO_2$ injection showed a clear gravity override profile, unlike the formate case. The profile developed into an even distribution of formate in the aquifer because the miscible displacement had a favorable viscosity ratio.

FIG. 18. Cumulative $CO_2$ and formate production from the aquifer in case study 1. Each molecule of formate and $CO_2$ contains one mole of carbon; hence, their production is comparable on a molar basis. The $CO_2$ production rose rapidly as soon as the $CO_2$ breakthrough began, which is typical of high-mobility gas.

FIG. 19. Cumulative water production from the aquifer in case study 1. Once the $CO_2$ breakthrough happened, the water production leveled off. Almost all the $CO_2$ injected was produced after the breakthrough.

FIG. 20. Cumulative moles of the injectant stored in case study 1. The moles of formate stored increased steadily even after the breakthrough because formate solution miscibly displace formation water with a favorable viscosity ratio.

FIG. 21. 3D view of the reservoir porosity distribution; taken from the tenth SPE comparative solution project (Christie and Blunt, 2001). The color scale indicates porosity.

FIG. 22A, FIG. 22B, FIG. 22C, FIG. 22. Profiles of $CO_2$ and formate at different times in case study 2. The timeframe in the first column refers to the time after the start of $CO_2$/formate injection. Oil production was initiated by 5 years of waterflooding. The formate injection case shows stable displacement fronts and a more efficient displacement of oil and water than $CO_2$.

FIG. 23. Cumulative water production simulated in case study 2.

FIG. 24. Oil recovery from the $CO_2$ and formate solution injection in case study 2. The formate injection case resulted in approximately 20% more oil recovery than the $CO_2$ injection case.

FIG. 25. Histories of the moles of the injectant stored in case study 2. One mole of $CO_2$/formate contains one mole of carbon; hence, the moles of $CO_2$/formate stored are equivalent to the moles of carbon stored.

FIG. 26. Reduction in carbon intensity. This is the ratio of the moles of carbon in the injectant stored to the moles of carbon in the oil produced by the injectant. Though the formate injection produced more hydrocarbons (oil) than the $CO_2$ injection, the formate still gave a higher reduction in carbon intensity compared to $CO_2$.

FIG. 27A, FIG. 27B, FIG. 27C. Profiles of $CO_2$ and formate in the oil reservoir using an adjusted kv/kh value of 0.0001 for the matrix volume. The timeframe in the first column refer to the time after the start of $CO_2$/formate injection.

FIG. 28. Oil production results for the $CO_2$ and formate injection cases in case study 2, using the kv/kh value of 0.3 and 0.0001.

FIG. 29. Injectant storage for the $CO_2$ and formate injection cases in case study 2, using the kv/kh value of 0.3 and 0.0001.

Example 4: A Comparative Experimental Investigation of Formate, Acetate, and Glycine as Wettability Modifiers for Carbonate and Shale Formations Studies have indicated the efficacy of the simplest amino acid, glycine, as a wettability modifier that enhances the imbibition of water in carbonate reservoirs. An objective of this Example was to compare the performance of formate, acetate, and glycine as wettability modifiers for carbonate formations. Formate and acetate are introduced for the first time as novel chemicals for this purpose. Note that the aminomethyl and amino groups are the only structural differences between formate and glycine, and acetate and glycine, respectively.

The experiments consisted of contact-angle measurements on oil-aged calcite and shale plates, and imbibition displacements (spontaneous and forced). The comparison between these additives was realized with/without adding hydrogen chloride (HCl) for adjusting the pH of the solutions. Amott indexes of glycine and formate+HCl solutions were noticeably higher than the rest of the cases in the imbibition experiments. It was found that formate can be very effective in altering the wettability of carbonate rocks to water-wet state when the pH of the solution is reduced. This indicates a successful synergy of pH adjustment and the attraction of formate to the rock surface, which resulted in an improvement of the oil recovery.

Glycine showed a superior behavior as a wettability modifier compared to that of formate and acetate, for all the experimental conditions of this Example. This indicated that the amino group, in the presence of the carboxyl group, plays a key role in altering the wettability of the rock. The ability of glycine to alter wettability comes from two factors: one is the chelate effect caused by the amino group as an electron donor in the presence of the carboxyl group. The chelate effect makes glycine entropically more favorable to bind to calcium cation in the brine, triggering calcite dissolution, and/or to attach directly to the calcite surface. The other factor is the calcite dissolution induced by pH reduction, followed by the attraction of glycine to the rock surface.

Introduction. Waterflooding in carbonate oil reservoirs is generally inefficient because the large contrast in permeability between the matrix and fracture results in channeling flow. Also, carbonate rocks tend to be oil wet, and therefore, spontaneous imbibition of water into the matrix from the fracture is not effective in oil recovery. A shift in wettability to a more water-wet state is expected to improve oil recovery in oil-wet carbonate reservoirs.

Interactions between rock minerals, brine, and oil affect the rock wettability, among other factors. Formation water (or brine) is the initial wetting phase in conventional oil reservoirs before the oil migration. After the oil migration, brine is still the wetting phase as long as the film of brine is stable. When the stability of brine starts changing, the connection forms between rock surfaces and oil. This process is followed by adsorption of surface-active components of oil, which results in the reduction of water-wetting or even switching the surface to oil-wet. It is possible to reverse the wettability from oil-wet to water-wet by improving thin brine stability or/and disconnecting adsorbed oil components from the surface of the rock.

A widely studied method for alteration of rock wettability is surfactant injection. However, wettability alteration by surfactants is usually expected to occur with a reduction of interfacial tension between oleic and aqueous phases. However, IFT should not reach an ultralow value ($10^{-3}$ mN/m) in tight formations. Oil recovery can be limited by ultralow IFT because of reduced surfactant imbibition rate.

Another wettability altering method which gained popularity is low-salinity waterflooding (LSW) both for sandstone and carbonate reservoirs. In this process, low-salinity water can modify the wettability in carbonate rocks by changing their total charge and increasing the electric double layer of brine-rock and oil-brine interfaces. Multivalent ions, such as $CO_3^{2-}$, $SO_4^{2-}$, $Ca^{2+}$ and $Mg^{2+}$, are reported as potential determining ions, which control the charge of rock surfaces.

The effect of seawater on oil recovery especially in carbonate reservoirs has been investigated. Based on spontaneous imbibition experiments using seawater, a change of rock wettability was observed in the presence of sulfate ions, which displaced naphthenic acids from carbonate rock surfaces. Sulfate ions may be aided by calcium and magnesium ions in the wettability changing process.

LSW has been evaluated by coreflooding experiments. Results from sequentially injecting seawater and its diluted solution showed an incremental oil recovery factor of 0.18. The impact of ions was studied individually using surface potential experiments. R10 The major ions that changed the wettability of carbonates are sulfate and calcium. Since surface potential did not entirely explain the oil improvement calcite dissolution has been proposed as one of the potential mechanisms for wettability alteration.

Chemicals other than surfactants have also been studied as wettability modifiers for carbonate reservoirs. An aqueous solution of 3-pentanone for enhanced oil recovery by wettability alteration was investigated. A comprehensive analysis was performed through contact angle, imbibition, and coreflooding experiments. The results showed a marked improvement in oil recoveries with limestone cores after adding 3-pentanone to brine.

Figure 30:
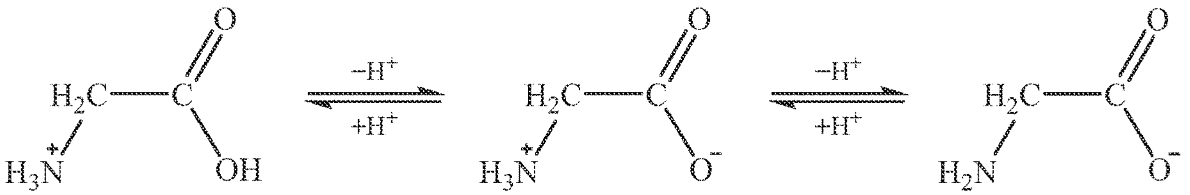
FIG. 30 provides molecular structure of different forms of glycine.

Amino acids have also been studied as another class of wettability modifiers. The simplest amino acids and introduced glycine have been explored as an effective wettability modifier. Surfactants synthesized from amino acids were also studied as oil-recovery agents and for some other applications. These amino acids contain the carboxylic (—COOH) and amine (—$NH_2$) groups within the same molecule. An important property of glycine is that its overall charge depends on the pH of the solution, as shown in FIG. 30. If the solution pH is higher than the isoelectric point (pI), which is 5.97 at room temperature, then glycine is negatively charged. Otherwise, glycine is positively charged. Glycine is effective when the solution pH is between its pI and point of zero charge (pzc) of calcite.

Figure 31:
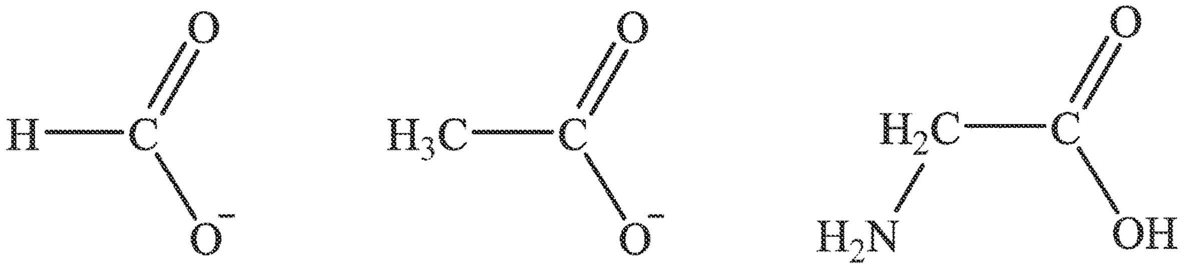
FIG. 31 provides molecular structure formate anion, acetate anion, and glycine.

A goal of this Example is to investigate the capability of carboxylate anions, specifically formate and acetate, to change the wettability of carbonate mineral surface from oil-wet to water-wet state. This was performed by comparing formate and acetate with glycine, a proven wettability modifier, through contact angle and imbibition experiments. The aminomethyl and amino groups are the only structural difference between formate and glycine, and acetate and glycine, respectively (FIG. 31). This Example also analyzes how these carboxylate anions could become more effective for wettability alteration under slightly lowered pH. The negative charge of formate and acetate ions may result in wettability alteration because of the interaction between positively charged calcite surfaces and the carboxyl group.

Inspired by results of a comparative study, the importance of the amino group of glycine for the rock wettability alteration and effective enhancement of water imbibition into carbonate rocks was investigated. The comparison among glycine, formate, and acetate was convenient to study two possible mechanisms of wettability alteration by glycine. One is the chelate effect, which can occur with glycine only. The other is the synergy between calcite dissolution and the carboxyl group, which is expected to occur also with formate and acetate.

Materials and Methods. The experiments in this Example include contact angle measurements with calcite surfaces and Eagle Ford shale plates, and spontaneous and forced imbibition tests with Texas Cream Limestone core plugs.

Materials. Table 14 presents the properties of the dead crude oil sample used in the contact-angle experiments with calcite pieces and limestone cores. This oil is referred to as Oil1, and its reservoir temperature is 347 K. Table 15 shows the oil used in the contact-angle experiment on Eagle Ford shale. This oil is referred to as Oil2 and its reservoir temperature is 337 K. Reservoir brine (RB) was the same in all experiments as shown in Table 16, and its salinity is 68,722 mg/L. X-ray powder diffraction indicated that the Eagle Ford shale sample consisted of 75% calcite, 14% quartz, 4% dolomite, 2% kaolinite, 1% K-spar, 1% pyrite, and others. The Texas Cream Limestone cores consisted of 98% calcite, 1% pyrite, and other minerals in negligible amounts.

Glycine, acetate, and formate samples (Sigma-Aldrich) have a purity greater than 99%. Glycine has a pI of 5.97 at room temperature. FIG. 31 illustrates the molecular structure of glycine, acetate, and formate. The aqueous stability of all three chemicals was confirmed with RB at reservoir and room temperatures.

Contact Angle Experiments. Contact angle experiments were performed on calcite surfaces and Eagle Ford shale plates. Contact angle experiments with calcite focused on determining an optimal concentration of glycine, formate, and acetate while experiments on shale plates were performed to verify the efficacy of the solutions with another carbonate rich rock. After cutting the plates in the appropriate sizes, they were polished with a diamond grinder to result in a smooth surface. Then, these calcite and shale plates were first aged for one day in RB, and then, they were placed in heavy crude oil for at least three weeks at 347 K until reaching oil-wet state.

The pH values of the chemical solutions were measured before and after the experiment. To test the impact of solution pH, contact angle experiments with calcite surfaces were performed not only with different concentrations of formate and acetate, but also with HCl added to reach the pH level of glycine.

The chemical solutions were made in glass chambers and placed in an oven at 363 K to degas them for at least one day. RB was made first by adding salts and adjusting the total mass of the solution to 1 kg with deionized water. Then, an appropriate amount of either glycine, formate, or acetate was added to reach the desired concentration. For solutions with HCl, HCl was added to solutions of formate and acetate at room temperature while stirring slowly. The final pH level was adjusted to correspond to the glycine solution at the same concentration. After aqueous solutions were prepared and degassed, they were placed in an oven at the desired reservoir temperature (347 K for calcite and 337 for Eagle Ford shale). Table 17 summarizes the aqueous solutions tested.

Figure 32:
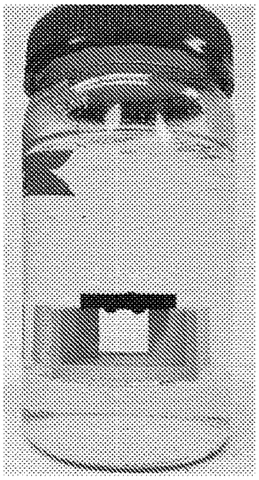
FIG. 32 provides a photo showing a setup for contact angle measurements.

After being aged in heavy oil for at least 3 weeks, the calcite or shale pieces were retrieved, and the excess oil was removed from the surfaces carefully. Then, to start the experiment, the rock pieces were immersed in the solution and then oil droplets were placed at the bottom of the rock pieces. The solution chambers were put in the oven for equilibration. Then, images of the oil droplets were taken. A new oil droplet was placed after a certain number of days and the images were taken after equilibration. Contact angles reported in figures are the equilibrium contact angles. For example, if data is reported from day 7, that data is the final equilibrated contact angle of the droplet placed on day 7. Photo of a setup for contact angle experiments is shown in FIG. 32. Contact angles were measured from photos with the on-screen protractor software.

A similar procedure was followed for another set of experiments with Eagle Ford shale plates. Five cases (5 wt % glycine, 5 wt % acetate, 5 wt % acetate+HCl, 5 wt % formate, and 5 wt % formate+HCl) were used to test the impact of HCl (pH adjustment) on the wettability alteration mechanism of formate and acetate. Oil droplets were placed at the bottom of shale plates at days 0 and 3 because the contact angle change was faster than in calcite experiments.

Figure 33:
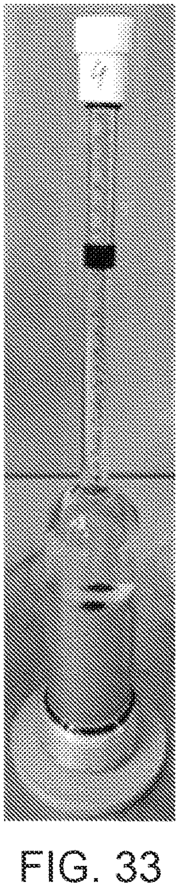
FIG. 33 provides a photo showing an Amott cell.

Spontaneous Imbibition. Spontaneous imbibition tests were carried out with glycine, formate, and acetate. The impact of the solution pH was also tested for formate and acetate. The Amott cell used was approximately 15 cm in height and 5 cm in diameter as shown in FIG. 33. The Amott cell's neck was graduated, and the graduation was calibrated to the actual volume before starting the experiments.

The Texas Cream limestone core plugs used were 38 mm in diameter and 92 mm in length. Cores were evacuated with a vacuum pump for 30 min and then, brine was injected at a constant pressure of 689 kPa (100 psig) to saturate cores fully with brine. This was carried out under room temperature. Then, the porosity and permeability of the core plugs were measured with RB. The experimental setup consisted of two accumulators (RB and Oil1), one vacuum pump, one pump, one manual hydraulic pump to maintain the overburden, one Hassler-type core holder, one differential pressure gauge, and one oven.

Then, Oil1 was injected into the core at a constant rate of 60 $cm^3$/hour. This was performed under room temperature and without any backpressure, in other words, effluent side was open to the atmosphere. After the oil breakthrough, the rate was increased to 100 $cm^3$/hour. These values were chosen to minimize the capillary end effect and to give a capillary number of about $2\times10^{-5}$. Equations (3) and (4) were used for this. The oil injection continued until no brine was produced at the effluent, from which the residual water saturation, $S_{wr}$, was determined. Tables 18 and 19 summarize the rock properties for each core used in spontaneous and forced imbibition experiments.

The four cores given in Table 18 were used for imbibition experiments with the following solutions: Reservoir Brine (RB), 5 wt % glycine in RB, 5 wt % acetate in RB, and 5 wt % formate in RB. To test the impact of the solution pH, the six cores given in Table 19 were used with the following solutions: RB, RB+HCl, 2.5 wt % glycine, 5 wt % formate+HCl, and 5 wt % acetate+HCl. The acetate+HCl was repeated for two experiments because the first attempt resulted in an unexpectedly small amount of oil recovery.

After being saturated with Oil1, the four cores given in Table 18 and the six cores given in Table 19 were placed in a glass chamber filled with Oil1 for 30 days. However, the former set of cores was aged at room temperature for 10 days and at 347 K for the rest of 30 days. The latter set of cores was aged at 347 K for the entire 30 days. The difference in the aging temperature affected the initial oil wetness for the two sets, as will be shown below. Therefore, the RB case was used as a control experiment for the two sets of cores given in Tables 18 and 19.

The solutions were placed in an oven at 363 K for one day for degassing and then, they were placed in the oven at 347 K (the experimental temperature). Oil-saturated cores were then introduced in the Amott cell. Immediately after that, an aqueous solution was poured carefully so that the bubble formation was avoided. Note that this Amott test was initiated with all materials heated at 347 K to avoid the thermal expansion/shrinkage of the oil. Atmospheric pressure was maintained inside of the cell throughout the experiment. Finally, oil recovery was monitored every day.

Forced Imbibition. The Amott cell was cooled down after the spontaneous imbibition experiment and then, oil and brine (or other solution) were recovered from the cells using glass pipette and their volumes were measured. The core was retrieved from the Amott cell and placed immediately in a core holder for forced imbibition.

Figure 34:
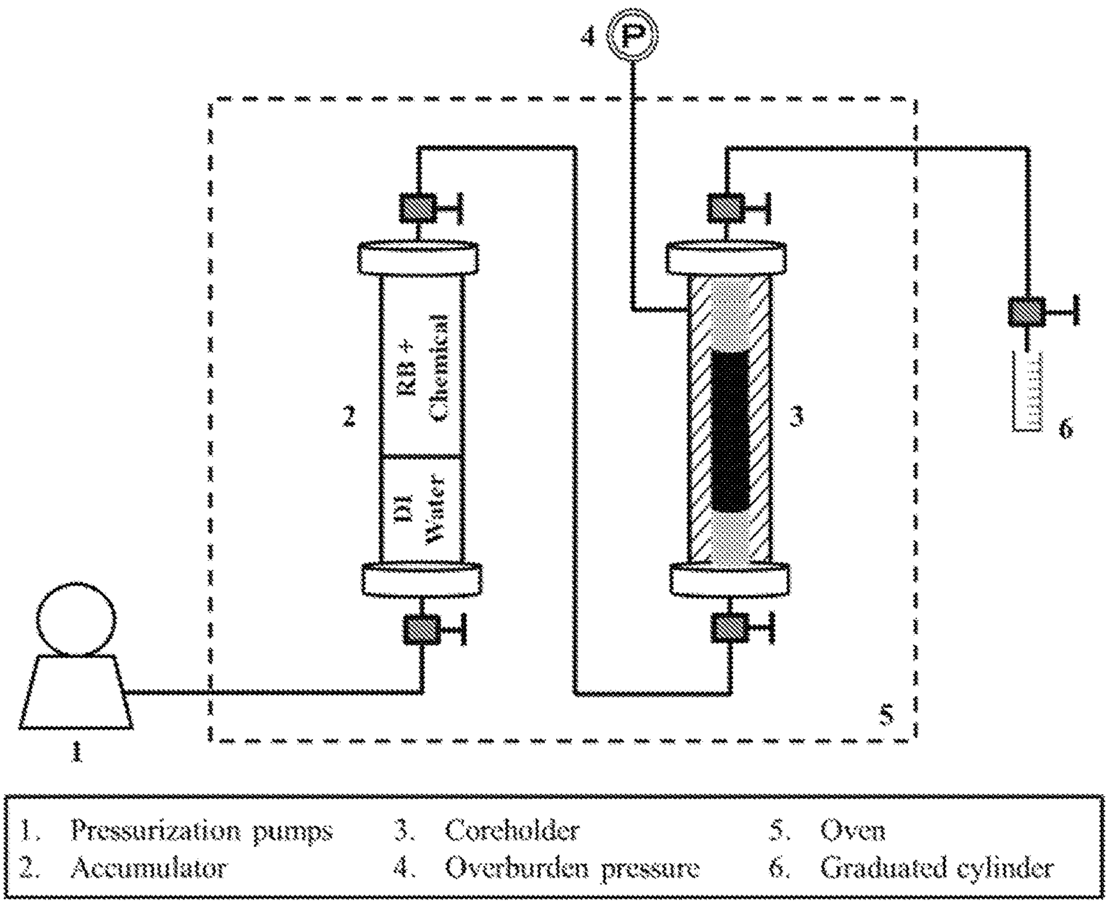
FIG. 34 provides a schematic diagram of an experimental set-up used for forced imbibition measurements.

FIG. 34 shows the experimental set-up for forced imbibition. The experiment was performed at 347 K. There was no backpressure, in other words, effluent side was open to the atmosphere during the experiment. The corresponding solution for each case was injected at a constant flow rate of 100 $cm^3$/hr. The flow rate was increased to 300 $cm^3$/hr after no more oil was produced, to minimize the capillary end effect. Produced fluids were collected in vials to calculate oil recovery.

Results were used to estimate the Amott index to water $I_w$ as follows:

$$I_w = \frac{v_{o,SI}}{v_{o,SI} + v_{o,FI}} \quad (1)$$

where $V_{o,SI}$ and $V_{o,FI}$ are oil volumes recovered by the spontaneous imbibition and forced imbibition experiments, respectively.

The rate for the forced imbibition experiment was chosen similarly to the core saturation procedure. The rate was set to give a capillary number of $2\times10^{-5}$. The equation for capillary number $N_{vc}$ used in this Example is as follows:

$$N_{VC} = \frac{v\mu_w}{k^{\circ}_{rw}\sigma\cos\theta} \quad (2)$$

where v is interstitial velocity, $\mu_w$ is water viscosity, $k^{\circ}_{rw}$ is endpoint water relative permeability, $\sigma$ is water/oil interfacial tension, and $\theta$ is oil/water contact angle. It was assumed that $k^{\circ}_{rw}\sigma$ cos $\theta$=1 mN/m, as given commonly in the literature for water-wet media.

The increased injection rate for minimizing the capillary end effect was based on a Rapoport and Leas number ($N_{RL}$) of 2.5 cp-cm$^2$/min or greater. $N_{RL}$ in [cp·cm$^2$/min] is given as follows:

$$N_{RL} = Lu\mu_0 \quad (3)$$

where L is core length, u is superficial velocity, and $\mu_o$ is water viscosity.

Results and Discussion. This section discusses the experimental results from contact angle and imbibition experiments. The contact angle experiments consisted of two sets: calcite and Eagle Ford shale pieces. The imbibition experiments consisted of spontaneous and forced imbibition.

Contact Angle Experiment. The overall charge of glycine depends on the pH of the solution (FIG. 30). An overall negative charge occurs if the pH is greater than the pI of glycine, i.e., 5.97. Calcite's pzc is reported to be 8.8. Therefore, glycine is expected to alter the wettability if the solution pH is between 5.97 and 8.8. Table 20 summarizes the solution pH measured before and after the contact angle experiments for all the cases. This table shows that the pH values for all glycine cases were within the pH window for wettability alteration. The acetate and formate solutions were basic, unlike the glycine solutions.

Figure 38A:
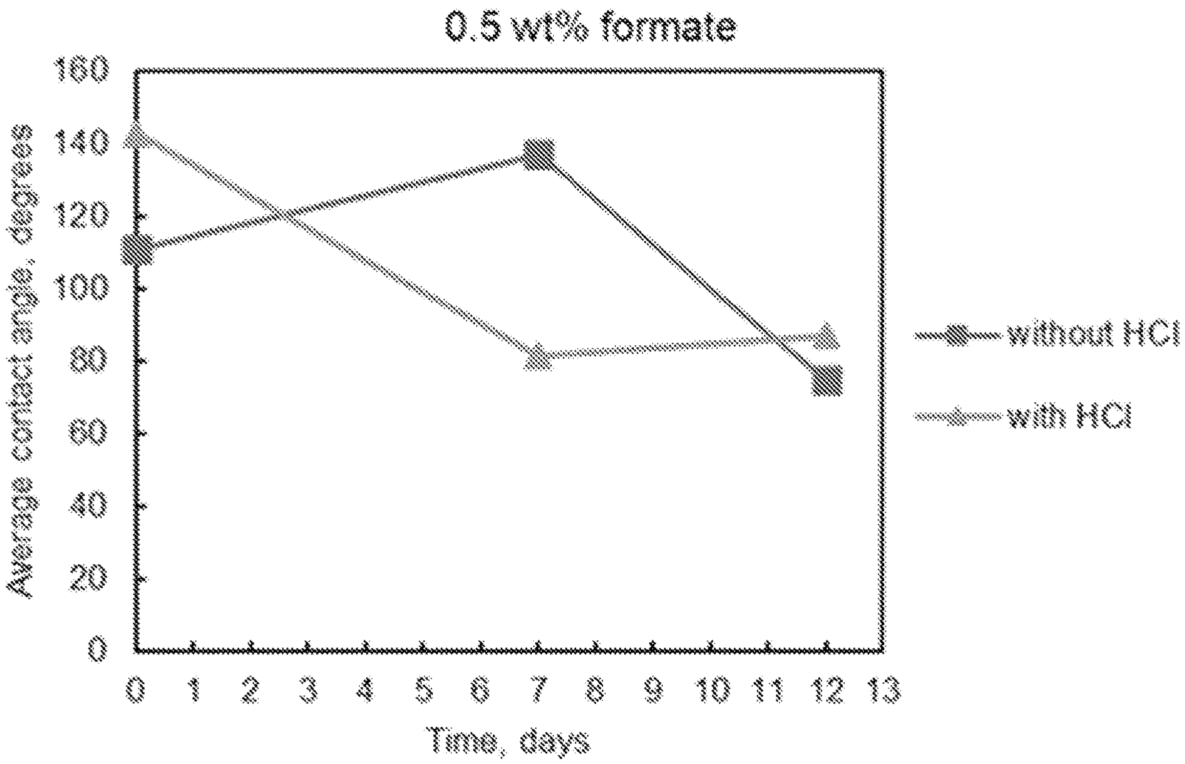
FIG. 38A, FIG. 38B, FIG. 38C, and FIG. 38D provide plots showing results of acetate contact angle experiment with calcite at different formate solution concentrations.
Figure 38B:
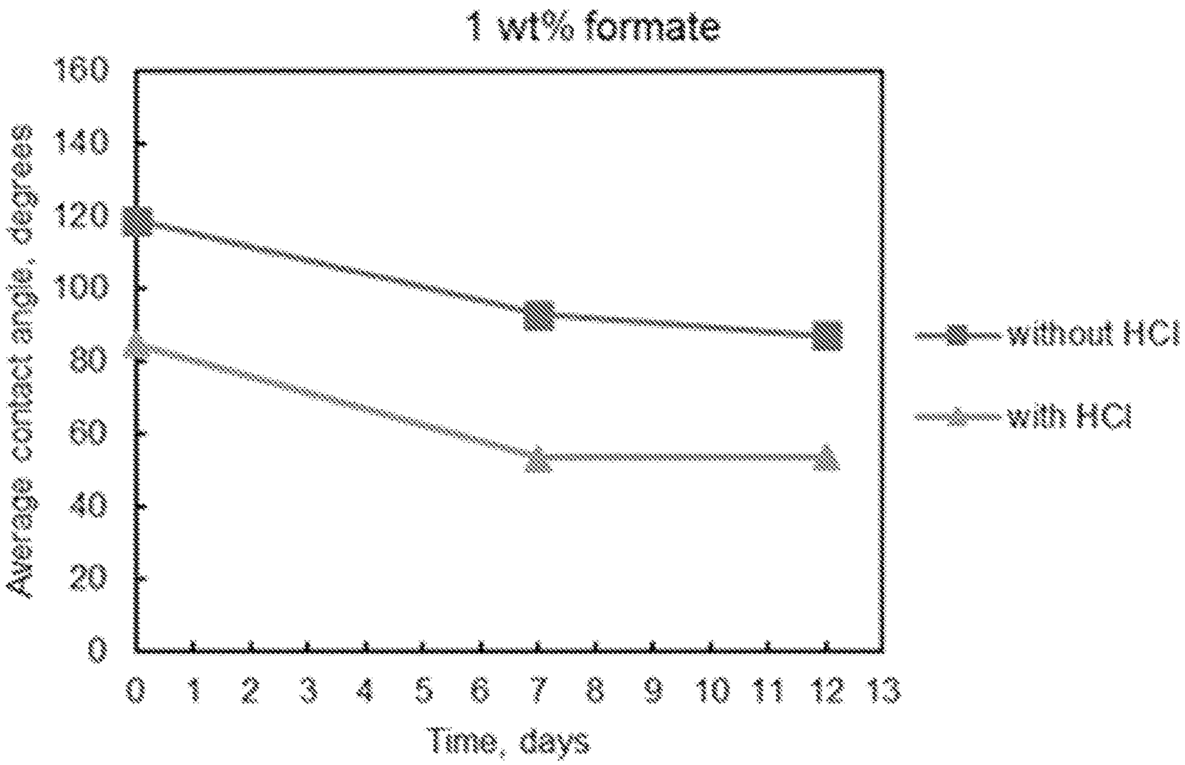
Figure 38C:
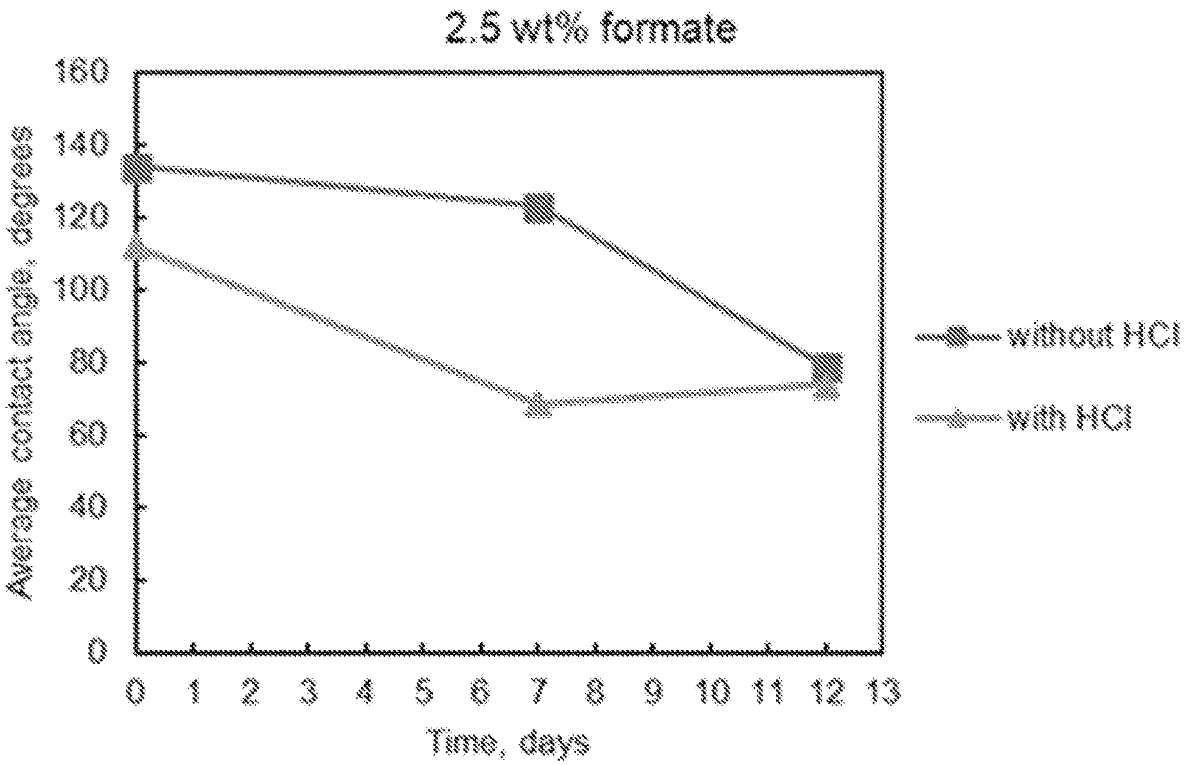
Figure 38D:
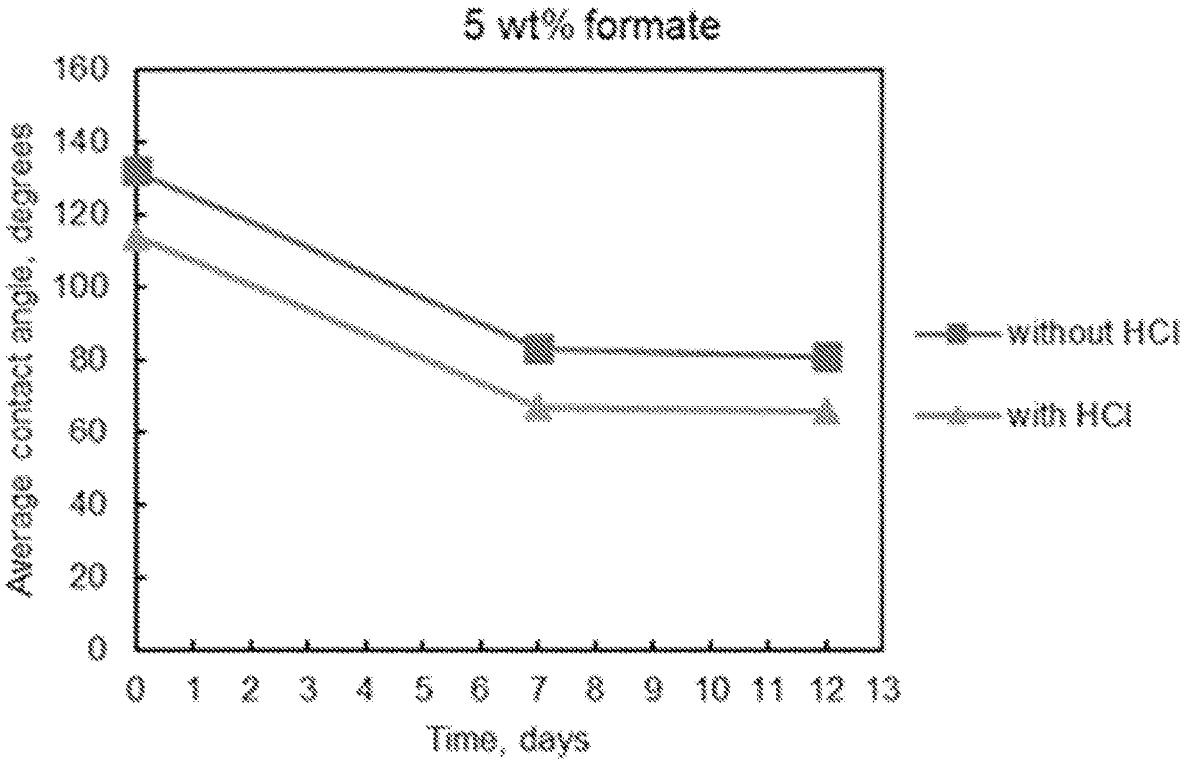

FIG. 35, FIG. 36A, FIG. 36B, FIG. 36C, FIG. 36D, FIG. 37A, FIG. 37B, FIG. 37C, FIG. 37D, FIG. 38A, FIG. 38B, FIG. 38C, and FIG. 38D present the contact angle values for calcite surfaces in RB and different concentrations of glycine, acetate, and formate with and without HCl. A significant reduction in contact angle was observed over time for most glycine cases. For example, it reached nearly 40° at the glycine concentrations of 2.5 and 5 wt % (FIG. 38C and FIG. 38D). It is clear from these experiments that glycine with 2.5 wt % concentration is more optimal from the economical point of view. However, the RB and acetate cases without HCl did not significantly reduce the contact angle. The formate cases without HCl resulted in a slightly water-wet state with contact angles of approximately 80° (FIG. 38A, FIG. 38B, FIG. 38C, FIG. 38D).

Table 20 indicates that the initial solution pH of glycine was smaller than that of formate and acetate. Since lower pH can result in calcite dissolution reaction, this might have occurred for the glycine cases. Calcite dissolution may cause absorbed polar components to be released from the rock surface. Then, wettability alteration is possible if negatively charged ions are attracted by positively charged calcite surface, as is the case with glycine at pH between its pI and the surface pzc.

That wettability alteration to water-wet state is thought to be enhanced when formate or acetate anions are present in the solution, after calcite dissolution occurred. This is because formate and acetate anions can be attached to positively charged calcite surface once calcite dissolution resulted in a release of oil molecules from the calcite surface. Table 20 shows that cases of acetate and formate with HCl had pH values close to the pH of glycine solution at the same concentration. Reducing the solution pH for the formate and acetate cases enhanced the wettability alteration as shown in FIGS. FIG. 35, FIG. 36A, FIG. 36B, FIG. 36C, FIG. 36D, FIG. 37A, FIG. 37B, FIG. 37C, FIG. 37D, FIG. 38A, FIG. 38B, FIG. 38C, and FIG. 38D. In particular, a significant improvement was observed with formate; the contact angle was reduced to 50-60° with the formate cases with HCl. Even though a lowered pH improved the RB case as well, the contact angle was still around 80°. This observation confirms that it is essential to have negatively charged ions (e.g., glycine with pH value above its pI and carboxylate anions) along with calcite dissolution for a greater wettability alteration.

Figure 39:
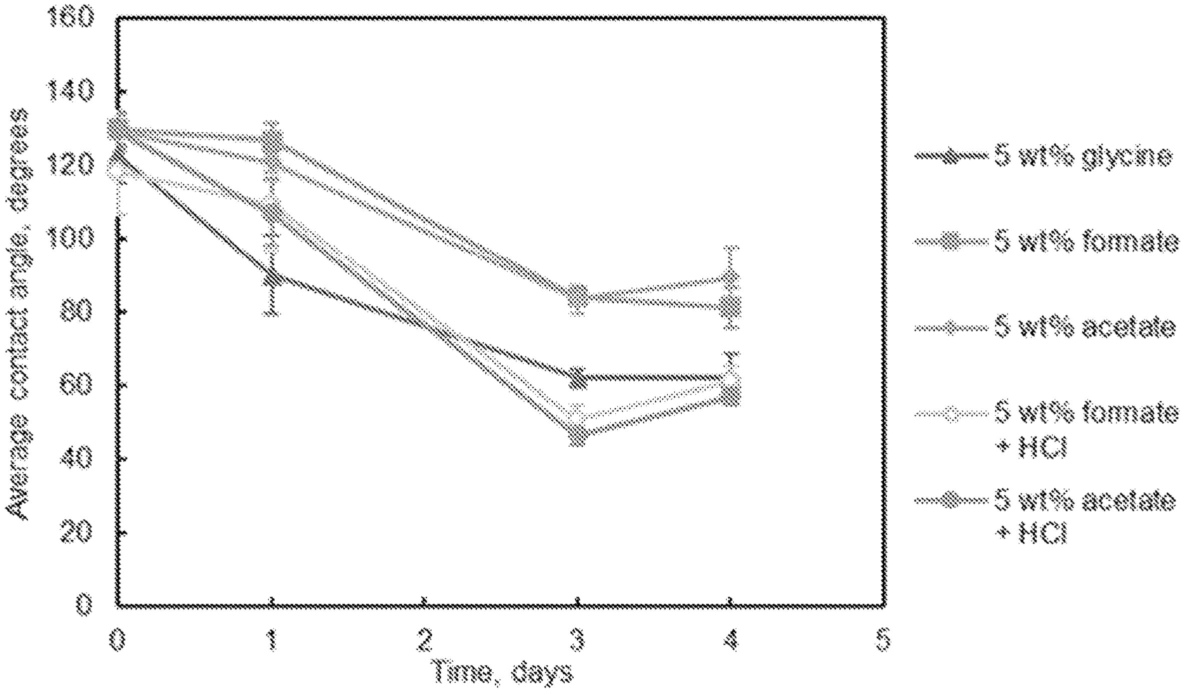
FIG. 39 provides a plot showing results of contact angle experiments with Eagle Ford shale plates.

As mentioned above, five cases (5 wt % glycine, 5 wt % acetate, 5 wt % acetate+HCl, 5 wt % formate, and 5 wt % formate+HCl) were tested with Eagle Ford shale rock surfaces. This was to reconfirm that the addition of HCl improves the wettability alteration ability of formate and acetate. FIG. 39 shows that the final contact angles of formate and acetate reduced to approximately 60° with HCl and to about 80° without HCl. Reducing the pH of the carboxylate solution (formate and acetate) made the wettability alteration strength similar to that of glycine, which also resulted in a contact angle reduction to 60°.

Spontaneous and Forced Imbibition Experiments. The contact angle experiment indicated wettability alteration; however, further testing of the additives at a core scale was performed to verify the observed wettability alteration. As described above, the first set of experiments used RB, 5 wt % glycine, 5 wt % acetate, and 5 wt % formate with no HCl for the four cores given in Table 18. The second set of experiments used RB, RB+HCl, 2.5 wt % glycine, 5 wt % formate+HCl, and 5 wt % acetate+HCl for the six cores given in Table 19. These concentrations were chosen because they performed best for glycine and formate. In the case of acetate, 5 wt % was also selected since this concentration reduced contact angle on shale plates similarly to the rest of the chemicals.

IFT between Oil1 and four solutions were also measured and given in the Table 21 to verify that oil recovery improved due to wettability alteration and not to IFT reduction. Even though IFT for carboxylate solutions/oil1 were slightly lower than those for both RB and glycine solutions, this small difference is not expected to change the capillary pressure significantly.

In addition to rock properties, it is important to consider the units used for oil recovery calculations. Therefore, FIG. 40A, FIG. 41A, FIG. 42A, and FIG. 43A show the oil recovery in the units of Original Oil In Place (OOIP), and FIG. 40B, FIG. 41B, FIG. 42B, and FIG. 43B display the oil recovery in terms of the Pore Volume (PV).

Figure 40A:
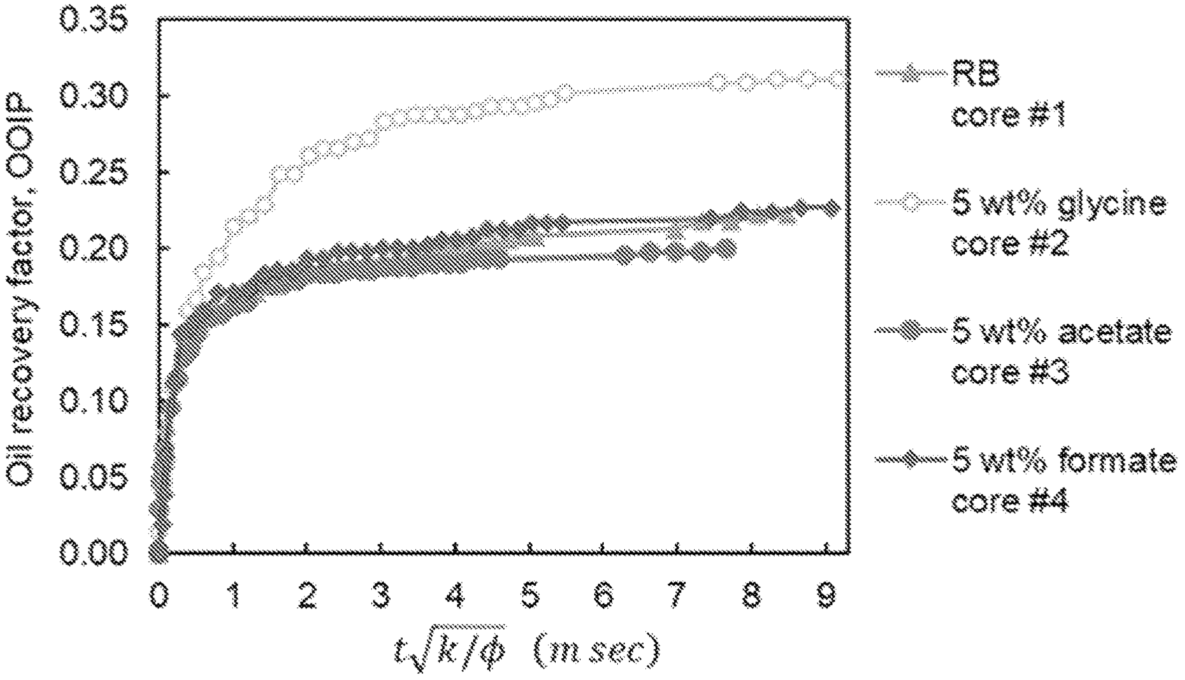
FIG. 40A and FIG. 40B provide plots showing results of a set of spontaneous imbibition experiments with Texas Cream limestone cores.
Figure 40B:
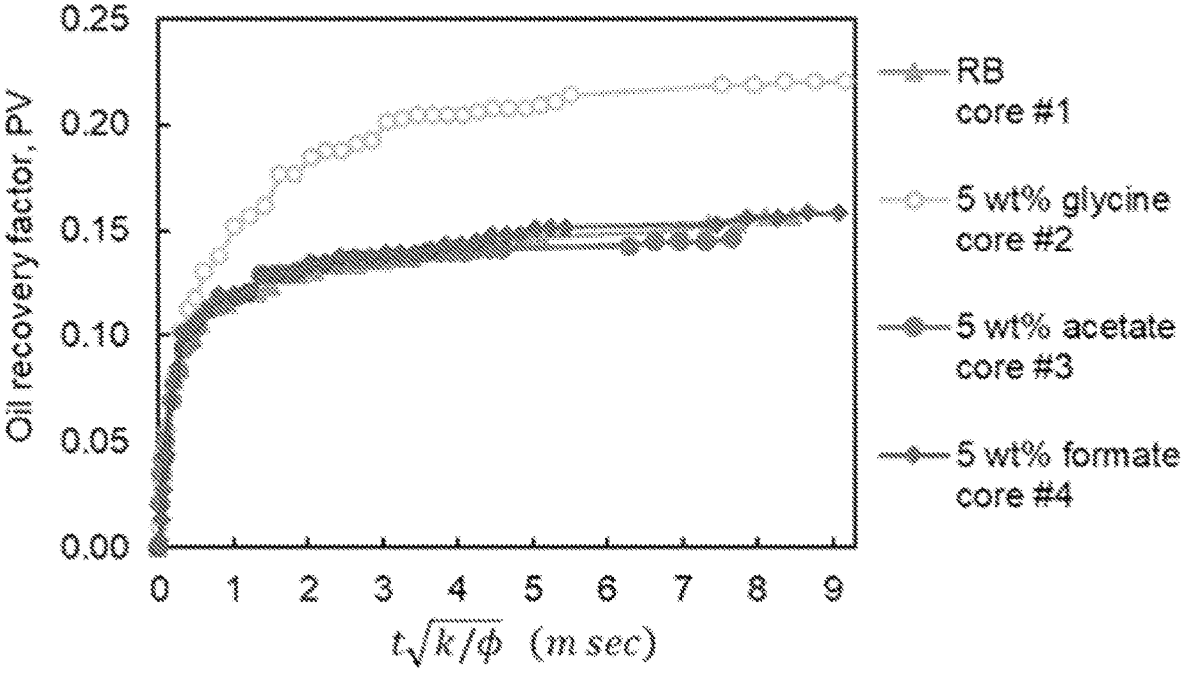

FIG. 40A and FIG. 40B show the oil recovery factors from the spontaneous imbibition experiments. Due to the differences between the core properties, the oil recovery graphs were corrected with the Leverett factor, $\sqrt{k/\varphi}$, for a better comparison. Each experiment was terminated when a plateau was reached. Glycine outperformed the other cases, reaching a recovery factor of 0.32 in spontaneous imbibition. The oil recovery factors of acetate and formate were 0.20 and 0.23 respectively which is very close to RB recovery of 0.22 (FIG. 40A).

Figure 41A:
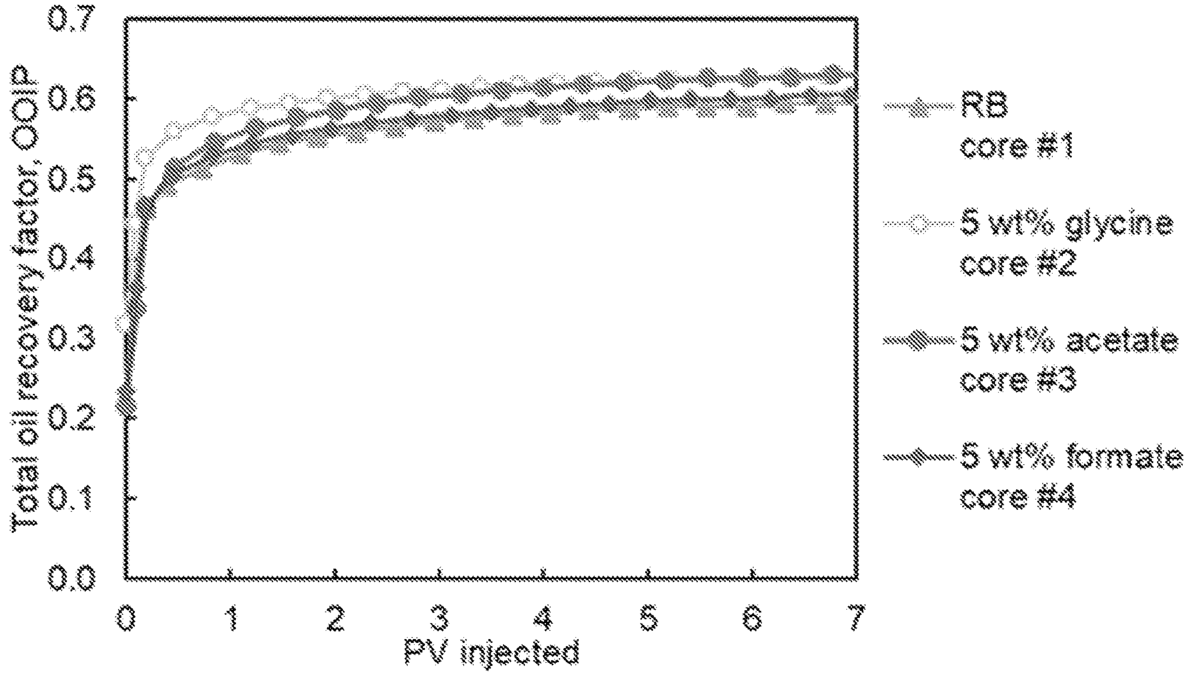
FIG. 41A and FIG. 41B provide plots showing results of a set of forced imbibition experiments with Texas Cream limestone cores.
Figure 41B:
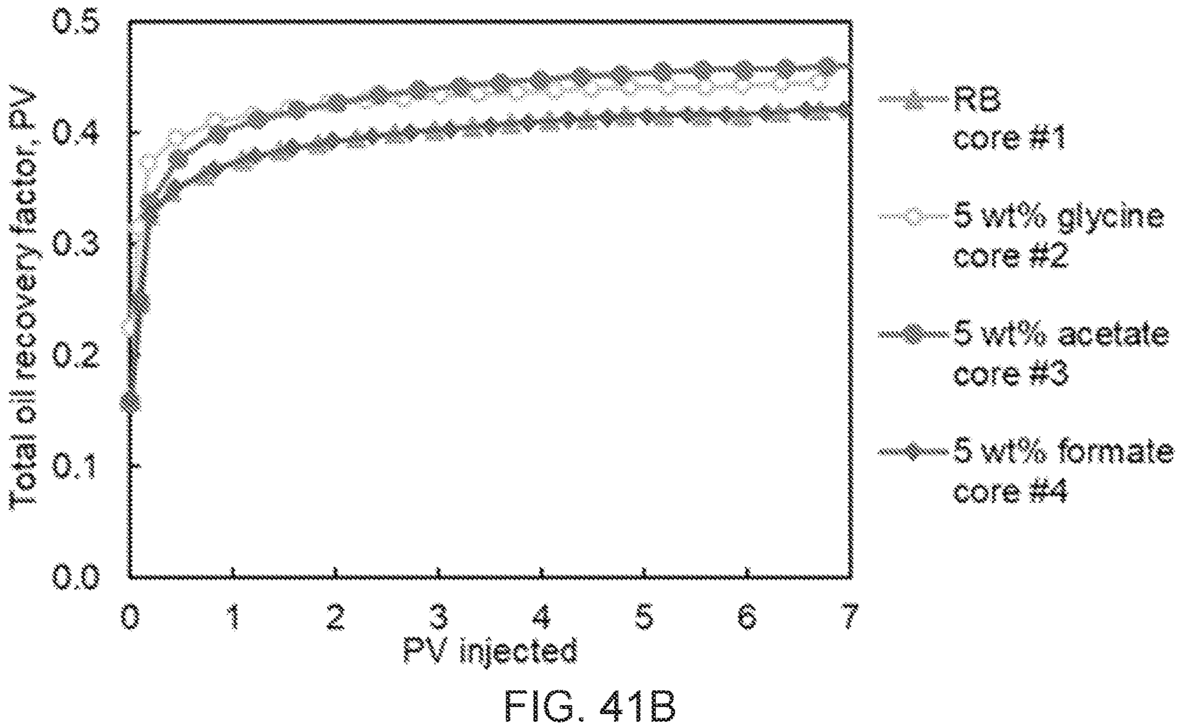

The forced imbibition experiments were carried out immediately after the spontaneous imbibition. FIG. 41A and FIG. 41B show oil recoveries during the forced imbibition experiments with respect to the pore volumes of injection. Even though final oil recoveries are similar between the cases, it is important to note that on a field scale usual injection is around 1 PV and glycine is clearly outperforming the rest of the chemicals at PVs injected less than or equal to 1. Table 22 shows Amott indexes to water, and the water saturation at the beginning of the experiments, after spontaneous imbibition, and after forced imbibition, for the first set of cores (see Table 18). The Amott index to water for glycine was significantly higher than those for RB, formate, and acetate, indicating that the glycine case became more water wet. These results are consistent with the contact angle results presented in the previous section.

Figure 42A:
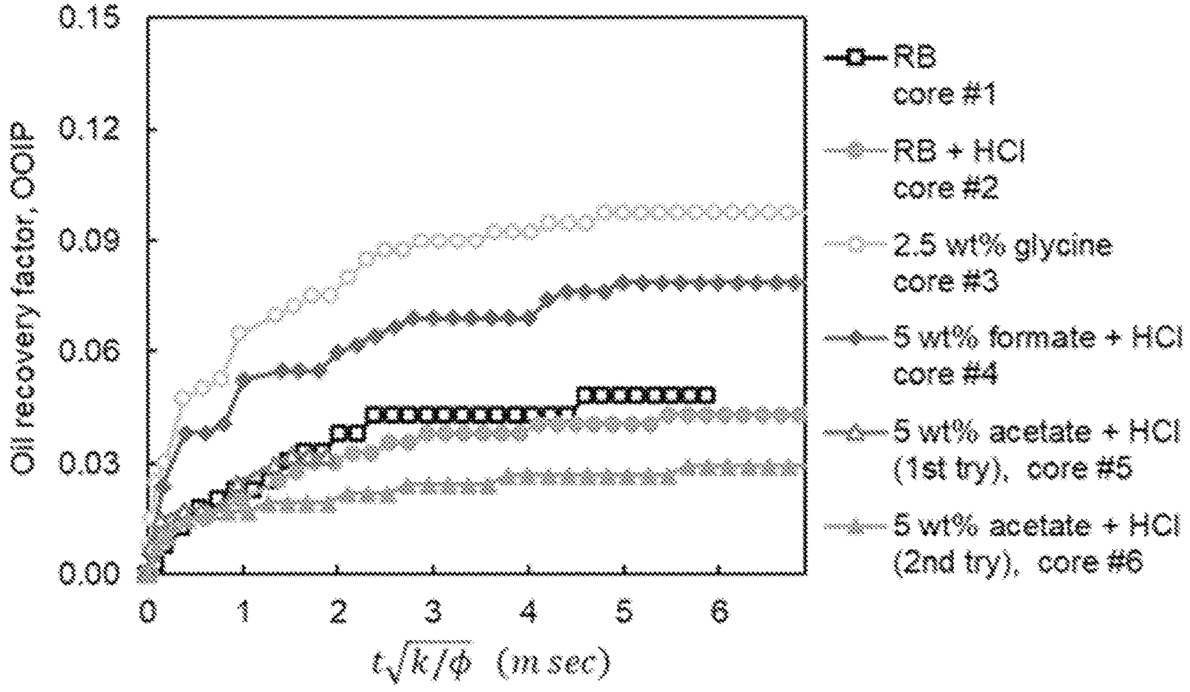
FIG. 42A and FIG. 42B provide plots showing results of a set of spontaneous imbibition experiments with Texas Cream limestone cores.
Figure 42B:
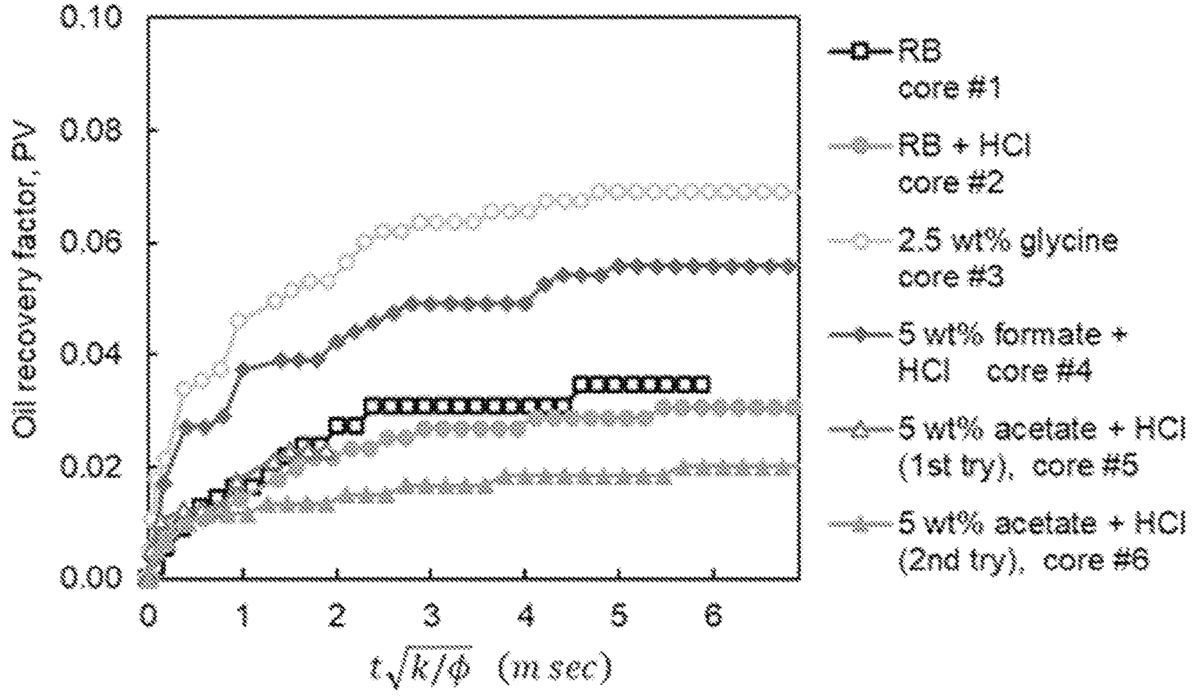

FIG. 42A and FIG. 42B present the oil recoveries from spontaneous imbibition for the second set of experiments. As expected from the contact angle experiment, the wettability alteration by formate was enhanced by the reduced pH. The formate solution with HCl was comparable to 2.5 wt % glycine, which recovered more than twice greater than RB or RB+HCl. This observation reconfirmed the synergy of the solution pH effect and the negatively charged carboxyl group. However, this synergy was not observed in two duplicated experiments for the acetate case. The first attempt of 5 wt % acetate+HCl resulted in a similar amount of oil to RB, and the second attempt resulted in a slightly smaller amount of oil recovery. The lower oil recovery from core #6 of the second attempt can be due to a longer aging time, which resulted in a stronger oil-wet state. Based on these two experiments, it can be concluded that acetate may not be favorably used as an enhanced oil recovery technique.

Figure 43A:
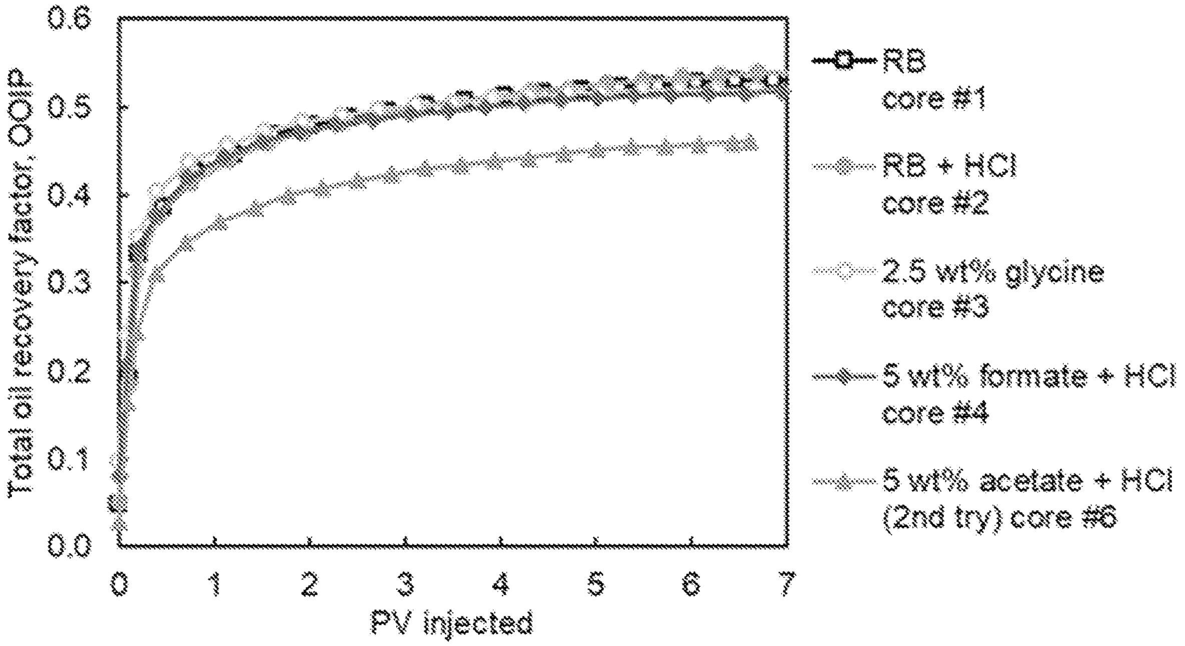
FIG. 43A and FIG. 43B provide plots showing results of a set of forced imbibition experiments with Texas Cream limestone cores.
Figure 43B:
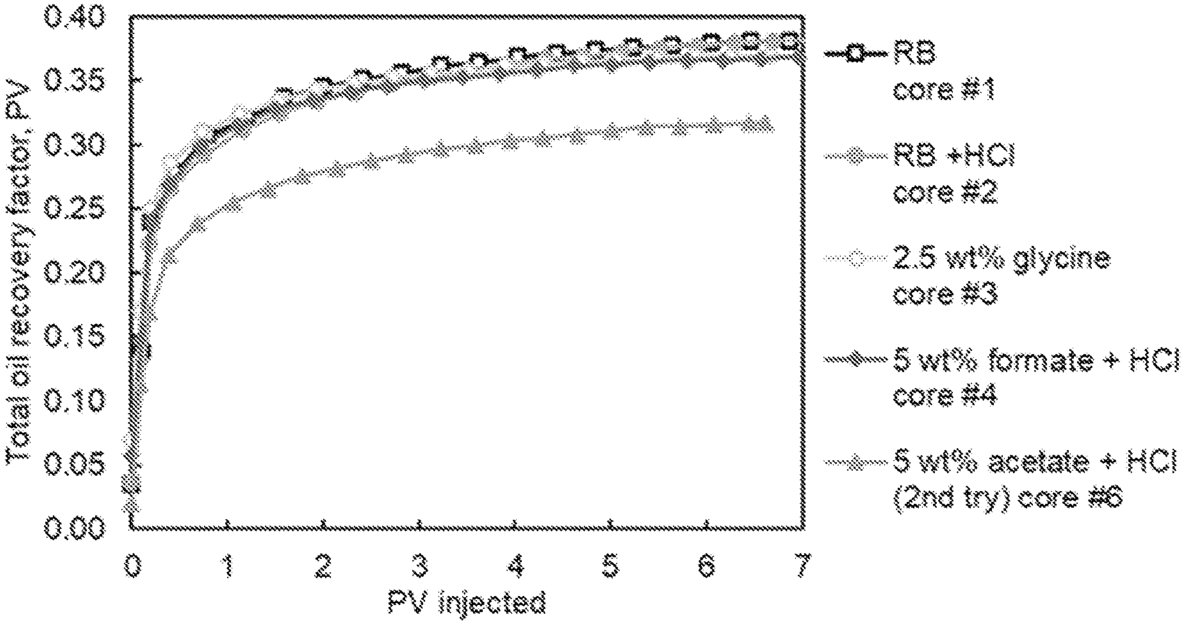

FIG. 43A and FIG. 43B show the oil recoveries from forced imbibition for the second set of experiments. Since the core used for the first attempt of 5 wt % of acetate was discarded before reaching a plateau in spontaneous imbibition test, it was not possible to continue with forced imbibition experiment. Therefore FIG. 43A and FIG. 43B illustrate the results of only the second attempt for acetate. Table 23 shows Amott indexes to water, and the water saturation at the beginning of the experiments, after spontaneous imbibition, and after forced imbibition, for the second set of cores (see Table 19). The 2.5 wt % glycine case has the greatest value of Amott index and is slightly greater than the 5 wt % formate+HCl case. Comparison between "RB+HCl" and "5% formate+HCl" demonstrates the importance of the carboxyl group in the wettability alteration (in other words, calcite dissolution alone was not effective). Furthermore, the comparison between "5 wt % formate" and "5 wt % formate+HCl" shows the importance of the addition of HCl (that is, the presence of carboxylate anions alone was not effective). It was hypothesized that the carboxyl group interacted with the rock surfaces after calcite dissolution by the reduced solution pH as explained above; though the addition of HCl did not enhance the acetate case. Further investigation may be useful to understand details of the binding of ions on the rock surface at different scales, for example, ab initio, molecular dynamics and surface complexation modeling.

Figure 44A:
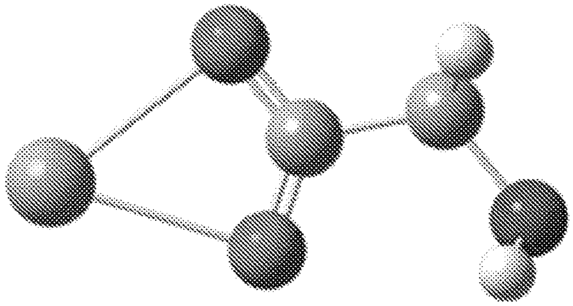
FIG. 44A and FIG. 44B provide configurations showing two possible mechanisms of calcium binding to glycine.
Figure 44B:
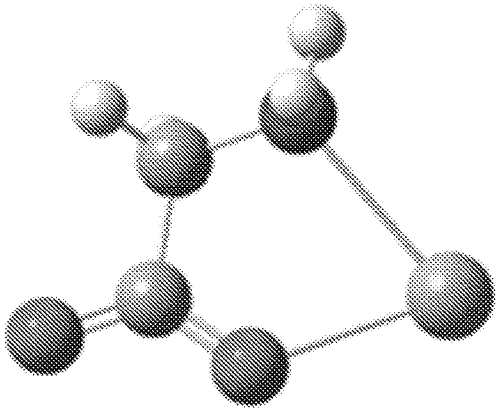
Figure 45:
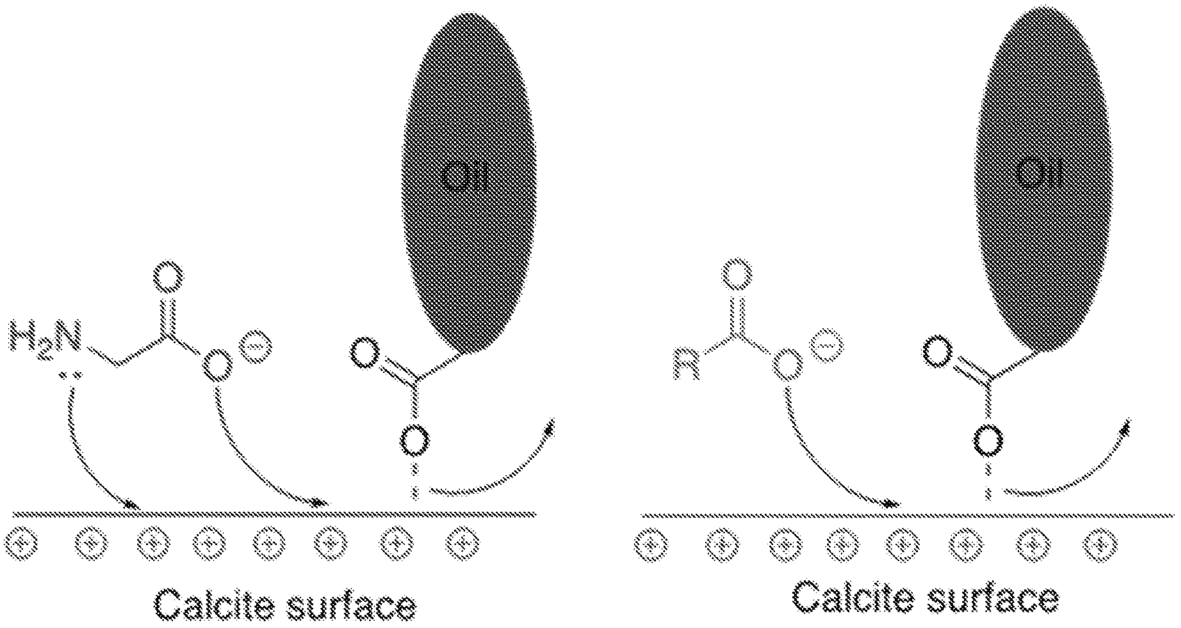
FIG. 45 provides illustrations showing an amino group's role in superiority of glycine (on the left) over carboxylate anions (on the right) due to chelate effect.

Nonetheless, results show that glycine was more effective than formate and acetate with/without controlling pH. It is reasonable to attribute this to the amino group of glycine, which is the structural difference between glycine and acetate, in the presence of the carboxyl group. That is, other than the negatively charged carboxylate side, the electron-donating amino group of glycine plays the key role in oil recovery improvement via wettability alteration. This electron-donating group of the glycine makes it a chelating ligand, or more specifically, a bidentate ligand that can interact with calcium cation in the solution and/or calcite surface with two functional groups in the molecule. Chelating ligands have a higher affinity for metal ions than analogous monodentate ligands, which are only capable of interacting with one functional group. The chelate property of glycine that makes possible to bind to calcite is via two mechanisms. FIG. 44A and FIG. 44B present two ways for calcium cation to bind to glycine. It was hypothesized that glycine will bind to calcium and magnesium cations in brine and in turn the rock surface will try to compensate for these sequestered cations to restore equilibrium. This process will cause calcite dissolution which should enhance the wettability towards a more water-wet state, since oil molecules will be released from the calcite surfaces as the cations are released. This hypothesis was firstly shown for chelating agents such as ethylenediaminetetraacetic acid (EDTA), hydroxyethylethylenediaminetriacetic acid (HEDTA), and diethylenetriaminepentaacetic acid DTPA, that were able to enhance oil recovery better than low salinity brine. Furthermore, it was hypothesized that glycine, in a similar fashion, is entropically more favorable to get attached to the calcite surface than naphthenic acids from oil, which are only capable of interacting with calcite surfaces via the carboxyl group. This mechanism is illustrated in FIG. 45. This higher affinity of calcite surface towards glycine due to chelate effect compared to carboxylate ions can be one of the reasons why glycine alters wettability more significantly.

To recap, results in this Example indicate the efficacy of formate in wettability alteration under slightly reduced pH due to a possible synergy between calcite dissolution and attraction of carboxyl group to calcite surface. The results also showed the value of the amino group for the wettability alteration by glycine, which may be more effective than acetate with/without pH adjustment. This may be attributed to the presence of amino group along with the carboxyl group making glycine a chelating ligand.

Conclusions. Objectives of this Example included investigating formate and acetate anions as wettability modifiers for carbonate rocks and to clarify the utility of the amino group of glycine. This was achieved by comparing contact-angle and imbibition experimental results of these three chemicals. The main conclusions are as follows:

The contact angle experiments with oil-aged calcite surfaces and with Eagle Ford shale plates showed the significant superiority of glycine to acetate and a slight superiority to formate. This was also reconfirmed by the subsequent Amott tests with Texas Cream limestone cores, clarifying the importance of the amino group of glycine.

It was hypothesized that the key role of the amino group to alter wettability comes from the chelate effect, which occurs with glycine, not with formate and acetate. In addition to carboxyl group, the amino group acts as a binding functional group (electron donor group) for the chelate effect to occur. This makes the glycine a bidentate ligand and entropically more favorable to get attached to calcium cation, triggering additional calcite dissolution, and/or to get directly attached to the calcite surface with both amino and carboxyl group. This property of glycine will result in a wettability alteration greater than that of acetate or formate, which are only capable of interacting via the carboxyl group.

Acetate and formate became more effective in reducing the contact angle of oil droplets on the shale plates when the solution pH was lowered to the same level as glycine. RB with the reduced pH was not effective in reducing the contact angle of oil droplets on calcite surfaces. This indicates the importance of the synergy between carboxyl group and the solution pH. In comparison to acetate, formate was better in its ability to alter the wettability.

The imbibition tests showed a successful synergy of calcite dissolution and the attraction to the rock surface with glycine (via the chelate effect) and formate (via the carboxyl group). Amott indexes of glycine and formate+HCl solutions were noticeably higher than the rest of the cases. It is not clear why the acetate cases were not enhanced by the addition of HCl in the imbibition tests, which suggest that further investigation is needed.

Above-mentioned points allows introducing the use of formate at reduced pH for wettability alteration of oil-wet carbonate rocks and thus for enhanced oil recovery because of its ability to improve the water imbibition.

Nomenclature

Symbols

L Core length, m
$k^{o}_{rw}$ Endpoint water relative permeability
$N_{vc}$ Capillary number
$N_{RL}$ Rapoport and Leas number
V Interstitial velocity, m/s
u Superficial velocity, m/s
$V_{o,SI}$ Oil volume produced by spontaneous imbibition, $cm^3$
$V_{o,FI}$ Oil volume produced by forced imbibition, $cm^3$
$I_w$ Amott index to water

Greek

Θ Oil/water contact angle, degrees
$\mu_o$ Oil viscosity, Pa·s
$\mu_w$ Water viscosity, Pa·s
Σ Water/oil interfacial tension, N/m

Abbreviations pI Isoelectric point
pzc Point of zero charge
pH Measure of acidity
$pK_a$ Negative base-10 log of the acid dissociation constant
RB Reservoir Brine
Oil1 Crude oil used with carbonates and calcite chips
Oil2 Crude oil used with Eagle Ford shale

TABLE 14

Properties of crude oil "Oil1" used in the contact angle experiments with calcite and in the imbibition experiments.

| | | |
|---|---|---|
| | Molecular weight, g/mol | 210 |
| | Density, $kg/m^3$ | 878 (at 293 K) |
| | | 849.6 (at 347 K) |
| | Viscosity, cP | 2.6 (at 347 K) |
| SARA, wt % | Saturates | 71.6 |
| | Aromatics | 24.8 |
| | Resins | 3.0 |
| | Asphaltenes (pentane insoluble) | <0.1 |

TABLE 15

Properties of crude oil "Oil2" used in the contact angle experiments with shale plates.

| | | |
|---|---|---|
| | Molecular weight, g/mol | 239 |
| | Density, $kg/m^3$ | 821.3 (at 295 K) |
| | Viscosity, cP | 1.09 (at 338 K) |
| SARA, wt % | Saturates | 86.1 |
| | Aromatics | 9.8 |
| | Resins | <4.3 |
| | Asphaltenes (pentane insoluble) | <0.1 |

TABLE 16

Composition of reservoir brine (RB) used in this Example.

| Cations | ppm | Anions | ppm |
|---|---|---|---|
| $Na^+$ | 25170 | $Cl^-$ | 41756 |
| $K^+$ | 210 | $SO_4^{2-}$ | 108 |
| $Ca^{2+}$ | 1292 | | |
| $Mg^{2+}$ | 187 | | |

TABLE 17

Summary of solutions tested in contact angle experiments with calcite.

| Solution name | Solution | Concentrations in RB (wt %) |
|---|---|---|
| RB | Reservoir Brine | — |
| RB + HCl | pH adjusted Reservoir Brine | — |
| Glycine | Glycine | 0.5, 1, 2.5, 5 |
| Formate | Sodium Formate | 0.5, 1, 2.5, 5 |
| Acetate | Sodium Acetate | 0.5, 1, 2.5, 5 |
| Formate + HCl | pH adjusted Sodium Formate | 0.5, 1, 2.5, 5 |
| Acetate + HCl | pH adjusted Sodium Acetate | 0.5, 1, 2.5, 5 |

TABLE 18

Petrophysical properties of the first set of Texas Cream limestone cores.

| Core number | Porosity, % | Absolute permeability (with brine), mD | Residual water saturation, % |
|---|---|---|---|
| 1 | 30.1% | 14.47 | 29.5% |
| 2 | 30.3% | 17.11 | 29.2% |
| 3 | 28.3% | 11.12 | 27.0% |
| 4 | 29.2% | 16.08 | 30.4% |

TABLE 19

Petrophysical properties of the second set of Texas Cream limestone cores.

| Core number | Porosity, % | Absolute permeability (with brine), mD | Residual water saturation, % |
|---|---|---|---|
| 1 | 27.1% | 12.4 | 28.1% |
| 2 | 27.7% | 14.4 | 29.2% |
| 3 | 28.0% | 14.0 | 29.2% |
| 4 | 28.9% | 15.7 | 28.9% |
| 5 | 27.9% | 13.5 | 28.7% |
| 6 | 31.1% | 18.7 | 31.1% |

TABLE 20 pH measurements before and after the contact angle experiments with calcite (at room temperature).

| | 0 wt % | 0.5 wt % | 1 wt % | 2.5 wt % | 5 wt % | Solution |
|---|---|---|---|---|---|---|
| Before | 6.82 | | | | | RB |
| After | 7.78 | | | | | |
| Before | 6.08 | | | | | RB + HCl |
| After | 7.89 | | | | | |
| Before | | 6.68 | 6.42 | 6.24 | 6.10 | Glycine |
| After | | 7.94 | 7.73 | 7.53 | 7.62 | |
| Before | | 8.15 | 8.31 | 8.44 | 8.64 | Acetate |
| After | | 8.04 | 7.89 | 7.87 | 7.85 | |
| Before | | 8.07 | 7.96 | 8.12 | 8.11 | Formate |
| After | | 8.26 | 8.22 | 8.05 | 7.96 | |
| Before | | 6.67 | 6.40 | 6.23 | 6.10 | Acetate + |
| After | | 7.66 | 7.50 | 7.28 | 7.11 | HCl |
| Before | | 6.71 | 6.39 | 6.23 | 6.10 | Formate + |
| After | | 7.80 | 7.83 | 7.87 | 8.07 | HCl |

TABLE 21

IFT measurements between Oil1 and four brine solutions.

| Sample | IFT (mN/m) | Standard Deviation |
|---|---|---|
| Oil1 and RB | 8.388 | 0.167 |
| Oil1 and 5 wt % glycine | 8.079 | 0.211 |
| Oil1 and 5 wt % acetate + HCl | 6.730 | 0.120 |
| Oil1 and 5 wt % formate + HCl | 7.137 | 0.115 |

TABLE 22

Final core saturation after the forced imbibition experiment along with the Amott index to water (first set of cores).

| | Swr | Sw after spontaneous imbibition | Sw after forced imbibition (1-Sor) | Amott index to water |
|---|---|---|---|---|
| RB | 29.5% | 45.3% | 71.6% | 0.377 |
| 5% glycine | 29.2% | 51.7% | 73.8% | 0.505 |
| 5% formate | 30.4% | 46.7% | 72.5% | 0.387 |
| 5% acetate | 27.0% | 42.7% | 73.3% | 0.339 |

TABLE 23

Final core saturation after the forced imbibition experiment along with the Amott index to water (second set of cores).

| | Swr | Sw after spontaneous imbibition | Sw after forced imbibition (1-Sor) | Amott index to water |
|---|---|---|---|---|
| RB | 28.1% | 31.6% | 66.6% | 0.090 |
| RB + HCl | 29.2% | 32.8% | 67.6% | 0.094 |
| 2.5% glycine | 29.2% | 36.0% | 66.5% | 0.184 |
| 5% formate + HCl | 28.9% | 34.6% | 65.3% | 0.158 |
| 5% acetate + HCl | 31.1% | 33.1% | 62.7% | 0.063 |

Figure Captions for Example 4. FIG. 30. Molecular structure of different forms of glycine.

FIG. 31. Molecular structure of chemicals used in this Example: (a) formate anion, (b) acetate anion, and (c) glycine.

FIG. 32. Contact angle setup used in this Example.

FIG. 33. Amott cell used in this Example. Oil aged core is placed in the Amott cell and then solution to be tested is poured slowly into the Amott cell. All components were at reservoir temperature (347 K) during setting up the experiment to avoid fluid expansion. Oil produced is accumulated at the top and its volume can be measured from the grating available on the Amott cell.

FIG. 34. Diagram of the experimental set-up used for forced imbibition.

Figure 35:
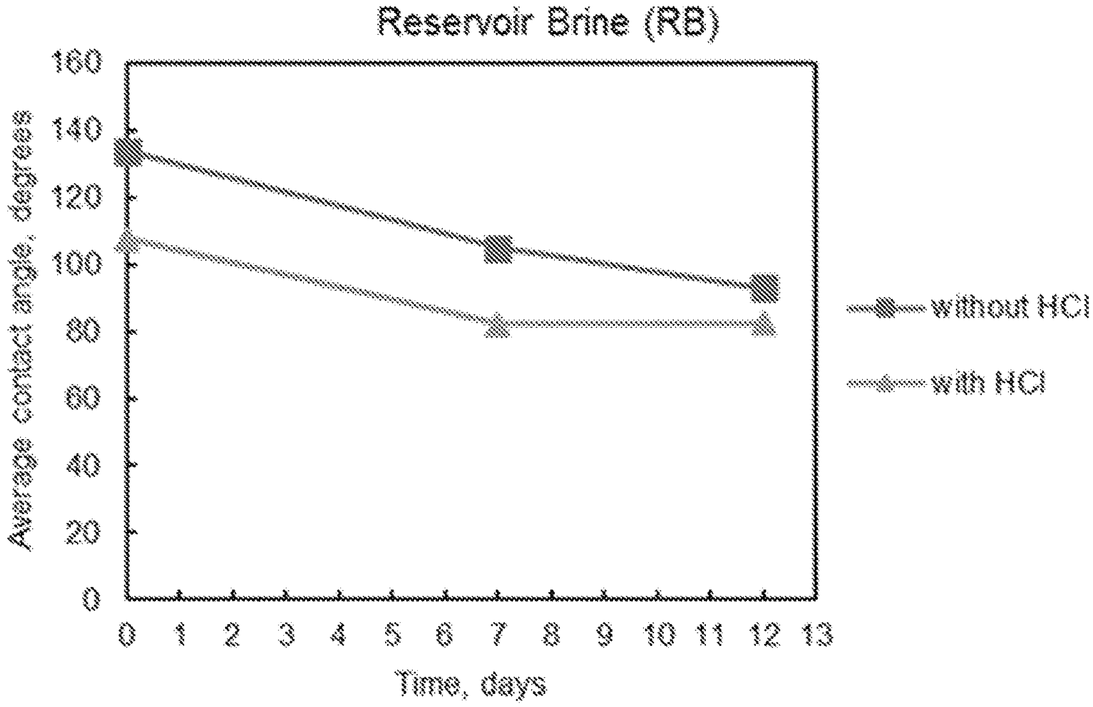
FIG. 35 provides a plot showing results of reservoir contact angle experiments with calcite.
Figure 36A:
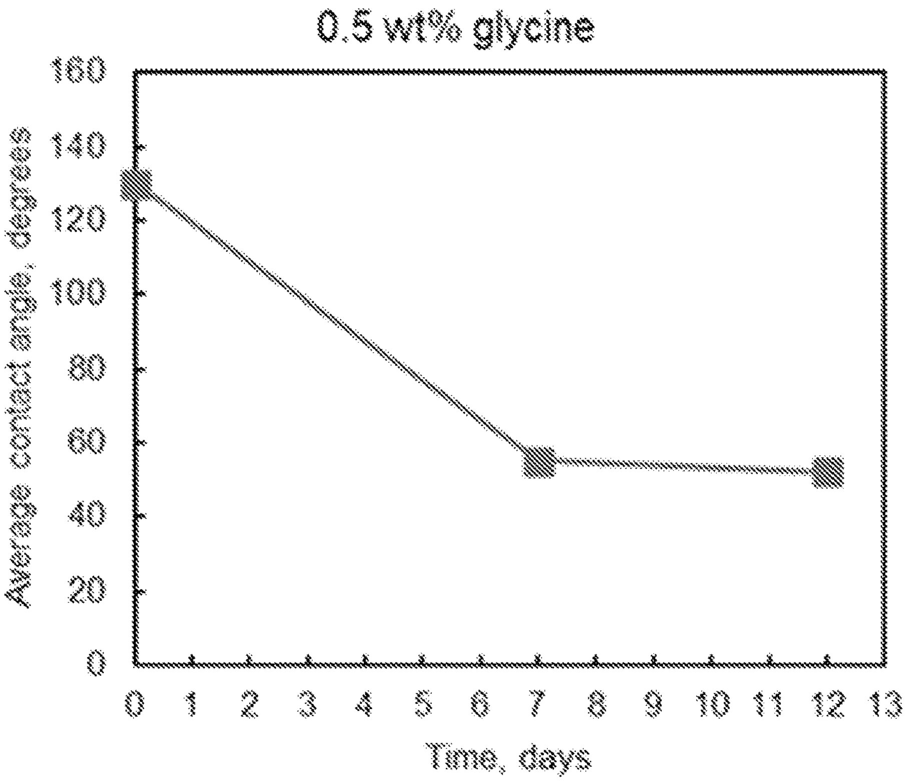
FIG. 36A, FIG. 36B, FIG. 36C, and FIG. 36D provide plots showing results of glycine contact angle experiment with calcite at different glycine solution concentrations.
Figure 36B:
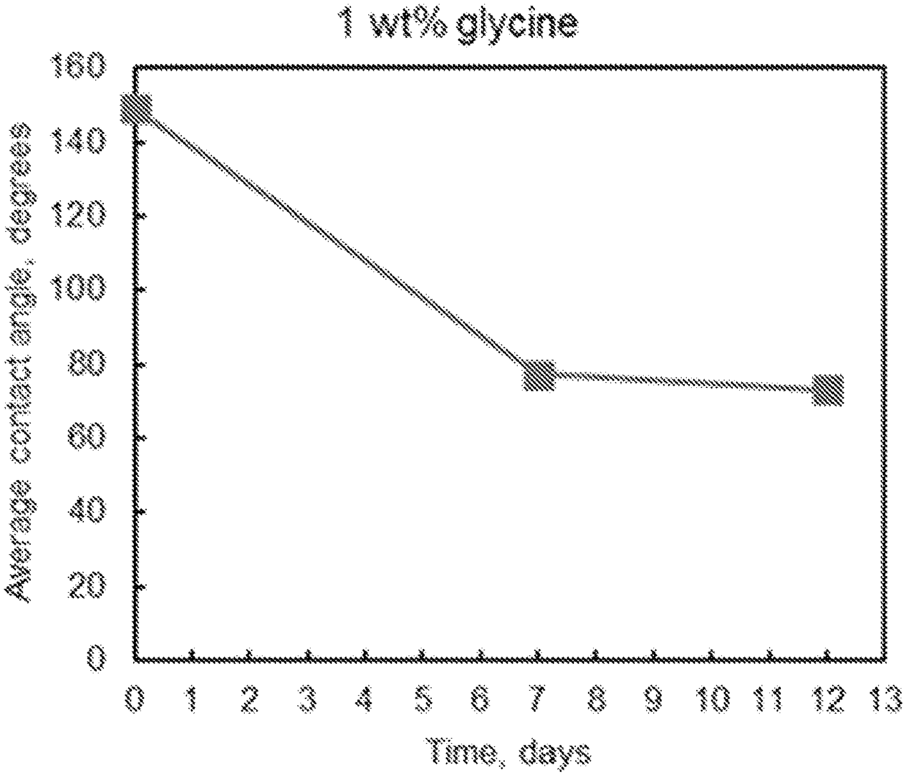
Figure 36C:
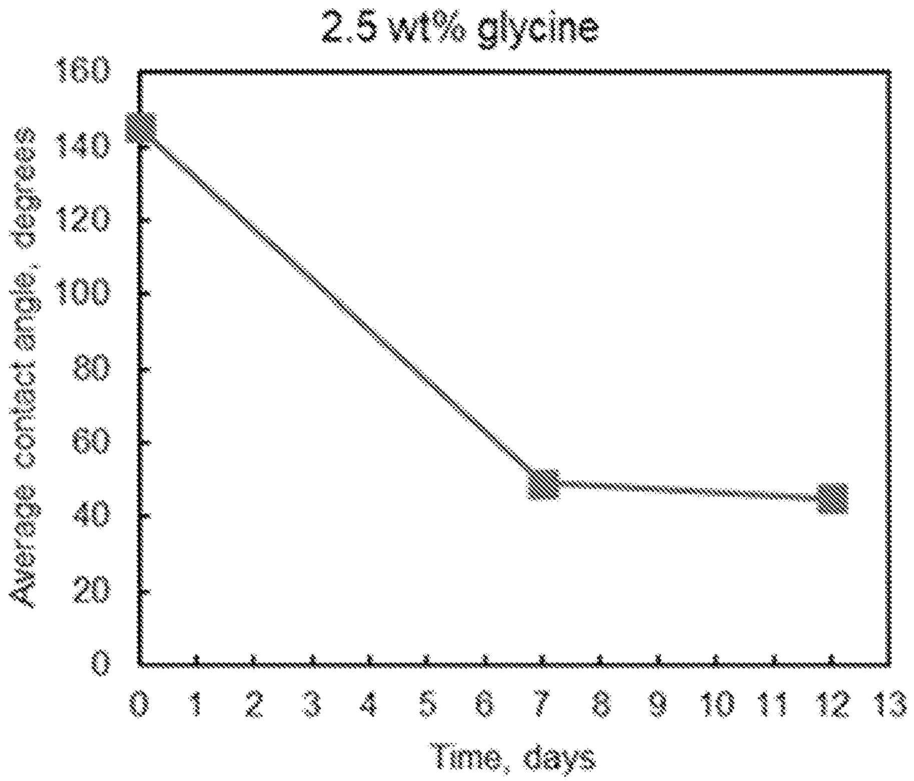
Figure 36D:
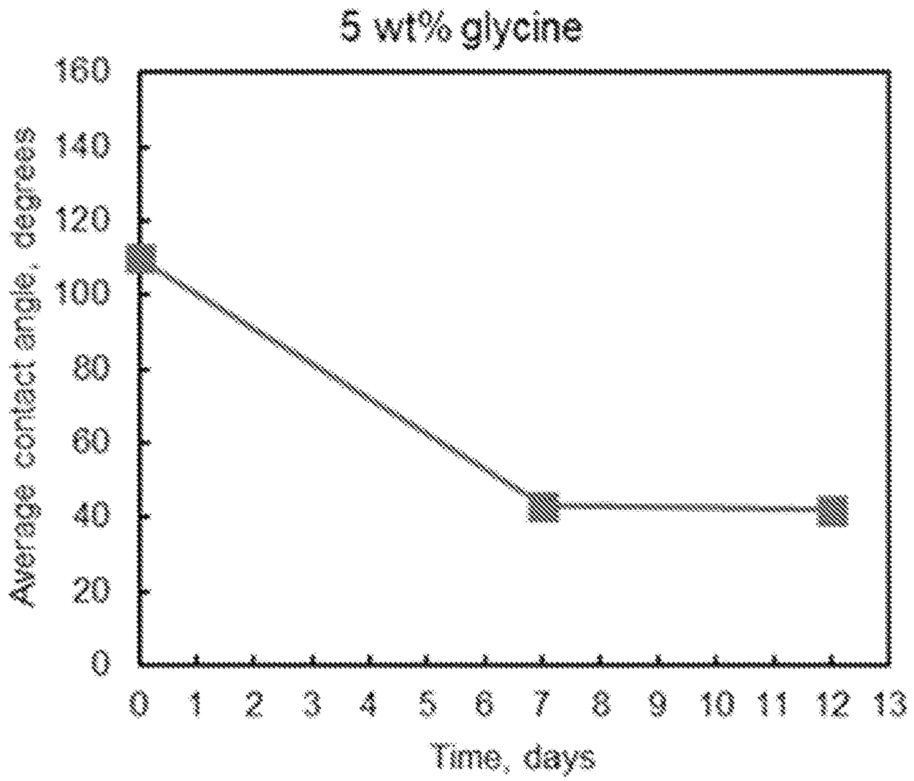
Figure 37A:
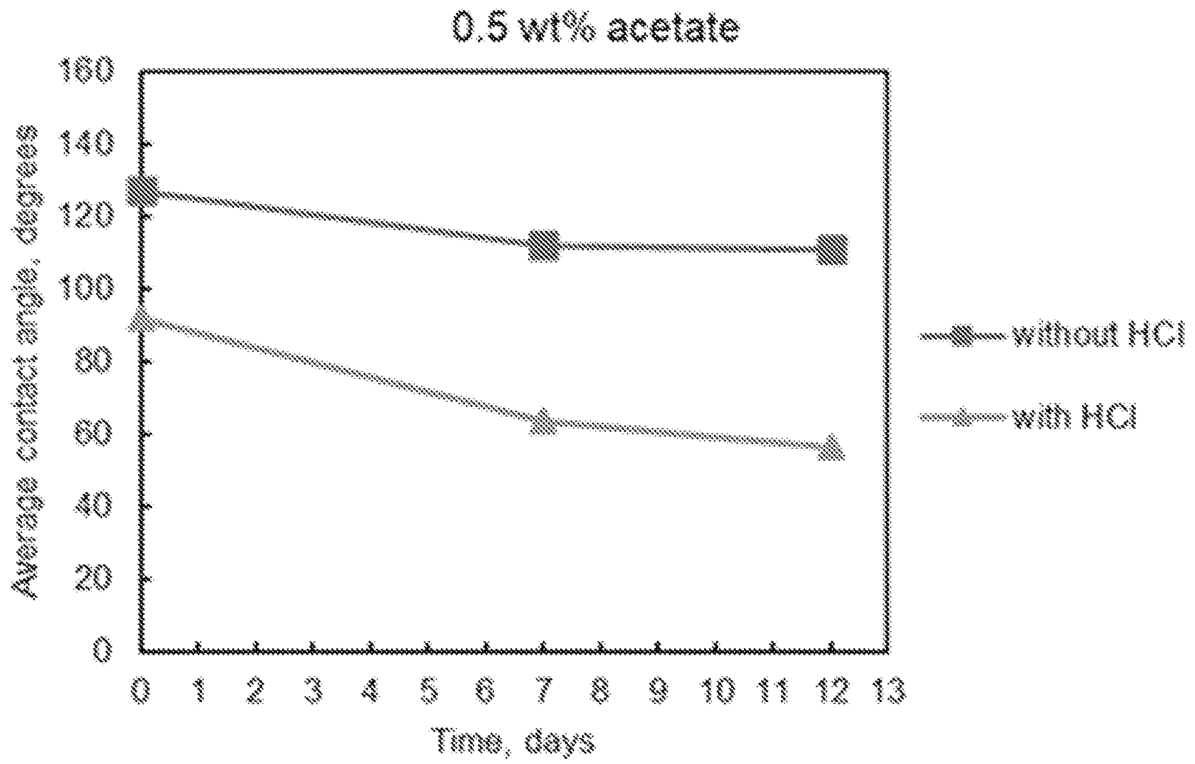
FIG. 37A, FIG. 37B, FIG. 37C, and FIG. 37D provide plots showing results of acetate contact angle experiment with calcite at different acetate solution concentrations.
Figure 37B:
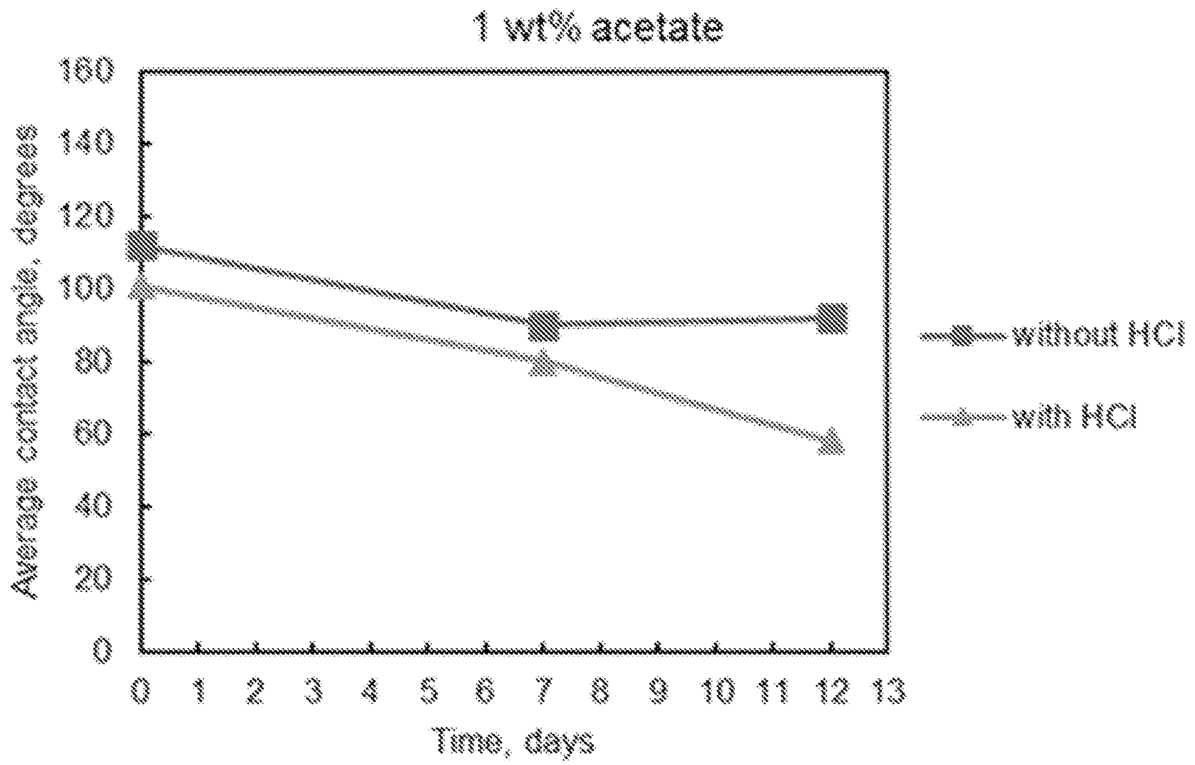
Figure 37C:
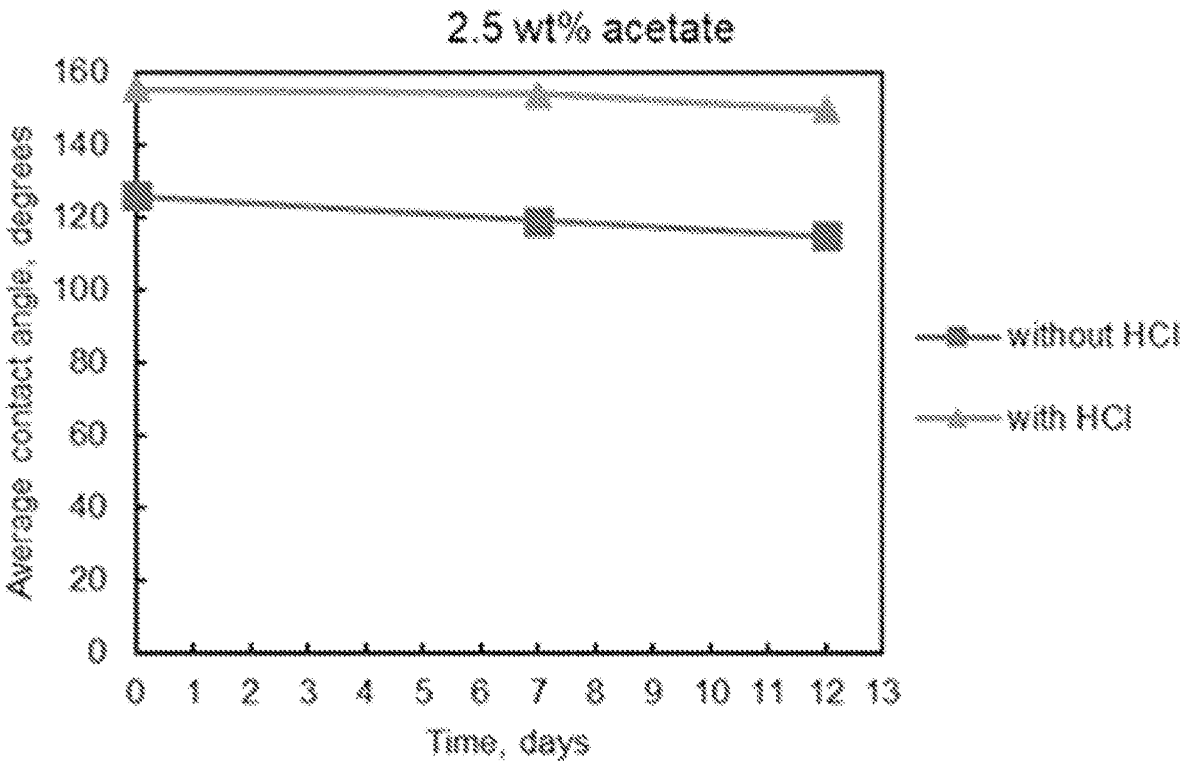
Figure 37D:
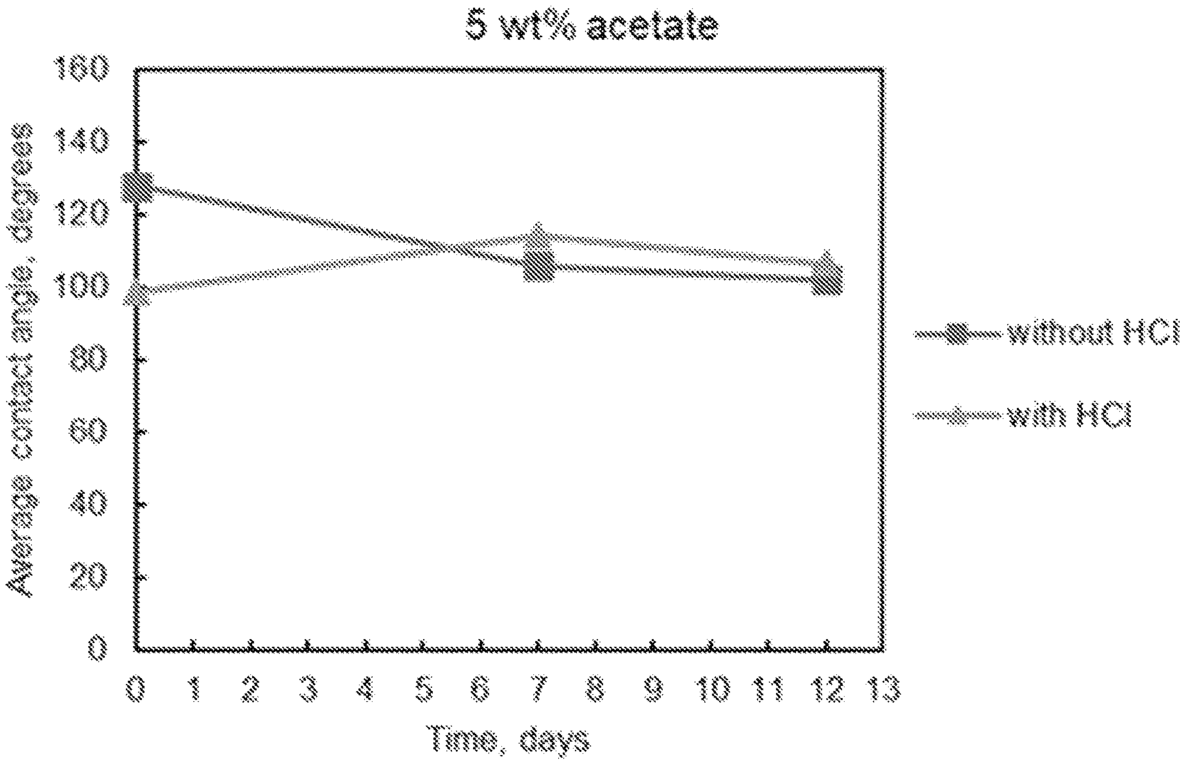

FIG. 35. Results of RB contact angle experiments with calcite.

FIG. 36A, FIG. 36B, FIG. 36C, FIG. 36D. Results of glycine contact angle experiment with calcite: (FIG. 36A) 0.5 wt % glycine solution, (FIG. 36B) 1 wt % glycine solution, (FIG. 36C) 2.5 wt % glycine solution and (FIG. 36D) 5 wt % glycine solution.

FIG. 37A, FIG. 37B, FIG. 37C, FIG. 37D. Results of acetate contact angle experiment with calcite: (FIG. 37A) 0.5 wt % acetate solution, (FIG. 37B) 1 wt % acetate solution, (FIG. 37C) 2.5 wt % acetate solution and (FIG. 37D) 5 wt % acetate solution.

FIG. 38A, FIG. 38B, FIG. 38C, FIG. 38D. Results of formate contact angle experiment with calcite: (FIG. 38A) 0.5 wt % formate solution, (FIG. 38B) 1 wt % formate solution, (FIG. 38C) 2.5 wt % formate solution and (FIG. 38D) 5 wt % formate solution.

FIG. 39. Results of contact angle experiments with Eagle Ford shale plates.

FIG. 40A and FIG. 40B. Results of the first set of spontaneous imbibition experiments with Texas Cream limestone cores: (FIG. 40A) oil recovery in terms of OOIP, (FIG. 40B) oil recovery in terms of pore volume (PV).

FIG. 41A and FIG. 41B. Results of the first set of forced imbibition experiments with Texas Cream limestone cores: (FIG. 41A) oil recovery in terms of OOIP, (FIG. 41B) oil recovery in terms of PV.

FIG. 42A and FIG. 42B. Results of the second set of spontaneous imbibition experiments with Texas Cream limestone cores: (FIG. 42A) oil recovery in terms of OOIP, (FIG. 42B) oil recovery in terms of PV.

FIG. 43A and FIG. 43B. Results of the second set of forced imbibition experiments with Texas Cream limestone cores: (FIG. 43A) oil recovery in terms of OOIP, (FIG. 43B) oil recovery in terms of PV.

FIG. 44A and FIG. 44B. Two possible mechanisms of Calcium binding to Glycine: (FIG. 44A) Calcium binding to carboxyl group, (FIG. 44B) Calcium binding to carboxyl group and amino group. Calcium is yellow, Carbon is grey, Nitrogen is blue, Hydrogen is white, and Oxygen is red. Schematic taken from Tang et al.

FIG. 45. Illustration of amino group's role in superiority of glycine (on the left) over carboxylate anions (on the right) due to chelate effect. Glycine is attracted to calcite surface via both amino and carboxyl group which makes it entropically more favorable compared to carboxylate anions such as formate or acetate which only interact via carboxyl group. This attraction is necessary when oil molecules are released from the surface because of calcite dissolution.

Example 5: Experimentally Determined Properties of Formate Solutions

Solutions of formate in deionized water and different brines were prepared. The solubility of formate in the solutions were measured, as summarized in Table 24.

TABLE 24

Solubility measurement of formate solution.

| Salinity | Temp., ° C. | Formate solubility, wt % | Density, g/ml |
|---|---|---|---|
| 0 | 25 | 31.50 | 1.33 |
| | 50 | 34.38 | 1.35 |
| | 75 | 36.77 | 1.37 |
| 15000 ppm ($Na^+$: 5500, $Cl^-$: 7500, $HCO^{3-}$: 2000) | 25 | 32.8 | |
| 102646 ppm (97897 ppm NaCl and 4749 ppm $CaCl_2$) | 25 | 29.6 | 1.3675 |
| | 50 | 32.2 | 1.3795 |
| | 75 | 34.75 | 1.4388 |
| 15000 ppm NaCl | 25 | 31.64 | |

The viscosity of formate solutions in 3 salinities (0, 15000 and 49000 ppm NaCl), 3 temperatures (25, 50 and 75° C.) and 5 concentrations (0, 10, 20, 25 and 30 wt %) were measured, with the results summarized in Tables 25-28, FIG. 46, FIG. 47, FIG. 48, and FIG. 49. The viscosity of several formate and HPAM (hydrolyzed acrylic acid polymer) solutions were also measured, as summarized in Table 29.

TABLE 25

Viscosity of formate solution in DI water.

| Temp., ° C. | Formate conc., wt % | Density, g/cm$^3$ | Molar conc., mol/L | Viscosity, cp |
|---|---|---|---|---|
| 25 | 0% | 0.983 | 0 | 0.984 |
| | 10% | 1.081 | 2.402 | 1.485 |
| | 20% | 1.181 | 5.248 | 2.941 |
| | 25% | 1.234 | 6.857 | 4.567 |
| | 30% | 1.291 | 8.606 | 7.7 |
| 50 | 0% | 0.984 | 0 | 0.606 |
| | 10% | 1.080 | 2.4 | 0.951 |
| | 20% | 1.187 | 5.274 | 1.678 |
| | 25% | 1.240 | 6.889 | 2.424 |
| | 30% | 1.293 | 8.622 | 3.66 |
| 75 | 0% | 0.928 | 0 | 0.416 |
| | 10% | 1.028 | 2.283 | 0.649 |
| | 20% | 1.167 | 5.185 | 1.15 |
| | 25% | 1.209 | 6.718 | 1.533 |
| | 30% | 1.271 | 8.475 | 2.256 |

TABLE 26

Viscosity of formate solution in 15000 ppm NaCl brine.

| Temp., ° C. | Formate conc., wt % | Density, g/cm$^3$ | Molar conc., mol/L | Viscosity, cp |
|---|---|---|---|---|
| 25 | 0% | 0.991 | 0 | 0.976 |
| | 10% | 1.107 | 2.459 | 1.599 |
| | 20% | 1.219 | 5.419 | 3.272 |
| | 25% | 1.277 | 7.093 | 5.036 |
| | 30% | 1.333 | 8.883 | 8.521 |
| 50 | 0% | 0.998 | 0 | 0.599 |
| | 10% | 1.073 | 2.383 | 1.08 |
| | 20% | 1.193 | 5.3 | 1.84 |
| | 25% | 1.253 | 6.958 | 2.6 |
| | 30% | 1.305 | 8.7 | 4.17 |
| 75 | 0% | 0.948 | 0 | 0.462 |
| | 10% | 1.041 | 2.313 | 0.687 |
| | 20% | 1.143 | 5.082 | 1.225 |
| | 25% | 1.21 | 6.588 | 1.67 |
| | 30% | 1.284 | 8.561 | 2.662 |

TABLE 27

Viscosity of formate solution in 49000 ppm NaCl brine.

| Temp., ° C. | Formate conc., wt % | Density, g/cm$^3$ | Molar conc., mol/L | Viscosity, cp |
|---|---|---|---|---|
| 25 | 0% | 1.032 | 0 | 1.024 |
| | 10% | 1.130 | 2.512 | 1.584 |
| | 20% | 1.239 | 5.506 | 3.726 |
| | 25% | 1.294 | 7.189 | 6.014 |
| | 30% | 1.357 | 9.045 | 11.497 |
| 50 | 0% | 1.003 | 0 | 0.640 |
| | 10% | 1.1 | 2.444 | 0.960 |
| | 20% | 1.205 | 5.356 | 1.864 |
| | 25% | 1.275 | 7.083 | 3.009 |
| | 30% | 1.333 | 8.883 | 4.790 |
| 75 | 0% | 0.963 | 0 | 0.491 |
| | 10% | 1.05 | 2.333 | 0.816 |
| | 20% | 1.175 | 5.222 | 1.353 |
| | 25% | 1.23 | 6.833 | 1.933 |
| | 30% | 1.285 | 8.567 | 2.972 |

TABLE 28

Viscosity of formate solution in 102646 ppm (97897 ppm NaCl and 4749 ppm $CaCl_2$) brine.

| Temp., ° C. | Formate conc., wt % | Density, g/cm$^3$ | Molar conc., mol/L | Viscosity, cp |
|---|---|---|---|---|
| 25 | 5% | 1.136 | 1.26 | 1.44 |
| | 15% | 1.214 | 4.05 | 2.97 |
| | 20% | 1.263 | 5.61 | 4.30 |
| | 29.6% | 1.368 | 9.00 | 11.61 |
| 50 | 5% | 1.112 | 1.24 | 1.03 |
| | 15% | 1.206 | 4.02 | 1.73 |
| | 20% | 1.250 | 5.55 | 2.32 |
| | 29.6% | 1.353 | 8.89 | 5.17 |
| 75 | 10% | 1.159 | 2.57 | 0.89 |
| | 25% | 1.306 | 7.25 | 2.20 |
| | 30% | 1.355 | 9.03 | 3.07 |

TABLE 29

Viscosity of formate + HPAM solution in 49000 ppm NaCl brine.

| Temperature, ° C. | Polymer conc., wt % | Formate conc., wt % | Viscosity, cp |
|---|---|---|---|
| 25 | 0.12 | 0% | 13.57 |
| | | 10% | 11.05 |

TABLE 29-continued

Viscosity of formate + HPAM solution in 49000 ppm NaCl brine.

| Temperature, ° C. | Polymer conc., wt % | Formate conc., wt % | Viscosity, cp |
|---|---|---|---|
| | | 20% | 16.72 |
| | | 25% | 17.01 |
| | 0.2 | 0% | 30.89 |
| | | 10% | 41.25 |
| | | 20% | 25.65 |
| | | 25% | 41.48 |
| | 0.3 | 0% | 81.21 |
| | | 10% | 87.35 |
| | | 20% | 122.14 |
| 50 | 0.12 | 0% | 10.88 |
| | | 10% | 7.86 |
| | | 20% | 9.23 |
| | | 25% | 7.88 |
| | 0.2 | 0% | 27.45 |
| | | 10% | 29.02 |
| | | 20% | 14.35 |
| | | 25% | 25.17 |
| | 0.3 | 0% | 65.23 |
| | | 10% | 63.8 |
| | | 20% | 79.81 |
| 75 | 0.3 | 0% | 52.41 |
| | | 10% | 49.98 |
| | | 20% | 58.67 |

Interfacial tension measurements were made between the formate solution and oil, with the results summarized in Table 30.

TABLE 30

IFT between formate solution and oil.

| Brine (ppm) | Oil | Formate concentration, wt % | Temp., ° C. | IFT, mN/m |
|---|---|---|---|---|
| $Na^+$: 25170<br>$K^+$: 210<br>$Ca^{2+}$: 976<br>$Mg^{2+}$: 87<br>$Cl^-$: 40904<br>$SO_4^{2-}$: 108 | Texas Oil 1 | 0 | 25 | 8.39 |
| | | 3.38 (5 wt % Sodium formate) [pH: 6.4] | 25 | 7.14 |
| $Na^+$: 5903<br>$Cl^-$: 9097 | Texas Oil 2 | 0 [pH: 7] | 25 | 10.16 |
| | | 10 [pH: 7] | 25 | 4.09 |
| | | 20 [pH: 7] | 25 | 2.18 |
| | | 30 [pH: 7] | 25 | 3.23 |

In-situ viscosity and adsorption measurements were obtained, as summarized in Tables 31 and 32. The in-situ viscosity measurement of 20 wt % formate solution with Indiana limestone were obtained at room temperature. The in-situ viscosity presents the Newtonian fluid behavior. The average in-situ viscosity is 4 cp and average bulk viscosity is 3.3 cp.

TABLE 31

In-situ viscosity of 20 wt % formate solution.

| Flow rate, ml/h | Shear rate, s−1 | Pressure difference, psi | Viscosity, cp | Reynold number |
|---|---|---|---|---|
| 8.0 | 61.1 | 12.67 | 3.93 | $9.34 \times 10^{-7}$ |
| 6.0 | 45.8 | 10.27 | 4.25 | $7 \times 10^{-7}$ |
| 4.0 | 30.5 | 6.98 | 4.33 | $4.67 \times 10^{-7}$ |
| 2.0 | 15.3 | 3.2 | 3.97 | $2.33 \times 10^{-7}$ |
| 1.0 | 7.6 | 1.57 | 3.90 | $1.17 \times 10^{-7}$ |
| 0.8 | 6.1 | 1.3 | 4.03 | $9.34 \times 10^{-8}$ |
| 0.5 | 3.8 | 0.82 | 4.07 | $5.84 \times 10^{-8}$ |

TABLE 32

Adsorption measurement of formate solution.

| Core | Formate concentration, wt % | Adsorption, mg/g |
|---|---|---|
| Texas cream limestone | 1.09 | 0.11 |
| Boise sandstone | 1.03 | 0.1 |

Coreflooding experiments were performed for 3 Indiana limestone cores. The first case, summarized in Tables 33 and 34 and FIG. 51, was for flooding with brine, where the ultimate oil recovery was 53.3% and the breakthrough time was 0.298 HCPV (hydrocarbon pore volume).

TABLE 33

Summary of coreflooding #1.

| | Core #1 |
|---|---|
| Type of rock | Indiana limestone |
| Pore volume, mL | 25.56 |
| Mass of core, g | 245.96 |
| Porosity, % | 22.1 |
| Permeability, mD | 44.66 |
| Initial oil saturation | 0.509 |
| Irreducible water saturation | 0.491 |
| Flow rate, ml/hr | 12 |
| Oil viscosity, cp | 2.7 |
| Brine viscosity, cp | 0.995 |
| Temperature, ° C. | Room temperature |

TABLE 34

Data of coreflooding #1.

| HCPV | cumulative oil, ml | water cut | oil recovery | oil saturation |
|---|---|---|---|---|
| 0 | 0 | 0 | 0 | 0.509 |
| 0.027 | 0.348 | 0 | 0.027 | 0.495 |
| 0.163 | 2.121 | 0 | 0.163 | 0.426 |
| 0.298 | 3.870 | 0 | 0.298 | 0.357 |
| 0.435 | 5.027 | 0.350 | 0.387 | 0.312 |
| 0.567 | 5.191 | 0.905 | 0.399 | 0.306 |
| 0.709 | 5.417 | 0.877 | 0.417 | 0.297 |
| 0.858 | 5.568 | 0.922 | 0.428 | 0.291 |
| 1.004 | 5.719 | 0.921 | 0.440 | 0.285 |
| 1.150 | 5.832 | 0.940 | 0.449 | 0.280 |
| 1.296 | 5.908 | 0.960 | 0.454 | 0.277 |
| 1.448 | 5.983 | 0.962 | 0.460 | 0.275 |
| 1.597 | 6.109 | 0.935 | 0.470 | 0.270 |
| 1.750 | 6.172 | 0.968 | 0.475 | 0.267 |
| 1.896 | 6.247 | 0.960 | 0.481 | 0.264 |
| 2.052 | 6.335 | 0.957 | 0.487 | 0.261 |
| 2.202 | 6.474 | 0.929 | 0.498 | 0.255 |
| 2.351 | 6.474 | 1 | 0.498 | 0.255 |
| 2.489 | 6.587 | 0.937 | 0.507 | 0.251 |
| 2.645 | 6.650 | 0.969 | 0.512 | 0.248 |
| 2.792 | 6.687 | 0.980 | 0.514 | 0.247 |
| 2.943 | 6.788 | 0.949 | 0.522 | 0.243 |
| 3.085 | 6.964 | 0.905 | 0.536 | 0.236 |
| 3.239 | 6.964 | 1 | 0.536 | 0.236 |

Figure 52:
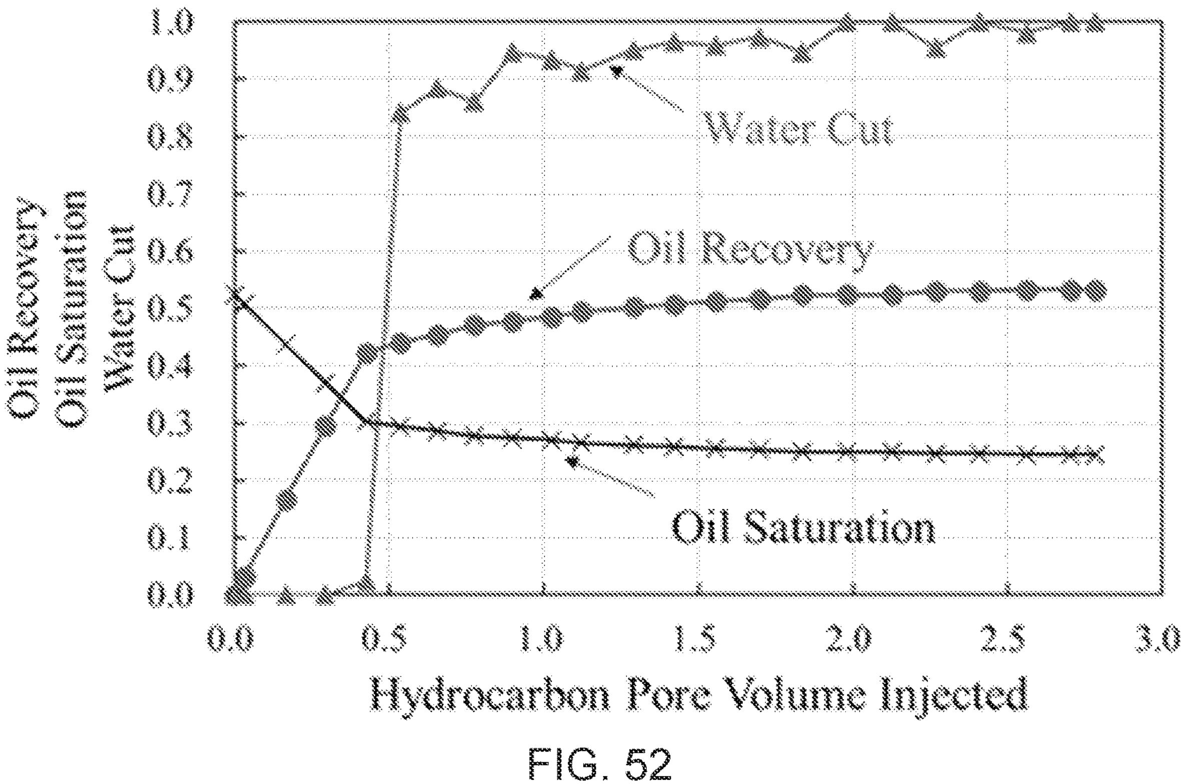
FIG. 52 provides a plot showing results of a coreflooding experiment (20 wt % formate case).

The second case, summarized in Tables 35 and 36 and FIG. 52, was for flooding with 20 wt % formate, where the ultimate oil recovery was 53.2% and the breakthrough time was 0.425 HCPV.

TABLE 35

Summary of coreflooding #2.

| | Core #2 |
|---|---|
| Type of rock | Indiana limestone |
| Pore volume, mL | 25.9 |
| Mass of core, g | 246.61 |
| Porosity, % | 22.4 |
| Permeability, mD | 53.24 |
| Initial oil saturation | 0.524 |
| Irreducible water saturation | 0.476 |
| Flow rate, ml/hr | 3.66 |
| Oil viscosity, cp | 2.7 |
| 20 wt % formate viscosity, cp | 3.3 |
| Temperature, ° C. | room temperature |

TABLE 36

Data of coreflooding #2.

| HCPV | cumulative oil, ml | water cut | oil recovery | oil saturation |
|---|---|---|---|---|
| 0 | 0 | 0 | 0 | 0.524 |
| 0.032 | 0.436 | 0 | 0.032 | 0.507 |
| 0.166 | 2.260 | 0 | 0.166 | 0.437 |
| 0.294 | 3.996 | 0 | 0.294 | 0.370 |
| 0.425 | 5.732 | 0.023 | 0.422 | 0.303 |
| 0.536 | 5.970 | 0.841 | 0.440 | 0.294 |
| 0.656 | 6.159 | 0.884 | 0.454 | 0.286 |
| 0.776 | 6.386 | 0.861 | 0.470 | 0.278 |
| 0.897 | 6.474 | 0.947 | 0.477 | 0.274 |
| 1.025 | 6.587 | 0.934 | 0.485 | 0.270 |
| 1.122 | 6.700 | 0.914 | 0.494 | 0.265 |
| 1.290 | 6.813 | 0.950 | 0.502 | 0.261 |
| 1.422 | 6.876 | 0.965 | 0.507 | 0.259 |
| 1.556 | 6.952 | 0.958 | 0.512 | 0.256 |
| 1.697 | 7.002 | 0.974 | 0.516 | 0.254 |
| 1.836 | 7.103 | 0.947 | 0.523 | 0.250 |
| 1.979 | 7.103 | 1.000 | 0.523 | 0.250 |
| 2.126 | 7.103 | 1.000 | 0.523 | 0.250 |
| 2.268 | 7.191 | 0.954 | 0.530 | 0.247 |
| 2.410 | 7.191 | 1.000 | 0.530 | 0.247 |
| 2.560 | 7.228 | 0.982 | 0.532 | 0.245 |
| 2.701 | 7.228 | 1.000 | 0.532 | 0.245 |
| 2.783 | 7.228 | 1.000 | 0.532 | 0.245 |

Figure 53:
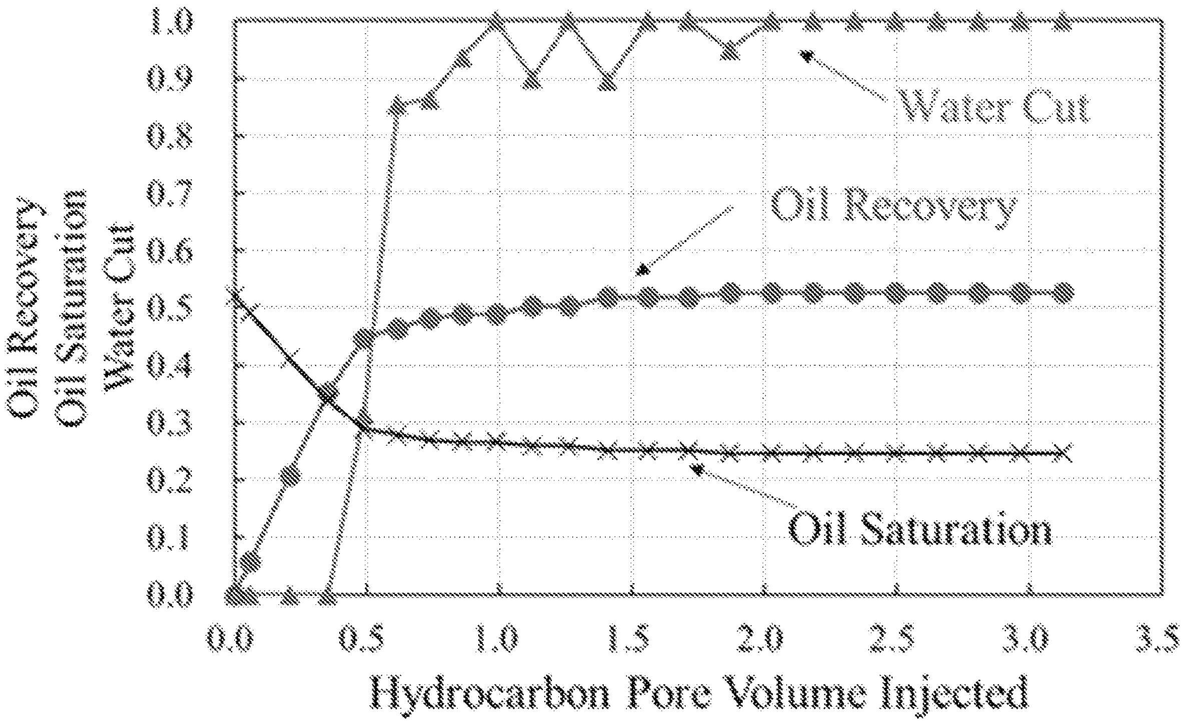
FIG. 53 provides a plot showing results of a coreflooding experiment (30 wt % formate case).

The third case, summarized in Tables 37 and 38 and FIG. 53, was for flooding with 30 wt % formate, where the ultimate oil recovery was 52.6% and the breakthrough time was 0.489 HCPV.

TABLE 37

Summary of coreflooding #3.

| | Core #3 |
|---|---|
| Type of rock | Indiana limestone |
| Pore volume, mL | 25 |
| Mass of core, g | 249.46 |
| Porosity, % | 21.6 |
| Permeability, mD | 45.57 |
| Initial oil saturation | 0.521 |
| Irreducible water saturation | 0.479 |
| Flow rate, ml/hr | 1.45 |
| Oil viscosity, cp | 2.7 |
| 30 wt % formate viscosity, cp | 8.3 |
| Temperature, ° C. | room temperature |

TABLE 38

Data of coreflooding #3.

| HCPV | cumulative oil, ml | water cut | oil recovery | oil saturation |
|---|---|---|---|---|
| 0 | 0 | 0 | 0 | 0.521 |
| 0.057 | 0.738 | 0 | 0.057 | 0.491 |
| 0.208 | 2.713 | 0 | 0.208 | 0.412 |
| 0.352 | 4.587 | 0 | 0.352 | 0.337 |
| 0.489 | 5.807 | 0.314 | 0.446 | 0.288 |
| 0.615 | 6.046 | 0.854 | 0.465 | 0.279 |
| 0.736 | 6.260 | 0.864 | 0.481 | 0.270 |
| 0.859 | 6.360 | 0.937 | 0.489 | 0.266 |
| 0.987 | 6.360 | 1.000 | 0.489 | 0.266 |
| 1.122 | 6.537 | 0.899 | 0.502 | 0.259 |
| 1.262 | 6.537 | 1.000 | 0.502 | 0.259 |
| 1.410 | 6.738 | 0.895 | 0.518 | 0.251 |
| 1.559 | 6.738 | 1.000 | 0.518 | 0.251 |
| 1.712 | 6.738 | 1.000 | 0.518 | 0.251 |
| 1.867 | 6.838 | 0.950 | 0.526 | 0.247 |
| 2.023 | 6.838 | 1.000 | 0.526 | 0.247 |
| 2.182 | 6.838 | 1.000 | 0.526 | 0.247 |
| 2.339 | 6.838 | 1.000 | 0.526 | 0.247 |
| 2.493 | 6.838 | 1.000 | 0.526 | 0.247 |
| 2.649 | 6.838 | 1.000 | 0.526 | 0.247 |
| 2.807 | 6.838 | 1.000 | 0.526 | 0.247 |
| 2.965 | 6.838 | 1.000 | 0.526 | 0.247 |
| 3.123 | 6.838 | 1.000 | 0.526 | 0.247 |

Figure 46:
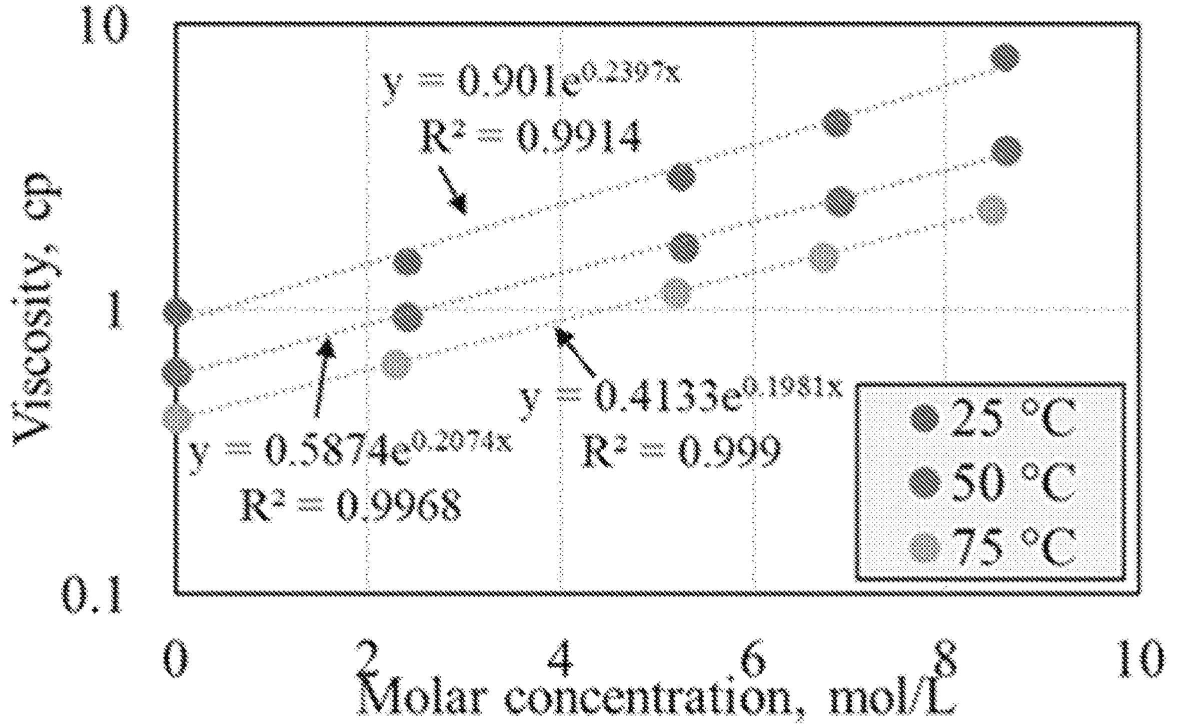
FIG. 46 provides a plot showing viscosity of formate solution in deionized water.

Figure Captions for Example 5. FIG. 46. Viscosity of formate solution in DI water.

Figure 47:
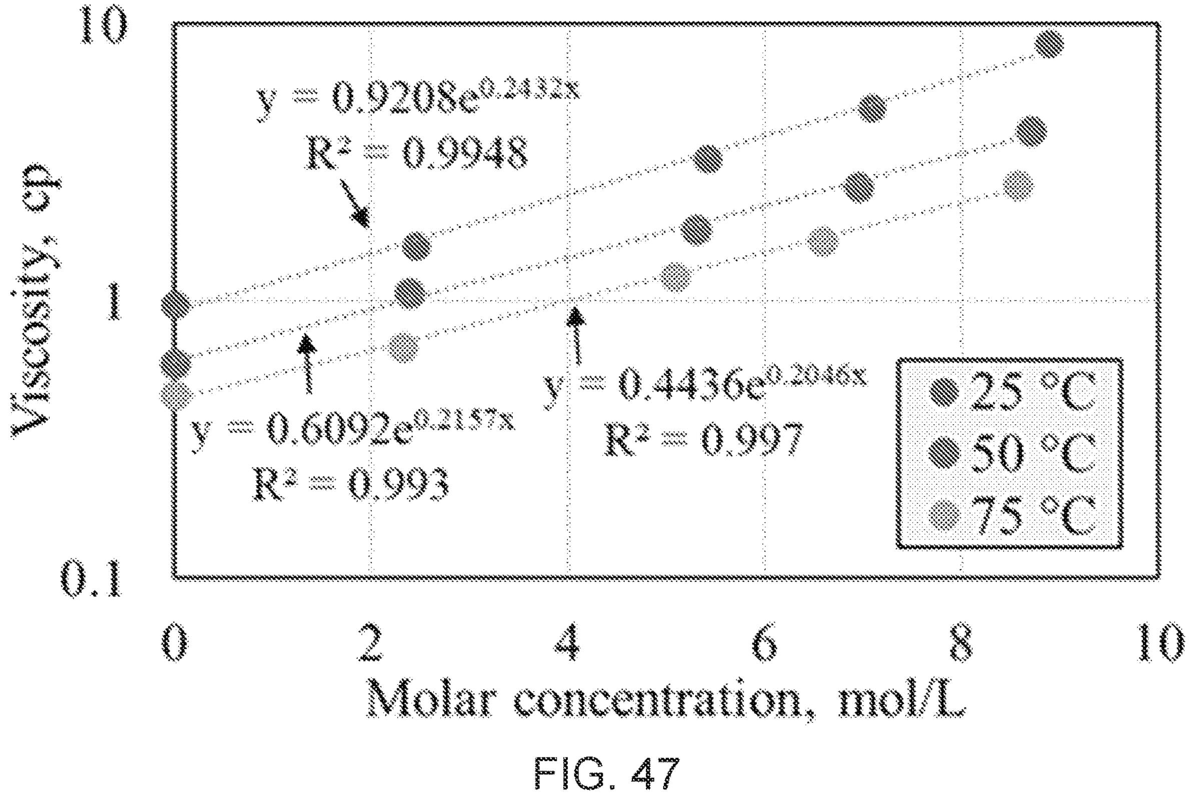
FIG. 47 provides a plot showing viscosity of formate solution in 15000 ppm NaCl.

FIG. 47. Viscosity of formate solution in 15000 ppm NaCl.

Figure 48:
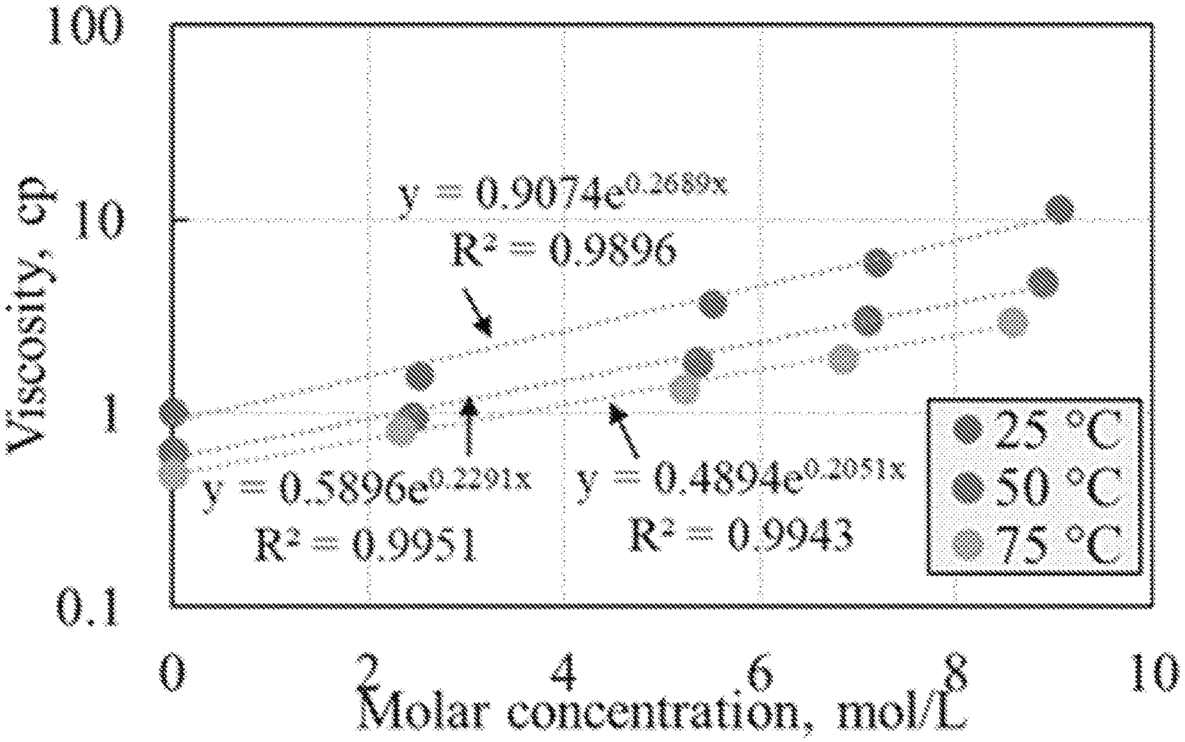
FIG. 48 provides a plot showing viscosity of formate solution in 49000 ppm NaCl.

FIG. 48. Viscosity of formate solution in 49000 ppm NaCl.

Figure 49:
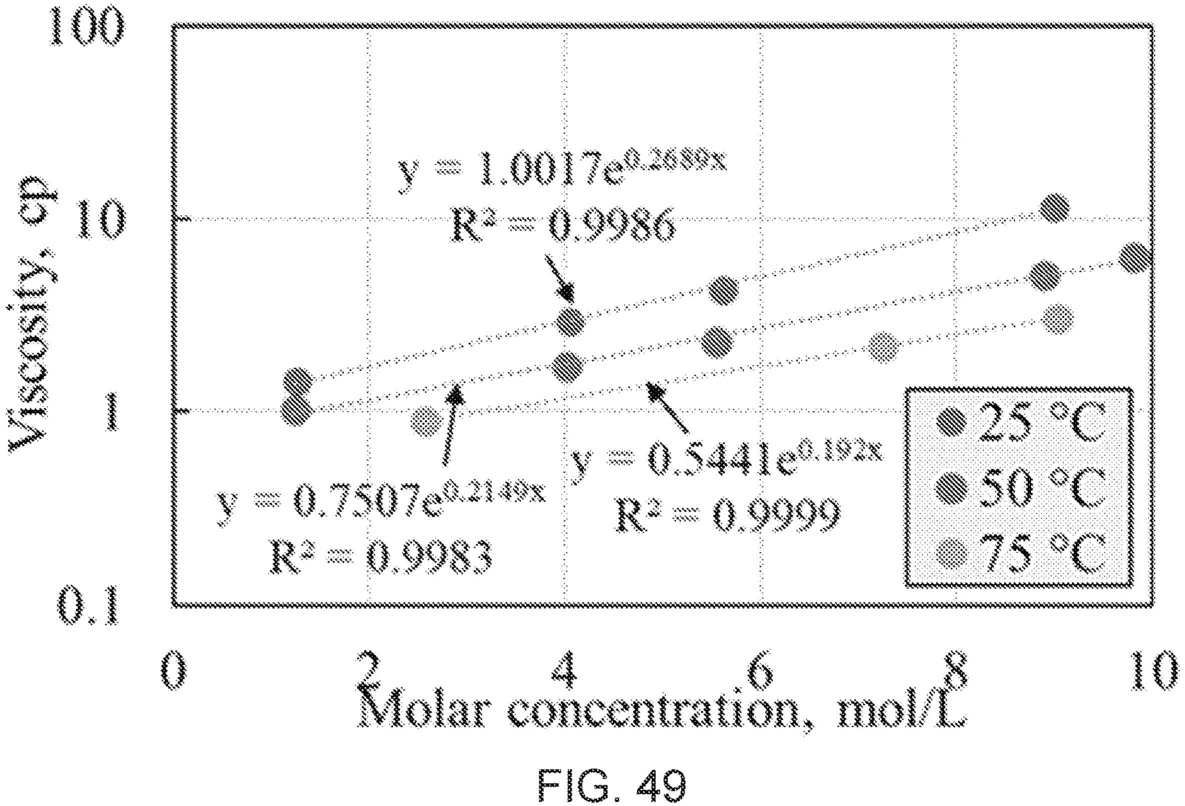
FIG. 49 provides a plot showing viscosity of formate solution in 102646 ppm brine (97897 ppm NaCl and 4749 ppm $CaCl_2$)).

FIG. 49. Viscosity of formate solution in 102646 ppm brine (97897 ppm NaCl and 4749 ppm $CaCl_2$)).

Figure 50:
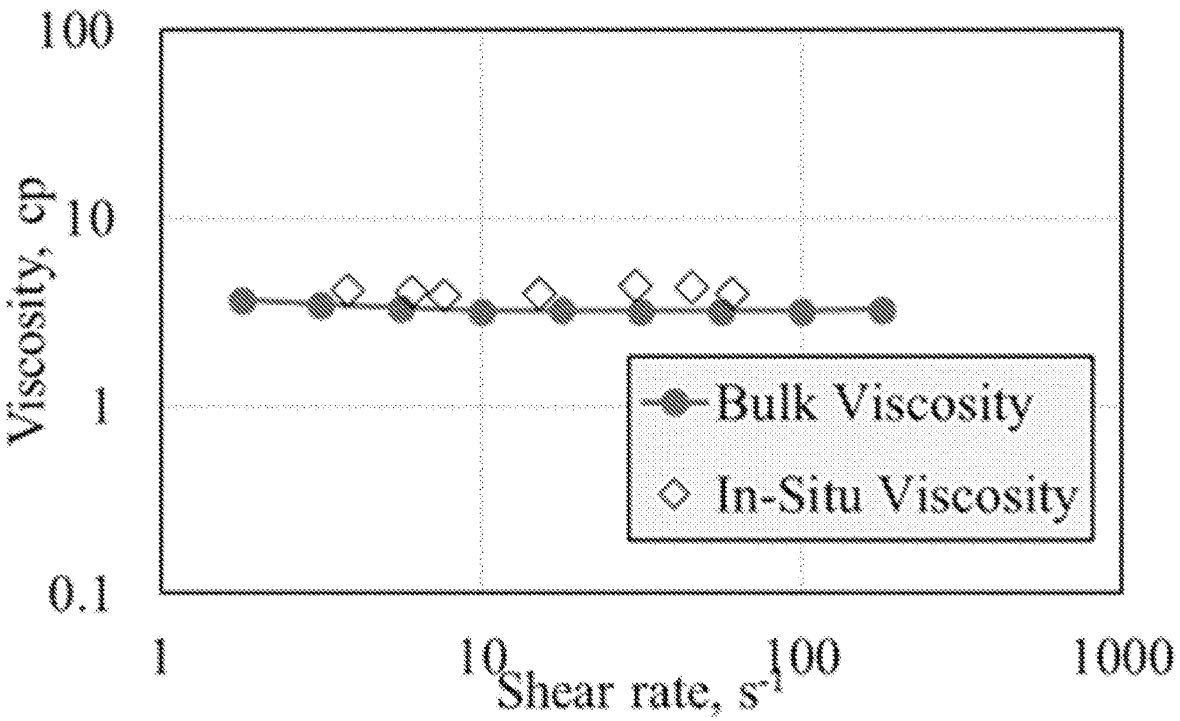
FIG. 50 provides a plot showing in-situ and bulk viscosity of 20 wt % formate solution at room temperature FIG. 51 provides a plot showing results of a coreflooding experiment (brine case).

FIG. 50. In-situ and bulk viscosity of 20 wt % formate solution at room temperature.

Figure 51:
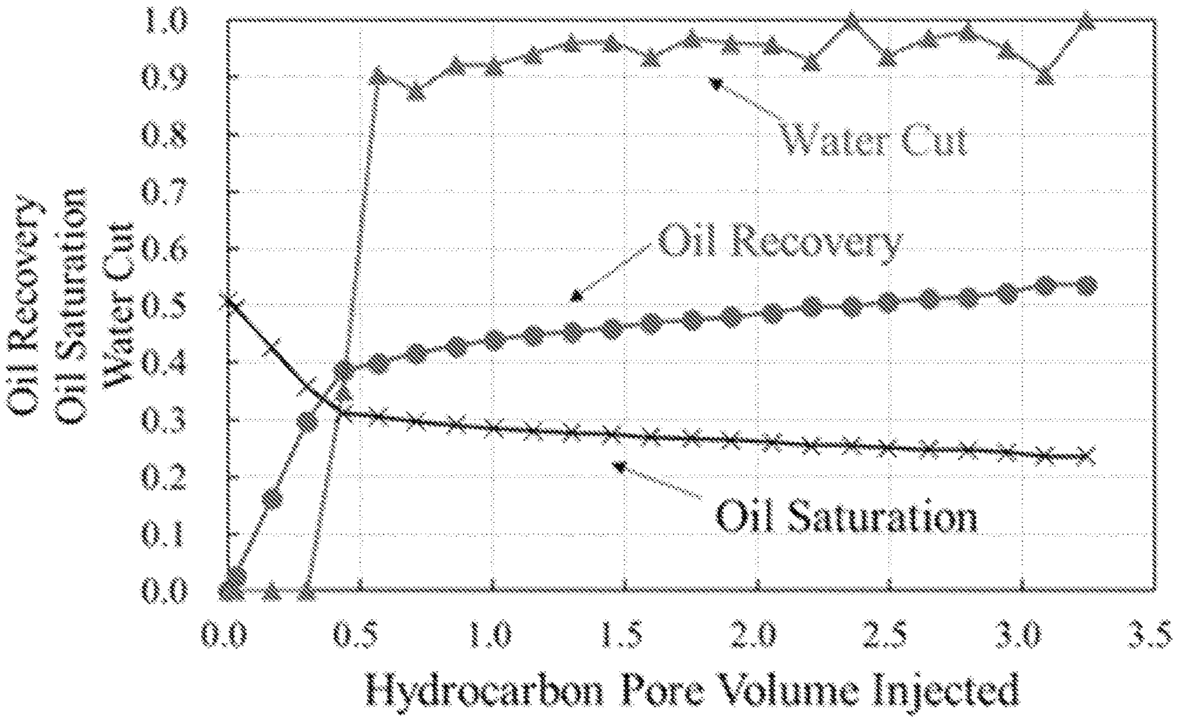

FIG. 51. Results of coreflooding #1 (brine case).

FIG. 52. Results of coreflooding #2 (20 wt % formate case).

FIG. 53. Results of coreflooding #3 (30 wt % formate case).

REFERENCES

U.S. Pat. Nos. 4,637,466, 6,248,792, 8,822,391, and 9,783,729.

U.S. Patent Application Publication No. 2015/0105301.

PCT International Application Publication Nos. WO 2019/180503, WO 2020/191319, and WO 2020/263829.

Abe, M., Schechter, R. S., Selliah, R. D., Sheikh, B. and Wade, W. H. 1987. "Phase Behavior of Branched Tail Ethoxylated Carboxylate Surfactants/Electrolyte/Alkane Systems," Journal of Dispersion Science and Technology, Vol 8(2), 157-172. DOI: 10.1080/01932698708943599

Ahmed, T., & Meehan, D. N. 2012. Introduction to Enhanced Oil Recovery. In Advanced Reservoir Management and Engineering (Second Edition, pp. 541-585). Gulf Professional Publishing. DOI: 10.1016/B978-0-12-385548-0.00006-3.

Al Mahrouqi, Dawoud, Jan Vinogradov, and Matthew D. Jackson. 2017 a. "Zeta Potential of Artificial and Natural Calcite in Aqueous Solution." Advances in Colloid and Interface Science 240: 60-76. DOI: 10.1016/j.cis.2016.12.006

Al-Mamoori, A., Krishnamurthy, A., Rownaghi, A. A., & Rezaei, F., 2017. Carbon Capture and Utilization Update. Energy Technology, 5(6), 834-849. DOI: 10.1002/ente.201600747

Alotaibi, Mohammed B, Hisham A Nasr-El-Din, and James J Fletcher. 2011. "Electrokinetics of Limestone and Dolomite Rock Particles." SPE Reservoir Evaluation & Engineering 14 (05): 594-603. DOI: 10.2118/148701-PA M. B. Alotaibi, A. A. Yousef, The Role of Individual and Combined Ions in Waterflooding Carbonate Reservoirs: Electrokinetic Study, SPE Res Eval & Eng. 20 (2017) 77-86. SPE-177983-PA. DOI: 10.2118/177983-PA Alotaibi, Mohammed B, and Ali Al-Yousef. 2017. "The Role of Individual and Combined Ions in Waterflooding Carbonate Reservoirs: Electrokinetic Study." SPE Reservoir Evaluation & Engineering 20 (01): 77-86.

J. O. Alvarez, D. S. Schechter. 2017. Wettability Alteration and Spontaneous Imbibition in Unconventional Liquid Reservoirs by Surfactant Additives, SPE Reservoir Eval. Eng. 20 (2017) 107-117. DOI: 10.2118/177057-PA J. O. Alvarez, F. D. Tovar, D. S Schechter, Improving Oil Recovery in the Wolfcamp Reservoir by Soaking/Flowback Production Schedule with Surfactant Additives, SPE Reservoir Eval. Eng. 21 (2018) 1083-1096. DOI: 10.2118/187483-PA J. O. Alvarez, I. W. R. Saputra, D. S. Schechter, The Impact of Surfactant Imbibition and Adsorption for Improving Oil Recovery in the Wolfcamp and Eagle Ford Reservoirs. SPE Journal 23 (2018) 2103-2117. DOI: 10.2118/187176-PA E. Amott, Observations relating to the wettability of porous rock, Trans. AIME 219 (1959) 156-162. DOI: 10.2118/1167-G Anderson, J. J., Rode, D., Zhai, H., & Fischbeck, P. 2021. A techno-economic assessment of-carbon-sequestration tax incentives in the US power sector. International Journal of Greenhouse Gas Control, 111, 103450. DOI: 10.1016/j.ijggc.2021.103450

S. C. Ayirala, M. E. Saleh, S. M. Enezi, A. A. Al-Yousef, Effect of Salinity and Water Ions on Electrokinetic Interactions in Carbonate Reservoirs Cores at Elevated Temperatures, SPE Res Eval & Eng. 21 (2018) 733-746. DOI: 10.2118/189444-PA F. J. Argüelles-Vivas, M. Wang, G. A. Abeykoon, R. Okuno, 2020. Oil recovery from fractured porous media with/without initial water saturation by using 3-pentanone and its aqueous solution. Fuel. 276, 118031. DOI: 10.1016/j.fuel.2020.118031

F. J. Argüelles-Vivas, G. A. Abeykoon, R. Okuno, Wettability modifiers for enhanced oil recovery from tight and shale reservoirs, in: R. G. Moghanloo (Eds.), Unconventional Shale Gas Development, Elsevier Inc., Cambridge, 2022, pp. 345-392.

Austad, Tor, Skule Strand, Merete V. Madland, Tina Puntervold, and Reidar I. Korsnes. 2008. "Seawater in Chalk: An EOR and Compaction Fluid." SPE Reservoir Evaluation & Engineering 11 (04): 648-54. DOI: 10.2118/118431-PA Ayirala, Subhash C, Salah Hamad Saleh, Sultan M Enezi, and Ali A Al-Yousef. 2018. "Effect of Salinity and Water Ions on Electrokinetic Interactions in Carbonate Reservoir Cores at Elevated Temperatures." SPE Reservoir Evaluation & Engineering 21 (03): 733-46.

Baghishov, I., Abeykoon, G. A., Wang, M., Argüelles-Vivas, F. J., and Okuno, R., Glycine for Enhanced Water Imbibition in Tight Reservoirs—What is the Role of Amino Group? SPE Annual Technical Conference and Exhibition, Sep. 21-23, 2021, Dubai, UAE (virtual presentation). DOI: 10.2118/206294-MS Bartels, W. B., Mahani, H., Berg, S. and Hassanizadeh, S. M. 2019. Literature Review of Low Salinity Waterflooding from a Length and Time Scale Perspective. Fuel 236: 338-353. DOI: 10.1016/j.fuel.2018.09.018

Bjerre and Soerensen, 1992, "Thermal decomposition of dilute aqueous formic acid solutions." Ind. Eng. Chem. Res., 31, 6, 1574-1577. DOI: 10.1021/ie00006a022

Bruant, R., Guswa, A., Celia, M., & Peters, C. 2002. Safe storage of CO2 in deep saline aquifers. Environmental Science and Technology-Washington DC-, 36(11), 240A-245A.

Buckley, J S, K Takamura, and N R Morrow. 1989. "Influence of Electrical Surface Charges on the Wetting Properties of Crude Oils." SPE Reservoir Engineering 4 (03): 332-40. DOI: 10.2118/16964-PA Budinis, S., Krevor, S., Dowell, N. M., Brandon, N., & Hawkes, A. 2018. An assessment of CCS costs, barriers, and potential. Energy Strategy Reviews, 22, 61-81. DOI: 10.1016/j.esr.2018.08.003

Celia, M. A., Bachu, S., Nordbotten, J. M., & Bandilla, K. W. 2015. Status Of CO2 Storage in Deep Saline Aquifers with Emphasis on Modeling Approaches and Practical Simulations. Water Resources Research, 51(9), 6846-6892. DOI: 10.1002/2015wr017609

Chen, Szu-ying, Kai Kristiansen, Dongjin Seo, Nicholas A Cadirov, Howard A Dobbs, Yair Kaufman, Alex M Schrader, et al. 2018. "Time-Dependent Physicochemical Changes of Carbonate Surfaces from SmartWater (Diluted Seawater) Flooding Processes for Improved Oil Recovery." Research-article. Langmuir 35: 41-50. DOI: 10.1021/acs.langmuir.8b02711

Chen, Y., Vise, A., Klein, W. E., Cetinbas, F. C., Myers, D. J., Smith, W. A., & Neyerlin, K. C. 2020. A robust, scalable platform for the electrochemical conversion of CO2 to formate: identifying pathways to higher energy efficiencies. ACS Energy Letters, 5(6), 1825-1833.

Christie, M. A., Blunt, M. J., 2001. Tenth SPE comparative solution project: a comparison of upscaling techniques. SPE Reservoir Evaluation and Engineering 4 (4), 308-317. DOI: 10.2118/72469-PA Downs, J. D. 1992. High-temperature stabilisation of xanthan in drilling fluids by the use of formate salts. Physical chemistry of colloids and interfaces in oil production, 50, 197-202.

Downs, J. D., Formate Brines: Novel Drilling and Completion Fluids for Demanding Environments. SPE International Symposium on Oilfield Chemistry, New Orleans, Louisiana, March 1993. DOI: 10.2118/25177-MS Eppinger and Huang. 2016. "Formic acid as a Hydrogen Energy Carrier." ACS Energy Letters 2017, 2: 188-195.

Farvardini, M. 2017. The Sedimentological Distribution of Upper Brent, Oseberg field, North Sea (Dissertation). Retrieved from urn.kb.se/resolve?urn=urn:nbn:se:uu:diva-312874

Ghosh, Pinaki, Himanshu Sharma, and Kishore K Mohanty. 2018. "Development of Surfactant-Polymer SP Processes for High Temperature and High Salinity Carbonate Reservoirs." In SPE Annual Technical Conference and Exhibition. Society of Petroleum Engineers. DOI: 10.2118/191733-MS Godec, M., 2014. Acquisition and Development of Selected Cost Data for Saline Storage and Enhanced Oil Recovery (EOR). United States. DOI: 10.2172/1557133

Godinez-Alvarez, J. M., Mora-Mendoza, J. L., Rodriguez-Betancourt, E., Zavala-Olivares, G., and Gonzalez-Nunez, M. 2018. "Inhibition of Ferrous Metal Corrosion by Carboxylates," Paper Presented at the Corrosion, New Orleans, Louisiana, USA. March. NACE-04412.

Grigoni, Sagar, Li, Lee, Yan, Bertens, Miao, Wang, Abed, Won, Arquer, Ip, Sinton, and Sargent. 2020. "$CO_2$ Electroreduction to Format at a Partial Current Density of 930 mA cm-2 with InP Colloidal Quantum Dot Derived Catalysts." ACS Energy Letters 2021, 6: 79-84.

Grubel, Jeong, Yoon, and Autrey. 2020. "Challenges and opportunities for using formate to store, transport, and use hydrogen." Journal of Energy Chemistry 41: 216-224.

Hailu, Tamijani, Mason, and Shaw, 2020, "Efficient Conversion of CO2 to Formate Using Inexpensive and Easily Prepared Post-Transition Metal Catalysts," Energy Fuels, 34, 3, 3467-3476. DOI: 10.1021/acs.energyfuels.9b03783.

F. Heberling, T. P. Trainor, J. Lützenkirchen, P. Eng, M. A. Denecke, D. Bosbach, Structure and reactivity of the calcite-water interface, Journal of Colloid and Interface Science. 354 (2011) 843-857. DOI: 10.1016/j.jcis.2010.10.047

Hiorth, A, L M Cathles, and M V Madland. 2010. "The Impact of Pore Water Chemistry on Carbonate Surface Charge and Oil Wettability." Transport in Porous Media 85 (1): 1-21.

Hirasaki, G. J. 1991. "Wettability: Fundamentals and Surface Forces." SPE Formation Evaluation 6 (02): 217-26. DOI: 10.2118/17367-PA.

G. J. Hirasaki, D. L. Zhang. 2004. Surface Chemistry of Oil Recovery from Fractured, Oil-Wet, Carbonate Formations, SPE Journal 9, 151-162. DOI: 10.2118/88365-PA A. Hiorth, L. M. Cathles, M. V. Madland, The Impact of Pore Water Chemistry on Carbonate Surface Charge and Oil Wettability, Transport in Porous Media. 85 (2010) 1-21. DOI: 10.1007/s11242-010-9543-6

Høgnesen, E J, S Strand, T Austad, and U Stavanger. 2005. "Waterflooding of Preferential Oil-Wet Carbonates: Oil Recovery Related to Reservoir Temperature and Brine Composition." SPE Europe/EAGE Conference. DOI: 10.2118/94166-MS Howard, Siv K., Formate Brines for Drilling and Completion: State of the Art. SPE Annual Technical Conference and Exhibition, Dallas, Texas, October 1995. DOI: 10.2118/30498-MS IEA. 2019. Putting $CO_2$ to Use, IEA, Paris www.ica.org/reports/putting-co2-to-use Jouny, M., Luc, W., & Jiao, F. 2018. General techno-economic analysis of CO2 electrolysis systems. Industrial & Engineering Chemistry Research, 57(6), 2165-2177.

Jun, L., Britton, C., Solairaj, S., Liyanage, P. J., Kim, D. H., Adkins, S., Arachchilage, G. W., Weerasooriya, U. P., and Pope, G. A. 2014. "Novel Large-Hydrophobe Alkoxy Carboxylate Surfactants for Enhanced Oil Recovery," SPE Journal. Vol 19(6): 1024-1034. SPE-154261-PA. DOI: 10.2118/154261-PA.

Jürgenson, G. A., Bittner, C., Kurkal-Siebert, V., Oetter, G. and Tinsley, J. 2015. "Alkyl Ether Carboxylates Surfactants for Chemically Enhanced Oil Recovery in Harsh Field Conditions," Paper presented at the SPE Asia Pacific Enhanced Oil Recovery Conference, 11-15 August. SPE-174589-MS. DOI: 10.2118/174589-MS.

Kelemen, P., Benson, S., Pilorgé, H., Psarras, P. & Wilcox, J. 2019. An Overview of the Status and Challenges of CO2 Storage in Minerals and Geological Formations. Frontiers in Climate, vol. 1. DOI: 10.3389/fclim.2019.00009

Kim, M., Kim, C., Lee, H. & Kim, K. 1996. Temperature dependence of dissociation constants for formic acid and 2,6-dinitrophenol in aqueous solutions up to 175° C. Journal of the Chemical Society, Faraday Transactions, 92(24), 4951-4956. DOI: 10.1039/FT9969204951

Kumar, A. 2016. Characterization of Reservoir Fluids based on Perturbation from n-Alkanes. Doctoral dissertation, University of Alberta. Education and Research Archive. DOI: 10.7939/R3PR7N024

Kelemen, P., Benson, S., Pilorgé, H., Psarras, P. and Wilcox, J., 2019. An Overview of the Status and Challenges of CO2 Storage in Minerals and Geological Formations. Frontiers in Climate, vol. 1. DOI: 10.3389/fclim.2019.00009

Kim, M., Kim, C., Lee, H. and Kim, K., 1996. Temperature dependence of dissociation constants for formic acid and 2,6-dinitrophenol in aqueous solutions up to 175° C. Journal of the Chemical Society, Faraday Transactions, 92(24), pp. 4951-4956. DOI: 10.1039/FT9969204951

R. A. Lara Orozco, G. A. Abeykoon, M. Wang, F. J. Argüelles-Vivas, R. Okuno, L. W. Lake, S. C. Ayirala, A. M. AlSofi, Amino acid as a novel wettability modifier for enhanced waterflooding in carbonate reservoirs, SPE Reservoir Evaluation and Engineering. 23 (2020) 741-757. DOI: 10.2118/195907-PA M. C. Leverett, Capillary Behavior in Porous Solids, Trans. Soc. Pet. Eng., 142 (1941) 152-169. DOI: 10.2118/941152-G Li, G. Z., Xu, J., Mu, J. H., Zhai, L. M., Shui, L. L., Chen, W. J., Jiang, J. L., Chen, F., Guo, D. F., and Lin, W. M. 2005. "Design and Application of an Alkaline-Surfactant-Polymer Flooding Systems in Filed Pilot Test," Journal of Dispersion Science and Technology, Vol 26(6), 709-717. DOI: 10.1081/DIS-200063021.

Li, J., Kuang, Y., Meng, Y., Tian, X., Hung, W., Zhang, X., Li, A., Xu, M., Zhou, W., Ku, C., Chiang, C., Zhu, G., Guo, J., Sun, X. and Dai, H., 2020. Electroreduction of CO2 to Formate on a Copper-Based Electrocatalyst at High Pressures with High Energy Conversion Efficiency. Journal of the American Chemical Society, 142(16), pp. 7276-7282. DOI: 10.1021/jacs.0c00122

K. Li, K. Chow, RN. Horne, Influence of initial water saturation on recovery by spontaneous imbibition in gas/water/rock systems and the calculation of relative permeability, SPE Reservoir Eval Eng, 9 (2006) 295-301. DOI: 10.2118/99329-PA Li, M., Idros, M. N., Wu, Y., Garg, S., Gao, S., Lin, R., Rabiee, H., Li, Z., Ge, L., Rufford, T. E., Zhu, Z., Li, L., & Wang, G. 2021. Unveiling the effects of dimensionality of tin oxide-derived catalysts on $CO_2$ reduction by using gas-diffusion electrodes. Reaction Chemistry & Engineering, 6(2), 345-352. DOI: 10.1039/d0re00396d Liu, Z., Zhang, L., Cao, X., Song, X., Jin, Z., Zhang, L., and Zhao, S. 2013. "Effect of Electrolyte on Interfacial Tension of Alkyl Ether Carboxylate Solutions," Energy and Fuels. Vol. 27(6), 3122-3129. DOI: 10.1021/ef400458q.

Ma, Xie, Zhang, Sun, Kang, Jiang, Zhang, Wu, and Wang, 2019, "Promoting electrocatalytic CO2 reduction to formate via sulfur-boosting water activation on indium surfaces." Nature Communications 10, 892. DOI: 10.1038/s41467-019-08805-x M. Madani, G. Zargar, M. A. Takassi, A. Daryasafar, D. A. Wood, Z. Zhang, Fundamental Investigation of an Environmentally-Friendly Surfactant Agent for Chemical Enhanced Oil Recovery, Fuel. 238 (2019) 186-197. DOI: 10.1016/j.fuel.2018.10.105

Mahani, Hassan, Arsene Levy Keya, Steffen Berg, and Ramez Nasralla. 2016. "Electrokinetics of Carbonate/Brine Interface in Low-Salinity Waterflooding: Effect of Brine Salinity, Composition, Rock Type, and pH on zeta-Potential and a Surface-Complexation Model." SPE Journal 22 (01): 053-068. DOI: 10.2118/181745-pa M. A. Mahmoud, K. Z. Abdelgawad, Chelating-Agent Enhanced Oil Recovery for Sandstone and Carbonate Reservoirs, SPE J. 20 (2015) 483-495. DOI: 10.2118/172183-PA Mason, G. and Morrow, N. R. 2013. Developments in Spontaneous Imbibition and Possibilities for Future Work. Journal of Petroleum Science and Engineering 110: 268-293. DOI: 10.1016/j.petrol.2013.08.018

Meng, Q., Liu, H. and Wang, J. 2017. A Critical Review on Fundamental Mechanisms of Spontaneous Imbibition and the Impact of Boundary Condition, Fluid Viscosity and Wettability. Advances in Geo-energy Research 1 (1): 1-17.

Morrow, N. R. and Mason, G. 2001. Recovery of Oil by Spontaneous Imbibition. Current Opinion in Colloid & Interface Science 6 (4): 321-337. DOI: 10.1016/S1359-0294(01)00100-5

Myint, Philip C., and Abbas Firoozabadi. 2015. "Thin Liquid Films in Improved Oil Recovery from Low-Salinity Brine." Current Opinion in Colloid and Interface Science 20 (2): 105-14. DOI: 10.1016/j.cocis.2015.03.002

Newell, D. L., Carey, J. W., Backhaus, S. N., and Lichtner, P. 2018. Experimental study of gravitational mixing of Supercritical $CO_2$. International Journal of Greenhouse Gas Control, 71, 62-73. DOI: 10.1016/j.ijggc.2018.02.013

Ofei T. N., Al Bendary R. M., Habte A. D. 2017. Rheological Performance of Potassium Formate Water-Based Muds for High-Temperature Wells. In: Awang M., Negash B., Md Akhir N., Lubis L., Md. Rafek A. (eds) ICIPEG 2016. Springer, Singapore. DOI: 10.1007/978-981-10-3650-7_63

P. Kathel, K. K. Mohanty, Wettability Alteration in a Tight Oil Reservoir, Energy Fuels 27 (2013) 6460-6468. DOI: 10.1021/ef4012752

Perez-Fortes, Schoneberger, Boulamanti, Harrison, and Tzimas. 2016. "Formic acid synthesis using $CO_2$ as raw material: Techno-economic and environmental evaluation and market potential." International Journal of Hydrogen Energy 41: 16444-16462.

Philips, M., Gruter, G., Koper, M. and Schouten, K., 2020. Optimizing the Electrochemical Reduction of $CO_2$ to Formate: A State-of-the-Art Analysis. ACS Sustainable Chemistry & Engineering, 8(41), pp. 15430-15444. DOI: 10.1021/acssuschemeng.0c05215

Plummer, L N, TM L Wigley, and D L Parkhurst. 1978. "The Kinetics of Calcite Dissolution in $CO_2$-Water Systems at 5 Degrees to 60 Degrees C. and 0.0 to 1.0 Atm $CO_2$." American Journal of Science 278 (2): 179-216.

Rapoport, L. A. and Leas, W. J. 1953. Properties of Linear Waterfloods. Journal of Petroleum Technology 5 (05): 139-148. DOI: 10.2118/213-G A. Seethepalli, B. Adibhatla, K. K. Mohanty. 2004. Wettability Alteration During Surfactant Flooding of Carbonate Reservoirs, Paper presented at the SPE/DOE Symposium on Improved Oil Recovery, Tulsa, Oklahoma. DOI: 10.2118/89423-MS Shaffer, G., 2010. Long-term effectiveness and consequences of carbon dioxide sequestration. Nature Geoscience 3, 464-467. DOI: 10.1038/ngeo896

Shaw., J. E. 1984. "Carboxylate Surfactants Systems Exhibiting Phase Behavior Suitable for Enhanced Oil Recovery," Journal of American Oil Chemists' Society. Vol 61, 1395-1399. DOI: 10.1007/BF02542250.

Sharma, H., Panthi, K., Ghosh, P., Weerasooriya, U., and Mohanty, K. 2018. "Novel Surfactants without Hydrocarbon Chains for Chemical EOR," Paper Presented at SPE Improved Oil Recovery Conference, 14-18 April. SPE-190232-MS. DOI: 10.2118/190232-MS Sheng, K., Okuno, R., Imran, M., Nakutnyy, P. & Nakagawa, K. 2021. An Experimental Study of Steam-solvent Coinjection for Bitumen Recovery Using a Large-scale Physical Model. In IOR 2021 (Vol. 2021, No. 1, pp. 1-37). European Association of Geoscientists & Engineers. www.earthdoc.org/content/papers/10.3997/2214-4609.202133152

Sjöberg, E Lennart, and David T Rickard. 1984. "Temperature Dependence of Calcite Dissolution Kinetics between 1 and 62 C at PH 2.7 to 8.4 in Aqueous Solutions." Geochimica et Cosmochimica Acta 48 (3): 485-93.

Somoza-Tornos, A., Guerra, O. J., Crow, A. M., Smith, W. A., & Hodge, B. M. 2021. Process modeling, techno-economic assessment, and life cycle assessment of the electrochemical reduction of $CO_2$: a review. Iscience, 24(7). DOI: 10.1016/j.isci.2021.102813

Strand, Skule, Eli J Høgnesen, and Tor Austad. 2006. "Wettability Alteration of Carbonates—Effects of Potential Determining Ions and Temperature" 275: 1-10. DOI: 10.1016/j.colsurfa.2005.10.061

N. Tang, L. H. Skibsted, Calcium Binding to Amino Acids and Small Glycine Peptides in Aqueous Solution: Toward Peptide Design for Better Calcium Bioavailability, Journal of Agricultural and Food Chemistry. 64 (2016) 4376-4389. DOI: 10.1021/acs.jafc.6b01534

Tagavifar, Mohsen, Himanshu Sharma, Denning Wang, Sung Hyun Jang, and Gary Pope. 2018. "Alkaline/Surfactant/Polymer Flooding With Sodium Hydroxide in Indiana Limestone: Analysis of Water/Rock Interactions and Surfactant Adsorption." SPE Journal 23 (06): 2279-2301. DOI: 10.2118/191146-pa D. B. Tripathy, A. Mishra, J. Clark, T. Farmer, Synthesis, Chemistry, Physicochemical Properties and Industrial Applications of Amino Acid Surfactants: A review, Comptes Rendus Chimie. 21 (2018) 112-130. DOI: 10.1016/j.crci.2017.11.005

Upadhyay and Srivastava. 2016. "Carbon Sequestration: Hydrogenation of $CO_2$ to Formic Acid." Present Environment and Sustainable Development. 10, 2: 13-31.

van Putten, Wissink, Swinkels, and Pidko. 2019. "Fuelling the hydrogen economy: Scale-up of an integrated formic acid-to-power system." International Journal of Hydrogen Energy 44: 28533-28541.

Wang, D., Maubert, M., Pope, G. A., Liyanage, P. J., Jang, S. H., Upamali, K. A., Chang, L., Tagavifar, M., Sharma, H., Ren, G. and Mateen, K. 2018. Reduction of Surfactant Retention in Limestones Using Sodium Hydroxide. SPE Journal. SPE-194009-PA. DOI: 10.2118/194009-PA M. Wang, G. A. Abeykoon, F. J. Arguelles-Vivas, R. Okuno, 2019. Ketone Solvent as a Wettability Modifier for Improved Oil Recovery from Oil-Wet Porous Media. Fuel. 258, 116195. DOI: 10.1016/j.fuel.2019.116195

A. A. Yousef, S. H. Al-Saleh, A. Al-Kaabi, M. S. Al-Jawfi, Laboratory Investigation of the Impact of Injection-Water Salinity and Ionic Content on Oil Recovery from Carbonate Reservoirs, SPE Reservoir Evaluation & Engineering. 14 (2011) 578-593; DOI: 10.2118/137634-PA Yu and Savage, 1998, "Decomposition of Formic Acid under Hydrothermal Conditions," Ind. Eng. Chem. Res., 37: 2-10. DOI: 10.1021/ie970182e D. L. Zhang, S. Liu, M. Puerto, C. A. Miller, G. J. Hirasaki. 2006. Wettability alteration and spontaneous imbibition in oil-wet carbonate formations, Journal of Petroleum Science and Engineering, 52 (2006) 213-226, DOI: 10.1016/j.petrol.2006.03.009

Zhang, Peimao, Medad T. Tweheyo, and Tor Austad. 2007. "Wettability Alteration and Improved Oil Recovery by Spontaneous Imbibition of Seawater into Chalk: Impact of the Potential Determining Ions Ca2+, Mg2+, and SO42−." Colloids and Surfaces A: Physicochemical and Engineering Aspects 301 (1-3): 199-208. DOI: 10.1016/j.colsurfa.2006.12.058

Zhou, D., Jia, L., Kamath, J. and Kovscek, A. R. 2002. Scaling of Counter-Current Imbibition Processes in Low-Permeability Porous Media. Journal of Petroleum Science and Engineering 33 (1-3): 61-74. DOI: 10.1016/S0920-4105(01)00176-0

Zukfli, N. N., Mahmood, S. M., Akbari, S., Manap, A. A. A., Kechut, N. I., and Elrais, K. A. 2020. "Evaluation of New Surfactants for Enhanced Oil Recovery Applications in High-Temperature Reservoirs, Journal of Petroleum Exploration and Production Technology." Vol 10, 283-296. DOI: 10.1007/s13202-019-0713-y The Chelate Effect (and Macrocycle Effect): available at chem.libretexts.org/@go/page/200888 (accessed Dec. 13, 2021).

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method for carbon capture and/or storage, the method comprising:

capturing carbon dioxide from the atmosphere or from an industrial process;

converting carbon dioxide to a carboxylate by way of an electroreduction reaction;

obtaining an aqueous mixture comprising water and the carboxylate, wherein a concentration of the carboxylate in the aqueous mixture is from 1 wt. % to 45 wt. %; and injecting the aqueous mixture comprising the carboxylate into a subterranean reservoir, to thereby capture and/or store carbon in the subterranean reservoir.

2. The method of claim 1, wherein the aqueous mixture has a pH within 1 pH unit of an aqueous fluid in the subterranean reservoir.

3. The method of claim 1, wherein injecting the aqueous mixture comprises sequestering carbon or carbon dioxide in the form of the carboxylate in the subterranean reservoir.

4. The method of claim 1, wherein obtaining the aqueous mixture comprises preparing the carboxylate from a member selected from the group of CO2 gas, carbonate ions, and bicarbonate ions.

5. The method of claim 1, wherein obtaining the aqueous mixture comprises adjusting a pH of the aqueous mixture by adding an acid or a base to the aqueous mixture.

6. The method of claim 1, wherein the concentration of the carboxylate is within a solubility limit of the carboxylate in the aqueous mixture at a temperature and a pressure of the subterranean reservoir.

7. The method of claim 1, wherein the concentration of the carboxylate is above a solubility limit of the carboxylate in the aqueous mixture at a temperature and a pressure of the subterranean reservoir or wherein the aqueous mixture is saturated or a supersaturated solution of the carboxylate.

8. The method of claim 1, wherein the aqueous mixture comprises a plurality of different carboxylates, and wherein concentrations of each of the plurality of different carboxylates in the aqueous mixture are from 0.5 wt. % to 44.5 wt. %.

9. The method of claim 1, wherein the subterranean reservoir is a member selected from the group consisting of an oil or gas reservoir, a saline aquifer, a fresh water aquifer, a geothermal reservoir, and a cavern.

10. The method of claim 1, wherein the aqueous mixture comprises fresh water, seawater, reservoir connate water, produced water, river water, pond water, or brine.

11. The method of claim 1, wherein the aqueous mixture or a component thereof contacts rock surfaces in the subterranean reservoir and increases a water wettability character of the rock surfaces, or wherein the aqueous mixture or a component thereof increases a viscosity of a fluid in the subterranean reservoir.

12. The method of claim 1, wherein the aqueous mixture further comprises one or more of a surfactant, a solvent, an acid, a base, a salt, an inorganic compound, a polymer, a chelating agent, a nanomaterial, an amino acid, a biocide, a hydrocarbon, nitrogen, or carbon dioxide.

13. The method of claim 1, wherein obtaining the aqueous mixture comprises preparing the carboxylate from either (i) $CO_2$ and water or (ii) carbonate ions together with H2O.

14. The method of claim 1, wherein obtaining the aqueous mixture comprises preparing the carboxylate from bicarbonate ions and $H_2O$ using an electrochemical reduction process.

15. The method of claim 1, wherein the subterranean reservoir comprises sandstone, carbonate, volcanic rock, or a combination thereof.

16. The method of claim 1, wherein the subterranean reservoir comprises one or more minerals including quartz, calcite, carbonate, dolomite, anhydrite, gypsum, feldspar, siderite, zeolites, kaolinite, illite, chlorite, or smectite.

17. The method of claim 1, wherein a salinity of the aqueous mixture is greater than or about equal to a salinity of brine in the subterranean reservoir.

18. The method of claim 1, wherein a salinity of the aqueous mixture is less than or about equal to a salinity of brine in the subterranean reservoir.

19. The method of claim 1, wherein injecting the aqueous mixture comprises storing hydrogen in the form of the carboxylate in the subterranean reservoir, the method further comprising:
- producing a fluid from the subterranean reservoir,
  - wherein the fluid comprises $H_2$ or
  - wherein the fluid comprises the carboxylate and the method further comprises generating $H_2$ using the carboxylate from the fluid, wherein generating the $H_2$ using the carboxylate comprises dehydrogenating the carboxylate from the fluid.

20. The method of claim 19, further comprising generating $H_2$ in the subterranean reservoir using the carboxylate in the subterranean reservoir, and wherein generating $H_2$ in the subterranean reservoir comprises injecting catalysts including nano-catalysts or pH modifiers into the subterranean reservoir.

21. The method of claim 1, further comprising producing hydrocarbons from the subterranean reservoir; wherein:
- a rate of producing the hydrocarbons from the subterranean reservoir is greater after injecting the aqueous mixture as compared to a rate of producing the hydrocarbons from the subterranean reservoir before injecting the aqueous mixture; or
- the hydrocarbons comprise crude oil, tarmat, bitumen, kerogen, heavy oil, tight oil, shale oil, gas condensate, wet gas, dry gas, or any combination of these.

22. The method of claim 21, wherein producing the hydrocarbons from the subterranean reservoir includes producing the hydrocarbons from one or more wells in the subterranean reservoir, wherein producing the hydrocarbons from the subterranean reservoir includes recovering at least a portion of the aqueous mixture injected into the subterranean reservoir, or wherein the method further comprises producing brine from the subterranean reservoir.

23. The method of claim 22, wherein producing the hydrocarbons from the subterranean reservoir includes producing the brine from the subterranean reservoir, wherein the carboxylate is present as a tracer in the brine produced from the subterranean reservoir, or wherein the method further comprises identifying the carboxylate as a tracer in the brine produced from the subterranean reservoir.

24. The method of claim 21, wherein injecting the aqueous mixture and producing the hydrocarbons comprises a flooding process or a huff-n-puff process, or wherein injecting the aqueous mixture and producing the hydrocarbons comprises a continuous injection process, a cyclic injection process, or a slug injection process.

25. A system for carbon capture and or storage, the system comprising:
- a capture element for carbon dioxide from the atmosphere or an industrial process;
- a vessel for converting carbon dioxide to a carboxylate by an electroreduction reaction;
- a source of an aqueous mixture, wherein the aqueous mixture comprises water and the carboxylate, and wherein a concentration of the carboxylate in the aqueous mixture is from 1 wt. % to 45 wt. %; and
- an injection system in fluid communication with the source and a subterranean reservoir for injecting the aqueous mixture comprising the carboxylate into the subterranean reservoir, thereby capturing and or storing carbon in the subterranean reservoir.

26. The system of claim 25, wherein:
- the carboxylate comprises a carboxylic acid, a carboxylate salt, a carboxylate ion, or any combination of these; or
- a salinity of the aqueous mixture is from about 0 ppm to about 243000 ppm; or
- the aqueous mixture has a pH of from 5 to 9 or a pH within 1 pH unit of an aqueous fluid in the subterranean reservoir; or
- the aqueous mixture comprises fresh water, seawater, reservoir connate water, produced water, river water, pond water, or brine; or
- the carboxylate is not an amino acid; or
- the carboxylate has a formula of:

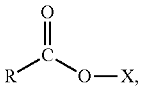

wherein R is H or a $C_1$-$C_3$ alkyl group, and wherein X is H or an alkali metal; or the carboxylate is formate, formic acid, acetate, acetic acid, propionate, or propionic acid; or the subterranean reservoir comprises an oil or gas reservoir, a saline aquifer, a fresh water aquifer, or a geothermal reservoir; or the source of the aqueous mixture comprises an electrochemical reduction reactor for generating the carboxylate from $CO_2$ and $H_2O$; or the fluid comprises $H_2$; or the system further comprises a fluid production system in fluid communication with the subterranean reservoir for producing fluid from the subterranean reservoir, wherein:

the fluid comprises hydrocarbons, or the fluid comprises the carboxylate and the system further comprises a dehydrogenation reactor in fluid communication with the fluid production system for generating $H_2$ from the carboxylate in the fluid.

* * * * *